(12) United States Patent
Leiba

(10) Patent No.: US 10,425,159 B2
(45) Date of Patent: Sep. 24, 2019

(54) SYSTEMS AND METHODS FOR COMMUNICATING THROUGH A GLASS WINDOW BARRIER

(71) Applicant: Siklu Communication Ltd., Petah Tikva (IL)

(72) Inventor: Yigal Leiba, Holon (IL)

(73) Assignee: Siklu Communication Ltd., Petach-Tikva (IL)

( * ) Notice: Subject to any disclaimer, the term of this patent is extended or adjusted under 35 U.S.C. 154(b) by 7 days.

(21) Appl. No.: 15/859,676

(22) Filed: Jan. 1, 2018

(65) Prior Publication Data

US 2018/0123692 A1 May 3, 2018

Related U.S. Application Data

(63) Continuation-in-part of application No. 15/649,151, filed on Jul. 13, 2017, now Pat. No. 10,165,453, which is a continuation-in-part of application No. 15/175,582, filed on Jun. 7, 2016, now Pat. No. 9,813,973.

(60) Provisional application No. 62/566,469, filed on Oct. 1, 2017, provisional application No. 62/532,112, filed
(Continued)

(51) Int. Cl.
| | |
|---|---|
| *H04B 5/00* | (2006.01) |
| *H04B 10/116* | (2013.01) |
| *H04B 10/114* | (2013.01) |
| *H04B 10/29* | (2013.01) |
| *H04B 10/112* | (2013.01) |
| *H04B 10/80* | (2013.01) |
| *H04B 10/90* | (2013.01) |
| *H04W 88/04* | (2009.01) |

(52) U.S. Cl.
CPC ........ *H04B 10/116* (2013.01); *H04B 5/0037* (2013.01); *H04B 5/0081* (2013.01); *H04B 10/114* (2013.01); *H04B 10/1129* (2013.01); *H04B 10/1143* (2013.01); *H04B 10/29* (2013.01); *H04B 10/808* (2013.01); *H04B 10/90* (2013.01); *H04W 88/04* (2013.01)

(58) Field of Classification Search
CPC .......... H04B 10/11; H04B 5/00; H04B 10/29; H04B 10/08; H04B 10/09
USPC ....................................................... 343/879
See application file for complete search history.

(56) References Cited

U.S. PATENT DOCUMENTS

2013/0321239 A1* 12/2013 Bingham ................. H01Q 1/24
343/879

* cited by examiner

*Primary Examiner* — Andrea Lindgren Baltzell
(74) *Attorney, Agent, or Firm* — Active Knowledge Ltd.

(57) ABSTRACT

Systems and methods for communicating through a glass window barrier, in which one communication device, placed outdoors near the glass window, utilizes optical signals to propagate communication signals through the glass window, and thereby communicate with another communication device placed indoors near the same glass window. The outdoor communication device receives power from a power source located indoors, in which power is transported from the indoor power source to the outdoor communication device through the same glass window in a form of an alternating magnetic field. The outdoor communication device may be either placed near the glass window or mechanically fixed to the glass window on one side, and the indoor communication device may be either placed near the glass window or mechanically fixed to the glass window on the other side. Certain known properties of glass windows are exploited, such as transparency to both optical radiation and magnetic fields.

15 Claims, 30 Drawing Sheets

Related U.S. Application Data on Jul. 13, 2017, provisional application No. 62/417,389, filed on Nov. 4, 2016.

SYSTEMS AND METHODS FOR COMMUNICATING THROUGH A GLASS WINDOW BARRIER

CROSS REFERENCE TO RELATED APPLICATIONS

This application claims priority to U.S. Provisional Patent Application No. 62/532,112, filed on Jul. 13, 2017, which is hereby incorporated by reference.

This application claims priority to U.S. Provisional Patent Application No. 62/566,469, filed on Oct. 1, 2017, which is hereby incorporated by reference.

This application is a Continuation-In-Part of U.S. application Ser. No. 15/649,151, filed on Jul. 13, 2017. U.S. application Ser. No. 15/649,151 claims priority to U.S. Provisional Application No. 62/417,389, filed Nov. 4, 2016, and is a Continuation-In-Part of U.S. application Ser. No. 15/175,582, filed Jun. 7, 2016, now U.S. Pat. No. 9,813,973.

BACKGROUND

In wireless systems and microwave or millimeter-wave communication systems in particular, establishing a wireless link between an outdoor wireless node and an indoor wireless client device may prove difficult, as electromagnetic waves in general, and microwave and millimeter-waves in particular, typically suffer a significant loss in power when propagating from an outdoor environment to an indoor environment via walls and windows. A customer-premises-equipment (CPE), which is placed indoors, may alleviate the outdoors-indoors propagation problem in some cases, but in other cases it is simply too difficult or practically impossible to communicatively link an outdoor wireless node with an indoor wireless device, as the propagation loss is simply too high.

SUMMARY

One embodiment is a system (FIG. 13) operative to facilitate communication through a glass window barrier using a single electrical power source. The system includes a first electrical surface attached to one side of a glass window, in which the first electrical surface comprises: (i) a first induction coil, (ii) a photo-detector, and (iii) a first interface facilitating electrical contact with both a single electrical power source and a first communication device. The system further includes a second electrical surface attached to the other side of the glass window and positioned in parallel to the first electrical surface, in which the second electrical surface comprises: (i) a second induction coil, (ii) a photo-emitter, and (iii) a second interface facilitating electrical contact with a second communication device. In one embodiment, the first interface is configured to convey electrical power from the single electrical power source to the first induction coil; the first induction coil is configured to further covey said electrical power, in a form of an alternating magnetic field, through the glass window, to the second induction coil; the second induction coil is configured to further convey said electrical power to the second interface; the second interface is configured to further convey said electrical power to the second communication device; the second communication device is configured to used said electrical power to decode an incoming communication signal, thereby producing a decoded data set; the photo-emitter is configured to send the decoded data set, in a form of an optical signal, through the glass window, to the photo-detector; the photo-detector is configured to convert the optical signal into an electrical signal; and the first interface is configured to convey the electrical signal to the first communication device; thereby communicatively connecting the first and second communication devices via the glass window and using the single electrical power source.

One embodiment is a system (FIG. 12A, FIG. 12B) operative to facilitate communication through a glass window barrier. The system includes: a first electrical surface attached to one side of a glass window, in which the glass window is magnetically transparent to magnetic fields and is also optically transparent to visible light. The system further includes a second electrical surface attached to the other side of the glass window and positioned in parallel to the first electrical surface. In one embodiment, the system is configured to exploit said magnetic transparency in order to convey electrical power, through the glass window, in a form of an alternating magnetic field, from the first electrical surface to the second electrical surface, thereby powering a communication device positioned on said other side of the glass window; and the system is further configured to exploit said optical transparency in order to convey a communication signal generated by the communication device, through the glass window, in a form of an optical signal, from the second electrical surface back to the first electrical surface, thereby facilitating communication through the glass window.

One embodiment is a method (FIG. 14) for communicating through a glass window barrier between an outdoor communication device and an indoor communication device. The method includes: exploiting a magnetic transparency of a glass window to convey electrical power through the glass window in a form of an alternating magnetic field, thereby enabling an indoor electrical power source to power an outdoor communication device. The method further includes: exploiting an optical transparency of the same glass window in order to convey an optical communication signal, in a form of visible light, through the glass window, thereby enabling the outdoor communication device to communicate with an indoor device.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
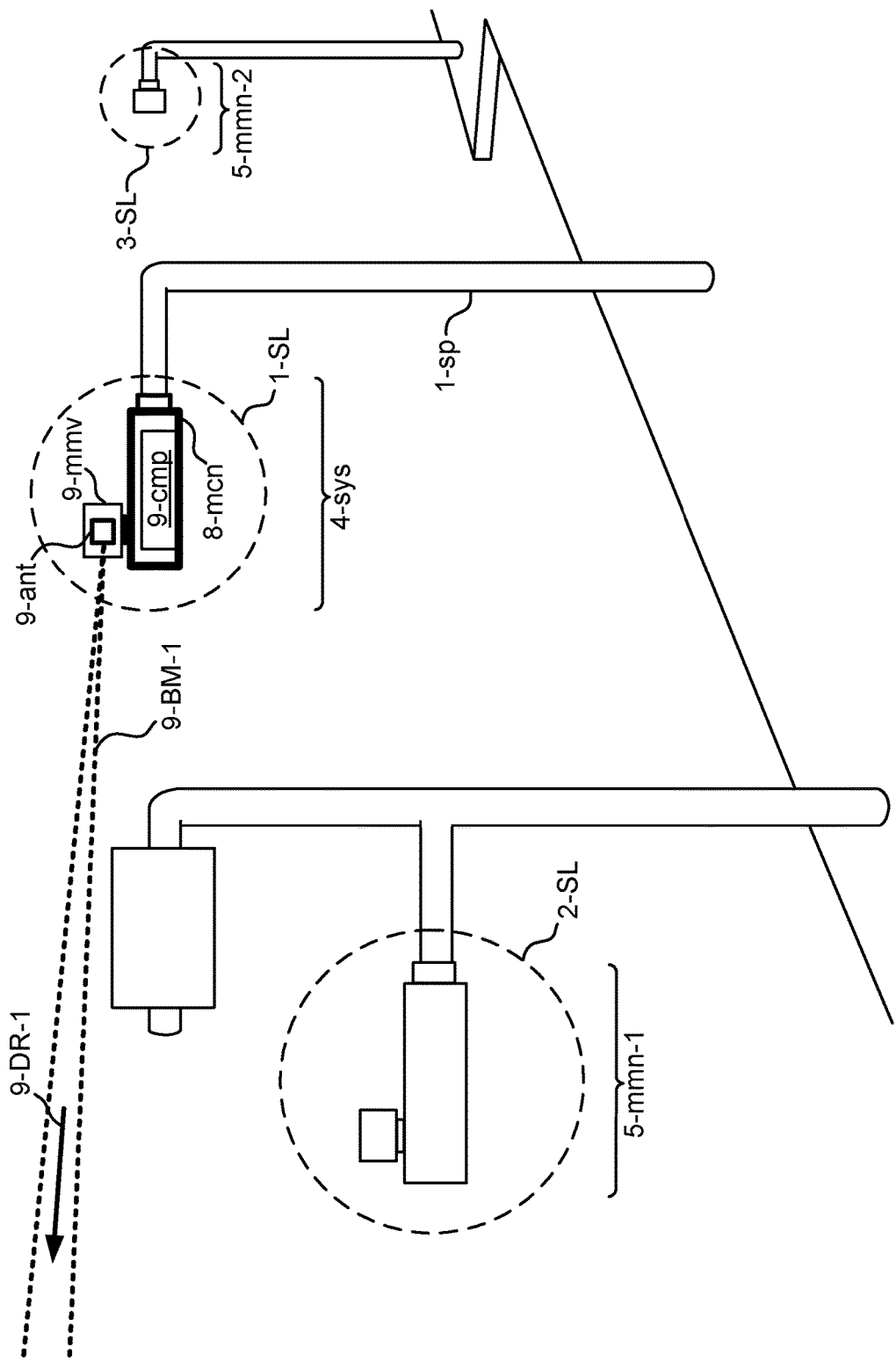
FIG. 1A illustrates one embodiment of an embedded millimeter-wave communication component, in which the embedded millimeter-wave communication component is mechanically fixed to another components and is therefore oriented in a certain direction that is not necessarily aligned with a target node.

FIG. 1A illustrates one embodiment of a millimeter-wave communication component 9-mmv comprising an antenna configuration 9-ant, in which the millimeter-wave communication component is mechanically fixed to another components 9-cmp via a rigid mechanical element 8-mcn, and is therefore oriented, together with the antenna configuration 9-ant, in a certain direction that is not necessarily aligned with a target node 5-mmn-1, 5-mmn-2. A system 4-sys comprising the millimeter-wave communication component 9-mmv, is fixed to a rigid item 1-sp (e.g., a street pole) which is already fixed at a first spatial location 1-SL (in this example, the end of the street pole is fixed at a certain elevation above a certain point in the street), thereby causing the first antenna configuration 9-ant to be fixed at the certain spatial location 1-SL and in a certain orientation 9-DR-1 that are determined by the rigid item 1-sp and by the fixing of system 4-sys to the rigid item. A beam 9-BM-1 generated by the antenna configuration 9-ant in direction 9-DR-1, or in a direction associated with direction 9-DR-1, would not necessarily cover the target node 5-mmn-1 located at spatial location 2-SL, or the target node 5-mmn-2 located at spatial location 3-SL, thereby preventing system 4-sys from establishing a millimeter-wave communication link with any of the target nodes 5-mmn-1, 5-mmn-2.

Figure 1B:
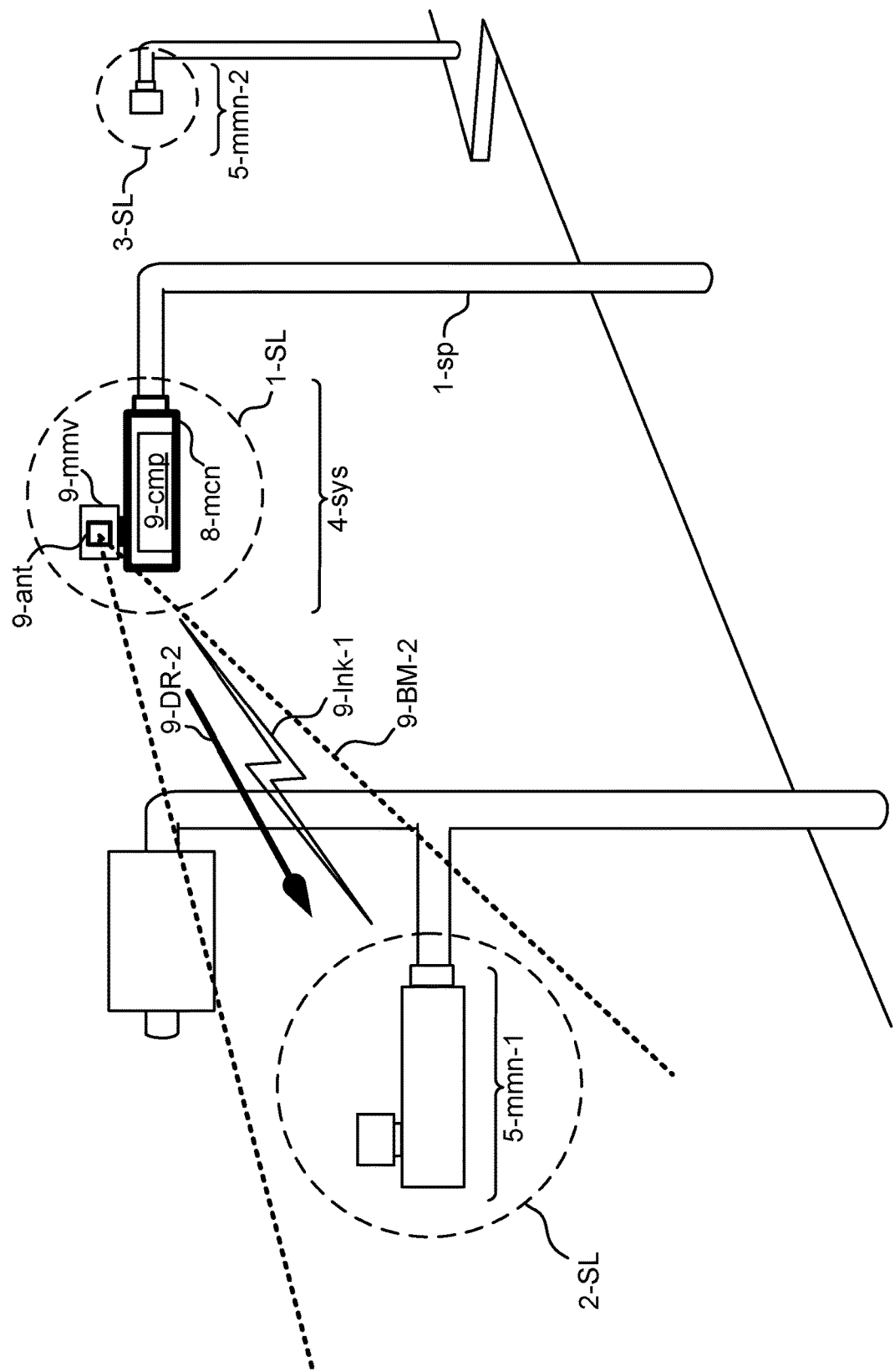
FIG. 1B illustrates one embodiment of the embedded millimeter-wave communication component, in which the embedded millimeter-wave communication component compensates for said orientation by steering, electronically, a millimeter-wave beam toward the target node.

FIG. 1B illustrates one embodiment of the millimeter-wave communication component 9-mmv, in which the millimeter-wave communication component compensates for said orientation 9-DR-1 (FIG. 1A) by steering, electronically, a millimeter-wave beam 9-BM-2 in direction of 9-DR-2 the target node 5-mmn-1. The system 4-sys then establishes, via the millimeter-wave beam 9-BM-2, a first communication link 9-lnk-1 with the target node 5-mmn-1, thereby forming a millimeter wave network 4-sys, 9-lnk-1, 5-mmn-1.

Figure 1C:
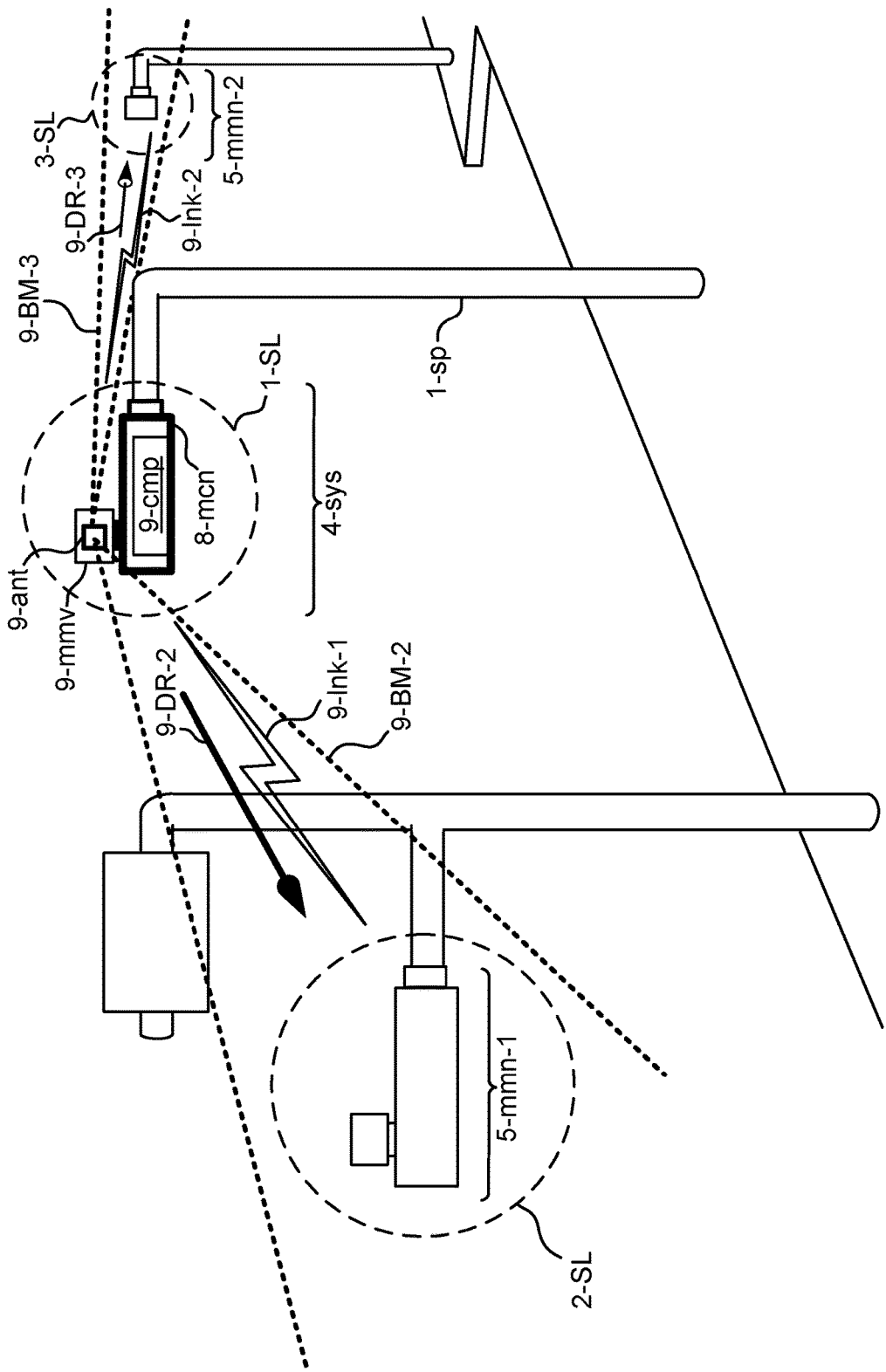
FIG. 1C illustrates one embodiment of the embedded millimeter-wave communication component, in which the embedded millimeter-wave communication component compensates, again, for said orientation by steering, again, the millimeter-wave beam, or another millimeter-wave beam, toward yet another target node.

FIG. 1C illustrates one embodiment of the millimeter-wave communication component 9-mmv, in which the millimeter-wave communication component compensates, again, for said orientation 9-DR-1 (FIG. 1A) by steering, again, the millimeter-wave beam, or another millimeter-wave beam 9-BM-3, in direction of 9-DR-3 yet another target node 5-mmn-2. The system 4-sys then establishes, via the millimeter-wave beam 9-BM-3, a second communication link 9-lnk-2 with the target node 5-mmn-2, thereby forming a larger millimeter-wave network 4-sys, 9-lnk-1, 5-mmn-1, 9-lnk-2, 5-mmn-2.

Figure 2A:
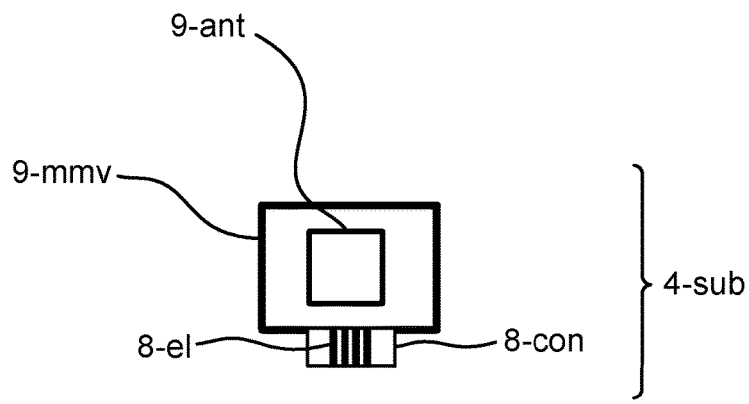
FIG. 2A illustrates one embodiment of a millimeter-wave communication component to be embedded in another component, using a built-in connector.

FIG. 2A illustrates one embodiment of a millimeter-wave communication component 9-mmv comprising an antenna configuration 9-ant, to be embedded in or with another component, using a built-in connector 8-con operative to (i) mechanically fix the millimeter-wave communication component to the other component or to an enclosure of the other component, and (ii) electrically connect 8-el the millimeter-wave communication component with the other component. The millimeter-wave communication component 9-mmv comprising an antenna configuration 9-ant and the built-in connector 8-con together constitute a millimeter-wave sub-system 4-sub.

Figure 2B:
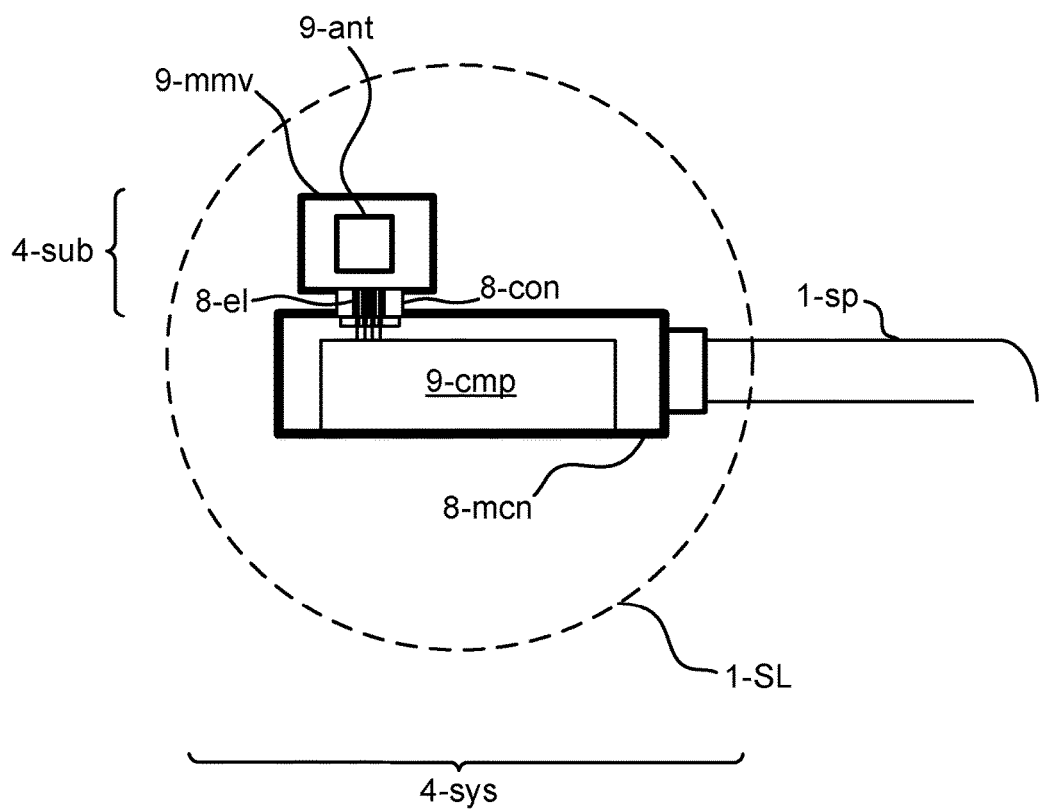
FIG. 2B illustrates one embodiment of the millimeter-wave communication component, now embedded in the other component via the built-in connector.

FIG. 2B illustrates one embodiment of the millimeter-wave communication component 9-mmv, now embedded with the other component 9-cmp via the built-in connector 8-con in an enclosure 8-mcn of the other component 9-cmp, thereby constituting together a complete and rigid system 4-sys which is fixed at a first spatial location 1-SL to a rigid item 1-sp, in which the connector 8-con electrically connects 8-el the millimeter-wave communication component 9-mmv with the other component 9-cmp.

One embodiment is a system 4-sys operative to facilitate an embedded millimeter-wave communication component. The system includes: (i) a first component 9-cmp operative to perform a certain function, in which the certain function is performed in conjunction with a first spatial location 1-SL, (ii) a millimeter-wave communication component 9-mmv configured to steer 9-DR-1, 9-DR-2 a millimeter-wave beam 9-BM-1, 9-BM-2, and (iii) a mechanical component 8-mcn operative to mechanically fix the first component 9-cmp and the millimeter-wave communication component 9-mmv together, thereby associating said millimeter-wave communication component with the first spatial location 1-SL. The millimeter-wave communication component 9-mmv is further configured to automatically steer (e.g., from direction 9-DR-1 to direction 9-DR-2) the millimeter-wave beam 9-BM-1, 9-BM-2 toward a first millimeter-wave node 5-mmn-1 located in a second spatial location 2-SL, thereby establishing a first communication link 9-lnk-1 between the first spatial location 1-SL and the second spatial location 2-SL, and thereby facilitating communication in conjunction with the certain function and the first spatial location.

In one embodiment, the first millimeter-wave node 5-mmn-1 comprises at least one of: (i) a network gateway, (ii) an access point belonging to a radio-access-network, (iii) a millimeter-wave enabled mobile device, and (iv) a communication element in a wired network.

In one embodiment, the first component 9-cmp is a backhaul communication component, the certain function is backhaul communication, the mechanical component 8-mcn is a mechanical enclosure, the first spatial location 1-SL is an elevated position in a street, the second spatial location 2-SL is another position in the street, the first millimeter-wave node 5-mmn-1 is a millimeter-wave enabled mobile device, and said communication is operative to facilitate data transport between the backhaul communication component and the millimeter-wave enabled mobile device.

In one embodiment, the first component 9-cmp is a street light, the certain function is outdoor illumination, the mechanical component 8-mcn is a street light enclosure, the first spatial location 1-SL is a certain position on a street pole 1-sp, and said communication is operative to facilitate control of the outdoor illumination via the second spatial location 2-SL.

In one embodiment, the first component 9-cmp is a traffic light or a traffic sign, the certain function is traffic control, the mechanical component 8-mcn is a rigid construction, the first spatial location 1-SL is a certain position on a street pole 1-sp which is a traffic pole, and said communication is operative to facilitate control of the traffic light or the traffic sign.

In one embodiment, said first communication link 9-lnk-1 is operative to facilitate broadband communication between the first spatial location 1-SL and the second spatial location 2-SL. In one embodiment, the millimeter-wave communication component 9-mmv is further configured to automatically steer the millimeter-wave beam 9-BM-2 or a different millimeter-wave beam 9-BM-3 toward a second millimeter-wave node 5-mmn-2 located in a third spatial location 3-SL, thereby establishing a second communication link 9-lnk-2 between the first spatial location 1-SL and the third spatial location 3-SL. In one embodiment, the system 4-sys is operative to relay said broadband communication between the first millimeter-wave node 5-mmn-1 and the second millimeter-wave node 5-mmn-2, using the first communication link 9-lnk-1 and the second communication link 9-lnk-2.

In one embodiment, the mechanical component 8-mcn holds or contains the first component 9-cmp and the millimeter-wave communication component 9-mmv, such as to make the entire system 4-sys a single mechanically rigid item. In one embodiment, the system 4-sys further comprising a first antenna configuration 9-ant belonging to the millimeter-wave communication component 9-mmv and operative to facilitate creation of the millimeter-wave beam 9-BM-1, 9-BM-2, wherein said antenna configuration 9-ant is mechanically fixed to the millimeter-wave communication component 9-mmv, and is therefore lacking any mechanical degrees of freedom in respect to the spatial orientation of the system 4-sys which is determined solely in conjunction with the certain function, and therefore said steering 9-DR-1, 9-DR-2 of the millimeter-wave beam 9-BM-1, 9-BM-2 is operative to circumvent said lacking of mechanical degrees of freedom, and consequently allow said establishing of the first communication link 9-lnk-1 between the first spatial location 1-SL and the second spatial location 2-SL.

In one embodiment, the mechanical component 8-mcn is an enclosure, and both the first component 9-cmp and the millimeter-wave communication component 9-mmv are enclosed by said enclosure, thereby embedding the millimeter-wave communication component 9-mmv in the system 4-sys.

In one embodiment, the mechanical component 8-mcn is an enclosure, the first component 9-cmp is enclosed by said enclosure, and the millimeter-wave communication component 9-mmv is mechanically fixed to an outer surface of said enclosure, thereby embedding the millimeter-wave communication component 9-mmv in the system 4-sys.

Figure 3:
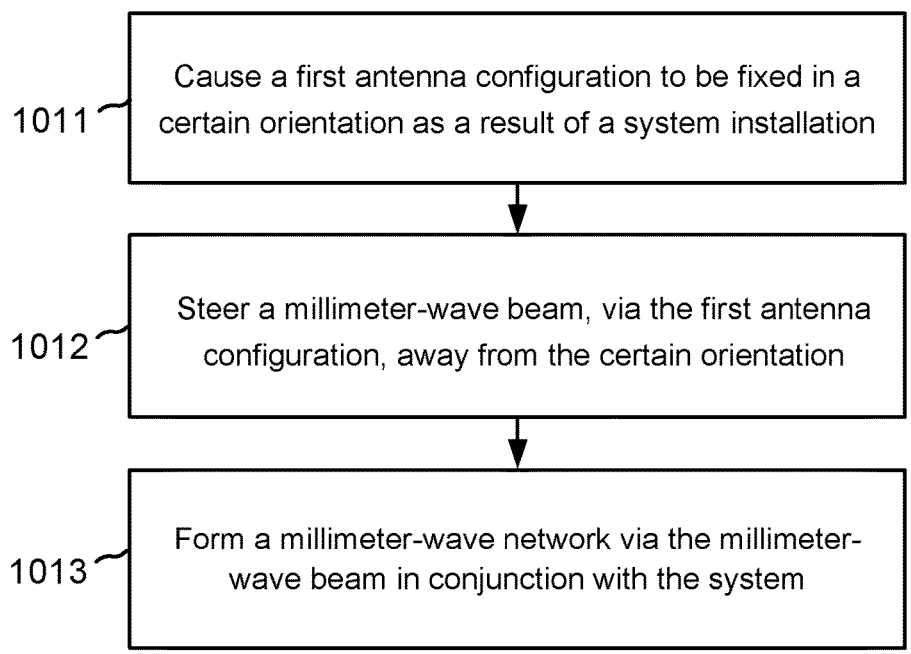
FIG. 3 illustrates one embodiment of a method for communicatively connecting a mechanically fixed system to a millimeter-wave network.

FIG. 3 illustrates one embodiment of a method for communicatively connecting a mechanically fixed system to a millimeter-wave network. The method includes: In step 1011, fixing, to a rigid item 1-sp which is already fixed at a first spatial location 1-SL, a system 4-sys comprising a millimeter-wave communication component 9-mmv comprising a first antenna configuration 9-ant, thereby causing the first antenna configuration to be fixed in a certain orientation 9-DR-1 that is determined by said rigid item 1-sp and said fixing. In step 1012, compensating, by the millimeter-wave communication component 9-mmv, for said certain orientation 9-DR-1 in which the first antenna configuration 9-ant is fixed, by generating, via the first antenna configuration, a millimeter-wave beam 9-BM-1, 9-BM-2, and steering electronically (e.g., from direction 9-DR-1 to direction 9-DR-2) said millimeter-wave beam toward a second spatial location 2-SL. In step 1013, establishing, via the millimeter-wave beam 9-BM-2, a first communication link 9-lnk-1 between the system 4-sys located at the first spatial location 1-SL and a first millimeter-wave node 5-mmn-1 located at the second spatial location 2-SL, thereby forming a millimeter wave network 4-sys, 9-lnk-1, 5-mmn-1 in conjunction with the system.

In one embodiment, said steering electronically of the millimeter-wave beam 9-BM-1, 9-BM-2 toward the second spatial location 2-SL, is achieved using a beam steering technique comprising at least one of: (i) phased array beam steering, (ii) beam switching, and (iii) a combination of phased array beam steering and beam switching.

One embodiment is a millimeter-wave sub-system 4-sub operative to convert a first component into a node of a millimeter-wave network. The system includes: (i) a millimeter-wave communication component 9-mmv, (ii) a first antenna configuration 9-ant belonging to the millimeter-wave communication component 9-mmv, in which the millimeter-wave communication component is operative to steer a millimeter-wave beam 9-BM-1, 9-BM-2 via the first antenna configuration 9-ant, and (iii) a connector 8-con embedded in the millimeter-wave communication component 9-mmv, in which the connector is operative to mechanically fix the millimeter-wave communication component 9-mmv into a first enclosure 8-mcn housing a first component 9-cmp, and to electrically connect 8-el the millimeter-wave communication component 9-mmv to the first component 9-cmp. The millimeter-wave communication component 9-mmv is configured to receive, via the connector 8-con, electrical power from the first component 9-cmp. The millimeter-wave communication component 9-mmv, once receiving electrical power from the first component 9-cmp, is further configured to automatically steer (e.g., from direction 9-DR-1 to direction 9-DR-2) the millimeter-wave beam 9-BM-1, 9-BM-2 toward a first millimeter-wave node 5-mmn-1, thereby establishing a first communication link 9-lnk-1 between the millimeter-wave communication component 9-mmv and the first millimeter-wave node 5-mmn-1, in which said first communication link 9-lnk-1 belongs to a millimeter-wave network 9-mmv, 9-lnk-1, 5-mmn-1, and the millimeter-wave communication component 9-mmv is further configured to relay data, via the connector 8-con, between the millimeter-wave network and the first component 9-cmp, thereby making the first component an additional node of said millimeter-wave network.

In one embodiment, the first component 9-cmp is a street light operative to provide outdoor illumination, and said first communication link 9-lnk-1 is operative to facilitate control of the outdoor illumination.

In one embodiment, the first component 9-cmp is a traffic light or a traffic sign operative to provide traffic control, and said first communication link 9-lnk-1 is operative to facilitate control of the traffic light or the traffic sign.

In one embodiment, said first communication link 9-lnk-1 is operative to facilitate broadband communication between the first millimeter-wave node 5-mmn-1 and the millimeter-wave communication component 9-mmv. In one embodiment, the millimeter-wave communication component 9-mmv is further configured to automatically steer (e.g., from direction 9-DR-2 to direction 9-DR-3) the millimeter-wave beam 9-BM-2 or a different millimeter-wave beam 9-BM-3 toward a second millimeter-wave node 5-mmn-2, thereby establishing a second communication link 9-lnk-2 between the millimeter-wave communication component 9-mmv and the second millimeter-wave node 5-mmn-2. In one embodiment, the millimeter-wave communication component 9-mmv is further configured to relay said broadband communication between the first millimeter-wave node 5-mmn-1 and the second millimeter-wave node 5-mmn-2, using the first communication link 9-lnk-1 and the second communication link 9-lnk-2.

Figure 4A:
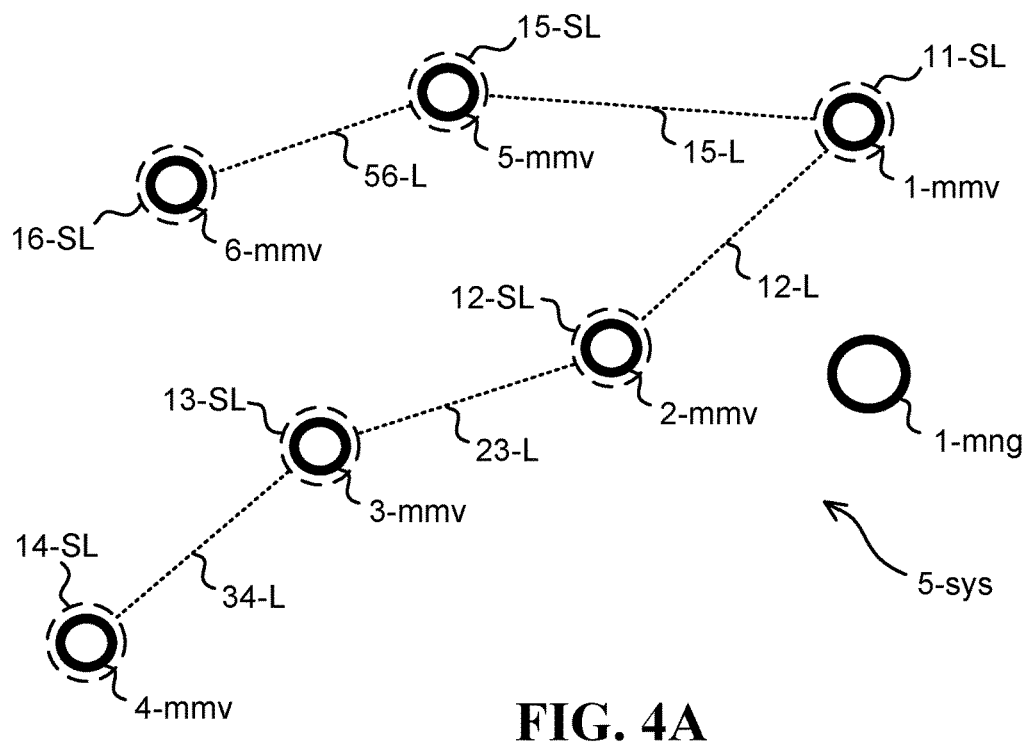
FIG. 4A illustrates one embodiment of a system operative to facilitate simultaneous millimeter-wave transmissions, in which a plurality of millimeter-wave communication nodes are arranged in a mesh topology or a tree topology, thereby forming a wireless mesh network, a wireless backhaul, or any kind of a wireless network operative to propagate data along or among the plurality of millimeter-wave communication nodes.

FIG. 4A illustrates one embodiment of a system 5-sys operative to facilitate simultaneous millimeter-wave transmissions, in which a plurality of millimeter-wave communication nodes 1-mmv, 2-mmv, 3-mmv, 4-mmv, 5-mmv, 6-mmv are arranged in a mesh topology or a tree topology, thereby forming a wireless mesh network, a wireless backhaul, or any kind of a wireless network operative to propagate data along or among the plurality of millimeter-wave communication nodes. The plurality of millimeter-wave communication nodes 1-mmv, 2-mmv, 3-mmv, 4-mmv, 5-mmv, 6-mmv are located respectively at a plurality of different locations 11-SL, 12-SL, 13-SL, 14-SL, 15-SL, 16-SL. Imaginary geometrical lines 12-L, 23-L, 34-L, 15-L, 56-L are shown, in which each imaginary geometrical line stretches between two of the millimeter-wave communication nodes. A management component 1-mng is shown as well. It is noted that a first non-straight path is formed 12-L, 23-L, 34-L by the combination of imaginary line 12-L, imaginary line 23-L, and imaginary line 34-L, and a second non-straight path is formed 15-L, 56-L by the combination of imaginary line 15-L and imaginary line 56-L.

Figure 4B:
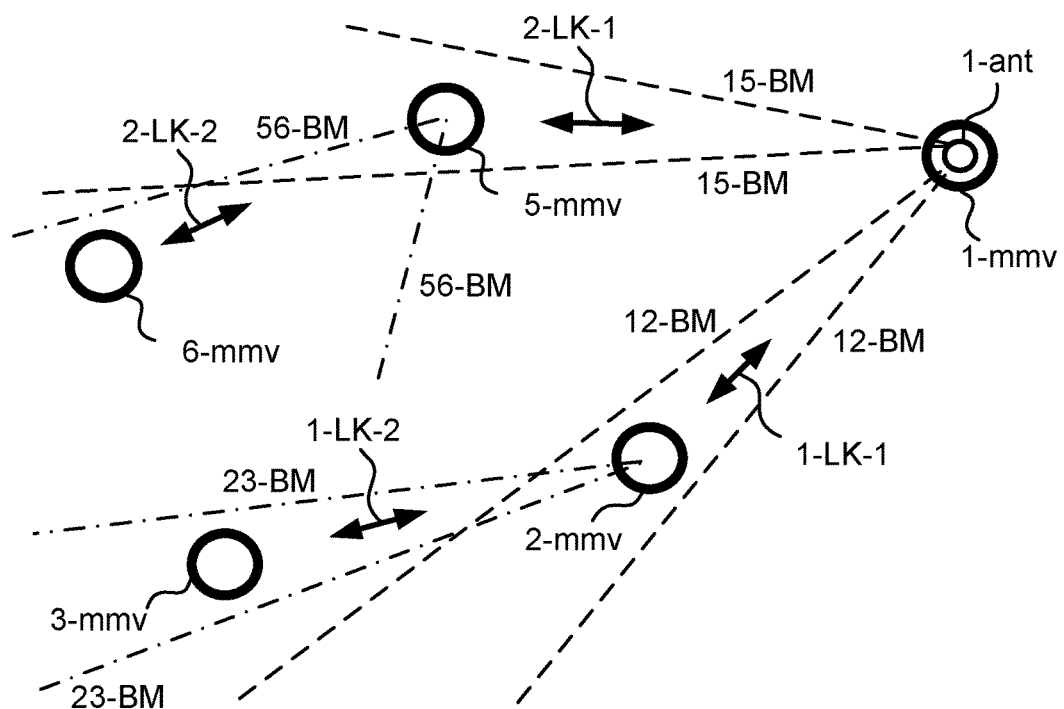
FIG. 4B illustrates one embodiment of the system operative to facilitate simultaneous millimeter-wave transmissions, in which millimeter-wave beams are electronically steered from at least some of the millimeter-wave communication nodes toward adjacent millimeter-wave communication nodes, thereby facilitating creation of communication links.

FIG. 4B illustrates one embodiment of the system 5-sys operative to facilitate simultaneous millimeter-wave transmissions 1-LK-1, 1-LK-2, 2-LK1, 2-LK-2, in which millimeter-wave beams 12-BM, 23-BM, 15-BM, 56-BM are electronically steered from at least some of the millimeter-wave communication nodes toward adjacent millimeter-wave communication nodes, thereby facilitating creation of communication links such as communication link 1-LK-1+ 1-LK-2 comprising millimeter-wave transmission 1-LK-1 and millimeter-wave transmission 1-LK-2, and communication link 2-LK-1+2-LK-2 comprising millimeter-wave transmission 2-LK-1 and millimeter-wave transmission 2-LK-2. As an example, millimeter-wave beams 12-BM is electronically steered from millimeter-wave communication node 1-mmv toward adjacent millimeter-wave communication node 2-mmv, millimeter-wave beam 23-BM is electronically steered from millimeter-wave communication node 2-mmv toward adjacent millimeter-wave communication node 3-mmv, millimeter-wave beam 15-BM is electronically steered from millimeter-wave communication node 1-mmv toward adjacent millimeter-wave communication node 5-mmv, and millimeter-wave beam 56-BM is electronically steered from millimeter-wave communication node 5-mmv toward adjacent millimeter-wave communication node 6-mmv. It is noted that millimeter-wave beam 12-BM from 1-mmv reaches 2-mmv, but misses the non-adjacent millimeter-wave communication node 3-mmv; this is done by design, and is possible because millimeter-wave beam 12-BM is narrow enough to miss 3-mmv and because, by design, nodes 1-mmv, 2-mmv, and 3-mmv may be selected from the plurality of nodes, or are otherwise placed in a specific way, so as to form the first non-straight path 12-L, 23-L, 34-L. The first non-straight path 12-L, 23-L, 34-L is "non-straight" in the sense that millimeter-wave beam 12-BM will miss 3-mmv when aimed at 2-mmv. Similarly, millimeter-wave beam 15-BM from 1-mmv reaches 5-mmv, but misses the non-adjacent millimeter-wave communication node 6-mmv. It is further noted that millimeter-wave communication node 1-mmv may electronically steers two different millimeter-wave beams 12-BM, 15-BM; this can be facilitated by millimeter-wave communication node 1-mmv actually being two separate nodes (not shown) located both at 11-SL, or by millimeter-wave communication node 1-mmv having two separate radios (not shown), or by millimeter-wave communication node 1-mmv performing a time division multiple access using the two different millimeter-wave beams 12-BM, 15-BM during different time slots.

Figure 4C:
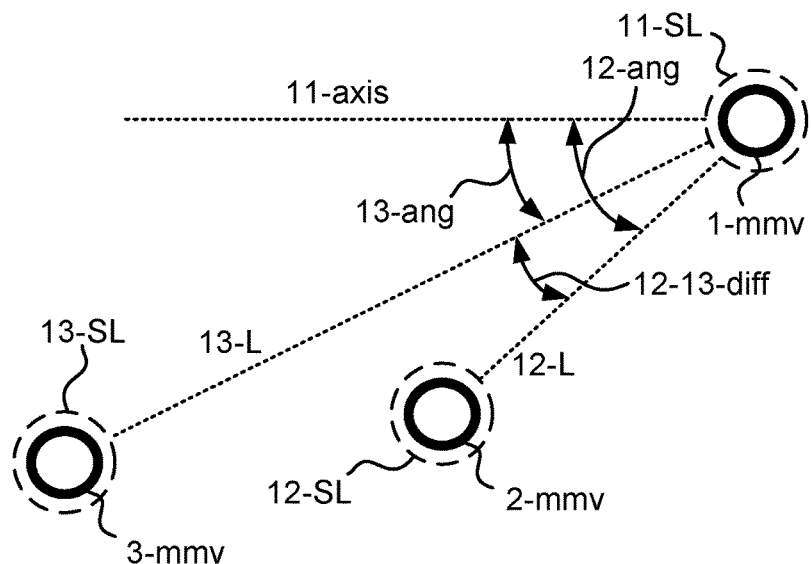
FIG. 4C illustrates one embodiment of some millimeter-wave communication nodes arranged in a given spatial configuration, thereby forming certain angular positions between some of the millimeter-wave communication nodes relative to a reference millimeter-wave communication node.

FIG. 4C illustrates one embodiment of some millimeter-wave communication nodes 1-mmv, 2-mmv, 3-mmv arranged in a given spatial configuration defined by the respective different locations 11-SL, 12-SL, 13-SL, thereby forming certain angular positions 12-ang, 13-ang between some of the millimeter-wave communication nodes 2-mmv, 3-mmv relative to a reference millimeter-wave communication node 1-mmv. Millimeter-wave communication node 2-mmv is located at a certain angular position 12-ang relative to Millimeter-wave communication node 1-mmv, which means that an angle 12-ang is formed between the imaginary geometrical line 12-L connecting the two nodes and another imaginary axis line 11-axis stretching from location 11-SL of node 1-mmv and acting as a reference axis for defining angular positions. Similarly, Millimeter-wave communication node 3-mmv is located at a certain different angular position 13-ang relative to Millimeter-wave communication node 1-mmv, which means that a different angle 13-ang is formed between the imaginary geometrical line 13-L (stretching from 1-mmv to 3-mmv) and imaginary axis line 11-axis. A particular angular difference 12-13-diff is measured between the certain angular position 12-ang and the certain different angular position 13-ang. The particular angular difference 12-13-diff exists by design, and is a direct consequence of the first non-straight path 12-L, 23-L, 34-L being "non-straight" by design.

Figure 4D:
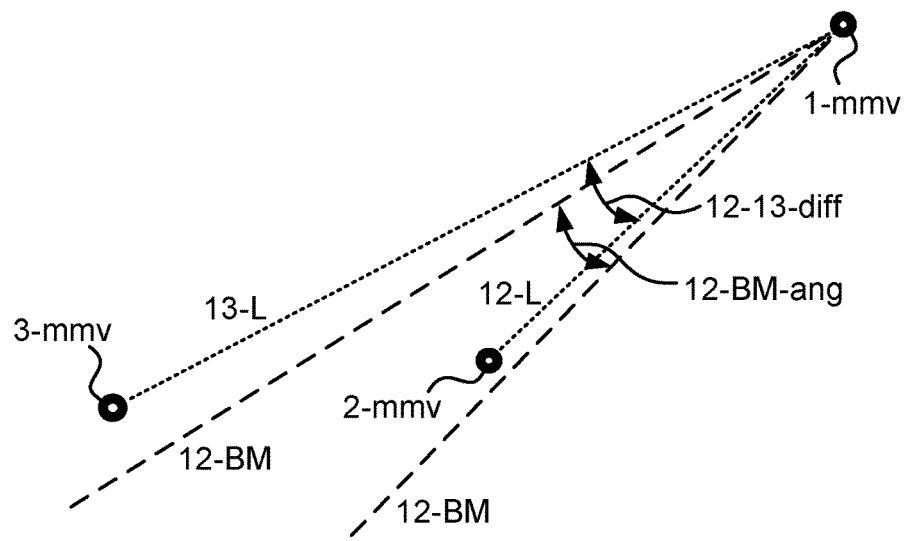
FIG. 4D illustrates one embodiment of a first millimeter-wave communication node electronically steering a millimeter-wave beam toward a second millimeter-wave communication node, in which the millimeter-wave beam in narrow enough so as to miss a third millimeter-wave communication node.

FIG. 4D illustrates one embodiment of a first millimeter-wave communication node 1-mmv electronically steering a millimeter-wave beam 12-BM toward a second millimeter-wave communication node 2-mmv, in which the millimeter-wave beam 12-BM in narrow enough 12-BM-ang so as to miss a third millimeter-wave communication node 3-mmv. Millimeter-wave beam 12-BM has a specific angular width 12-BM-ang which is narrower than the particular angular difference 12-13-diff, which means that millimeter-wave beam 12-BM is guaranteed to miss node 3-mmv when aimed at node 2-mmv, thereby qualifying millimeter-wave beam 12-BM as being "narrow enough". A typical millimeter-wave beam 12-BM has a specific angular width 12-BM-ang that is narrower than 4 (four) degrees, sometimes even narrower than 2 (two) degrees, but in most cases narrower than 6 (six) degrees, which qualifies the millimeter-wave beam 12-BM as being a "pencil beam"—a term associated particularly with millimeter-wave technology. Millimeter-wave beams are readily made "pencil beams" owing to the fact that millimeter-wave beams are typically associated with frequencies above 30 GHz, thus requiring a relatively small antenna size to produce narrow beams. The particular angular difference 12-13-diff must be wider than the specific angular width 12-BM-ang as explained above, but if the specific angular width 12-BM-ang is a "pencil beam", say narrower than four degrees, then the particular angular difference 12-13-diff is not required to be wider than four degrees, which means that although first non-straight path 12-L, 23-L, 34-L is required to be "non-straight", it could be made "almost straight" and still allow millimeter-wave beam 12-BM to hit node 2-mmv but miss node 3-mmv, and therefore allow certain deployments which would otherwise be essentially impossible. As an example, referring back to FIG. 1C, if we assume that target node 5-mmn-2 is millimeter-wave communication node 1-mmv, millimeter-wave communication component 9-mmv is millimeter-wave communication node 2-mmv, and target node 5-mmn-1 is millimeter-wave communication node 3-mmv, then it could be entirely possible for 5-mmn-2 to aim a pencil beam toward 9-mmv and still miss 5-mmn-1, since 5-mmn-1 is located 2-SL on a pole slightly below 5-mmn-2 which is located 3-SL on another pole and slightly below 9-mmv which is located 1-SL on yet another pole, even if all of the poles follow a straight contour of a typical street.

Figure 4E:
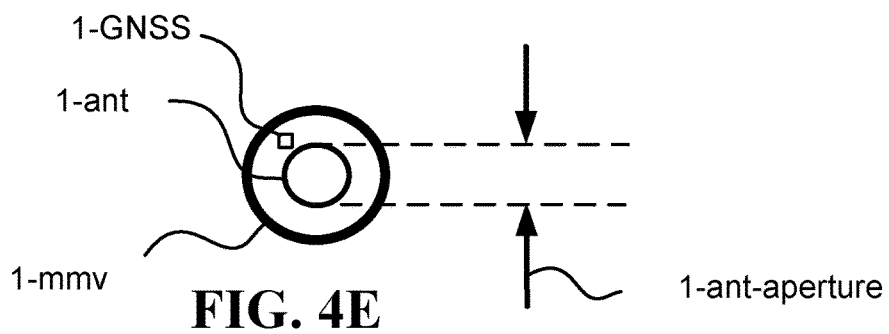
FIG. 4E illustrated one embodiment of a millimeter-wave communication node having an antenna configuration with an antenna aperture.

FIG. 4E illustrates one embodiment of a millimeter-wave communication node 1-mmv having an antenna configuration 1-ant with an antenna aperture 1-ant-aperture. The antenna configuration 1-ant is used to generate and electronically steer the millimeter-wave beam 12-BM. There is an immediate and reverse correlation between the specific angular width 12-BM-ang of the millimeter-wave beam 12-BM and the antenna aperture 1-ant-aperture: the larger the antenna aperture, the narrower the resulting specific angular width 12-BM-ang. Therefore, in order to produce a "pencil beam", the antenna aperture 1-ant-aperture would have to be larger than a certain size. Assuming that the millimeter-wave beam 12-BM is at frequency band between 50 GHz and 70 GHz, then a pencil beam could be generated by a circular-shaped antenna configuration 1-ant provided that antenna aperture 1-ant-aperture is larger than 100 millimeters in diameter. Other antenna shapes are possible, such as rectangular-shaped antenna. It is noted that a millimeter-wave communication node 1-mmv could maintain compact dimensions and weight when the antenna aperture 1-ant-aperture has a diameter of between 100 millimeter and 200 millimeter. Typically, such compact dimensions would involve volumes below 5 liters and weights below 5 kilograms. Highly compact dimensions would involve volumes below 2 liters and weights below 2 kilograms, but would result in slightly wider specific angular width 12-BM-ang such as six degrees. A global-navigation-satellite-system (GNSS) receiver 1-GNSS, such as a global-positioning-system (GPS) receiver, is shown and is used to determined location 11-SL.

One embodiment is a system 5-sys operative to facilitate simultaneous millimeter-wave transmissions. The system 5-sys includes: (i) a first millimeter-wave communication node 1-mmv located at a first location 11-SL and operative to electronically steer a millimeter-wave beam 12-BM having a specific angular width 12-BM-ang, (ii) a second millimeter-wave communication node 2-mmv located at a second location 12-SL and operative to generate a millimeter-wave emission 23-BM, in which the second location 12-SL is situated at a certain angular position 12-ang relative to the first location 11-SL, and (iii) a third millimeter-wave communication node 3-mmv located at a third location 13-SL, in which the third location 13-SL is situated at a certain different angular position 13-ang relative to the first location 11-SL, such that a particular angular difference 12-13-diff is formed between the certain angular position 12-ang and the certain different angular position 13-ang.

In one embodiment of system 5-sys: (i) the first millimeter-wave communication node 1-mmv is configured to electronically steer the millimeter-wave beam 12-BM toward the second millimeter-wave communication node 2-mmv, thereby facilitating a first data transmission 1-LK-1 between the first millimeter-wave communication node 1-mmv and the second millimeter-wave communication node 2-mmv via the millimeter-wave beam 12-BM, and (ii) the specific angular width 12-BM-ang is smaller than the particular angular difference 12-13-diff, thereby significantly reducing presence of the millimeter-wave beam 12-BM at the third location 13-SL, thereby allowing the second millimeter-wave communication node 2-mmv, simultaneously with the first data transmission 1-LK-1, to send a second data transmission 1-LK-2 to the third millimeter-wave communication node 3-mmv via the millimeter-wave emission 23-BM.

In one embodiment, the millimeter-wave beam 12-BM and the millimeter-wave emission 23-BM at least partially overlap in frequency and share a common polarization or at least a common polarization component.

In one embodiment, the millimeter-wave beam 12-BM is at a frequency above 30 GHz, and the specific angular width 12-BM-ang is therefore capable of reaching below five degrees.

In one embodiment, the millimeter-wave beam 12-BM is at frequency band between 50 GHz and 70 GHz, the first millimeter-wave communication node 1-mmv comprises an antenna configuration 1-ant operative to generate and electronically steer the millimeter-wave beam 12-BM, and said antenna configuration 1-ant has an antenna aperture 1-ant-aperture having a diameter of between 100 millimeter and 200 millimeter, or any equivalently sized antenna aperture, thereby: (i) resulting, in conjunction with the frequency band, in the specific angular width 12-BM-ang being below four degrees, (ii) allowing the first millimeter-wave communication node 1-mmv to maintain compact dimensions associated with and dictated by the antenna aperture 1-ant-aperture, and (iii) allowing the particular angular difference 12-13-diff to be as narrow as four degrees, thereby contributing to added flexibility in selecting the first, second, and third millimeter-wave communication nodes 1-mmv, 2-mmv, 3-mmv out of a plurality of millimeter-wave communication nodes 1-mmv, 2-mmv, 3-mmv, 4-mmv, 5-mmv, 6-mmv while still maintaining the compact dimensions.

In one embodiment, the millimeter-wave beam 12-BM is at frequency band between 50 GHz and 70 GHz, the first millimeter-wave communication node 1-mmv comprises an antenna configuration 1-ant operative to generate and electronically steer the millimeter-wave beam 12-BM, and said antenna configuration 1-ant has an antenna aperture 1-ant-aperture having a diameter of between 60 millimeter and 100 millimeter, or any equivalently sized antenna aperture, thereby: (i) resulting, in conjunction with the frequency band, in the specific angular width 12-BM-ang being below six degrees, (ii) allowing the first millimeter-wave communication node 1-mmv to maintain highly compact dimensions associated with and dictated by the antenna aperture 1-ant-aperture, and (iii) allowing the particular angular difference 12-13-diff to be as narrow as six degrees, thereby contributing to flexibility in selecting the first, second, and third millimeter-wave communication nodes 1-mmv, 2-mmv, 3-mmv out of a plurality of millimeter-wave communication nodes 1-mmv, 2-mmv, 3-mmv, 4-mmv, 5-mmv, 6-mmv while still maintaining the highly compact dimensions.

Figure 5:
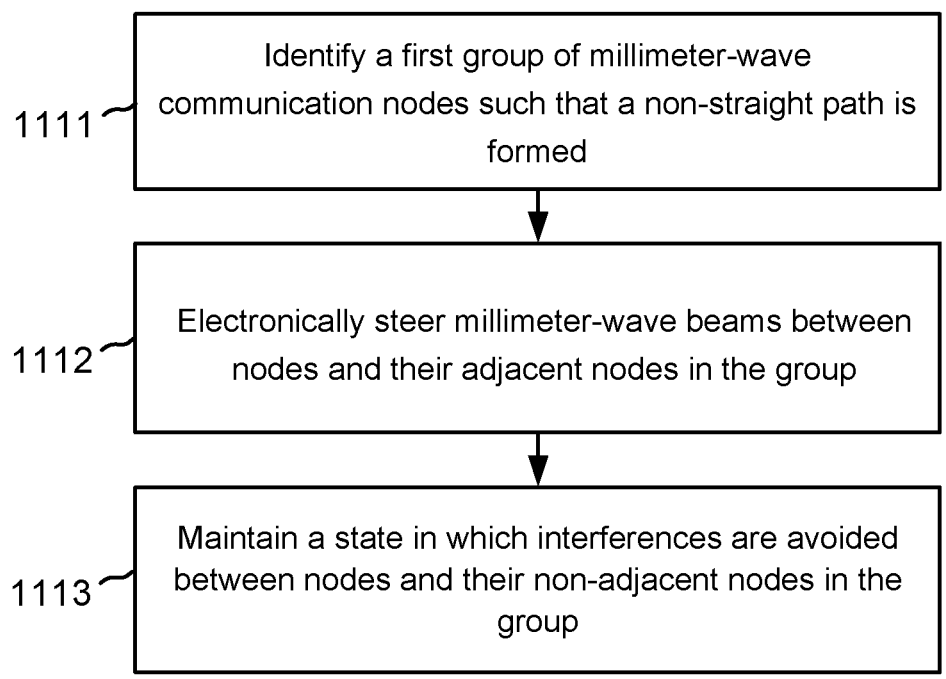
FIG. 5 illustrates one embodiment of a method for facilitating simultaneous millimeter-wave transmissions.

FIG. 5 illustrates one embodiment of method for facilitating simultaneous millimeter-wave transmissions. the method includes: In step 1111, identifying, by a management component 1-mng, out of a plurality of millimeter-wave communication nodes 1-mmv, 2-mmv, 3-mmv, 4-mmv, 5-mmv, 6-mmv located respectively at a plurality of different locations 11-SL, 12-SL, 13-SL, 14-SL, 15-SL, 16-SL, a first group of at least three millimeter-wave communication nodes 1-mmv, 2-mmv, 3-mmv, 4-mmv, such that when geometrically interconnecting the locations 11-SL, 12-SL, 13-SL, 14-SL of the at least three 1-mmv, 2-mmv, 3-mmv, 4-mmv millimeter-wave communication nodes, a first non-straight path is formed 12-L, 23-L, 34-L. In step 1112, creating, by the management component 1-mng, a first communication link 1-LK-1+1-LK-2 having a first frequency in conjunction with the first group, by instructing each of the at least three millimeter-wave communication nodes 1-mmv, 2-mmv, 3-mmv, 4-mmv to electronically steer a millimeter-wave beam 12-BM, 23-BM toward adjacent millimeter-wave communication nodes in the first non-straight path 12-L, 23-L, 34-L. In step 1113, maintaining a state in which non-adjacent millimeter-wave communication nodes 1-mmv, 3-mmv in the first non-straight path do not interfere with one another as a result of the first non-straight path being "non-straight", even though operating in the same first frequency. It is noted that the term "adjacent millimeter-wave communication nodes" means nodes that are neighbors in the context of traversing the non-straight path 12-L, 23-L, 34-L. For example, when traversing the first non-straight path 12-L, 23-L, 34-L from right to left, node 1-mmv is encountered first, then node 2-mmv, then node 3-mmv, and finally node 4-mmv is encountered, which means that: node 1-mmv is adjacent to node 2-mmv, node 2-mmv is adjacent to both nodes 1-mmv and node 3-mmv, node 3-mmv is adjacent to both nodes 2-mmv and node 4-mmv, and node 4-mmv is adjacent to node 3-mmv. It is noted that the term "non-adjacent millimeter-wave communication nodes" means nodes that are not neighbors in the context of traversing the non-straight path 12-L, 23-L, 34-L. For example, in the context of non-straight path 12-L, 23-L, 34-L, node 1-mmv is non-adjacent to nodes 3-mmv and 4-mmv, node 2-mmv is non-adjacent to node 4-mmv, node 3-mmv is non-adjacent to node 1-mmv, and node 4-mmv is non-adjacent to nodes 1-mmv and 2-mmv. Stating that two nodes are "adjacent" does not necessarily imply any particular distance between the two, and it could very well be that a distance between adjacent nodes is greater than a distance between non-adjacent nodes, which can typically happen when the non-straight path 12-L, 23-L, 34-L is characterized by steep angles.

In one embodiment, the method for facilitating simultaneous millimeter-wave transmissions further includes: operating a second group of millimeter-wave communication nodes 1-mmv, 5-mmv, 6-mmv, using a second frequency, such that the first communication link 1-LK-1+1-LK-2 does not interfere with the millimeter-wave communication nodes of the second group.

in one embodiment, said operating the second group of millimeter-wave communication nodes comprises: identifying, by the management component 1-mng, out of the plurality of millimeter-wave communication nodes 1-mmv, 2-mmv, 3-mmv, 4-mmv, 5-mmv, 6-mmv, the second group of at least three millimeter-wave communication nodes 1-mmv, 5-mmv, 6-mmv, such that when geometrically interconnecting the locations 11-SL, 15-SL, 16-SL of the at least three millimeter-wave communication nodes of the second group, a second non-straight path is formed 15-L, 56-L; and creating, by the management component 1-mng, a second communication link 2-LK-1+2-LK-2 having a second frequency in conjunction with the second group, by instructing each of the at least three millimeter-wave communication nodes 1-mmv, 5-mmv, 6-mmv of the second group to electronically steer a millimeter-wave beam 15-BM, 56-BM toward adjacent millimeter-wave communication nodes in the second non-straight path 15-L, 56-L, such that non-adjacent millimeter-wave communication nodes 1-mmv, 6-mmv in the second non-straight path do not interfere with one another even though operating in the same second frequency.

In one embodiment, said identification is achieved by analyzing relative angular positions 12-ang, 13-ang between different pairs of locations in the plurality of different locations 11-SL, 12-SL, 13-SL, 14-SL, 15-SL, 16-SL, thereby reaching said conclusion that when geometrically interconnecting the locations of the at least three millimeter-wave communication nodes 1-mmv, 2-mmv, 3-mmv, 4-mmv, a first non-straight path 12-L, 23-L, 34-L is formed.

In one embodiment, the plurality of different locations 11-SL, 12-SL, 13-SL, 14-SL, 15-SL, 16-SL is determined by a procedure in which each of the millimeter-wave communication nodes 1-mmv, 2-mmv, 3-mmv, 4-mmv, 5-mmv, 6-mmv reports to the management component 1-mng the respective different location.

In one embodiment, the plurality of different locations 11-SL, 12-SL, 13-SL, 14-SL, 15-SL, 16-SL is measured respectively in the plurality of millimeter-wave communication nodes 1-mmv, 2-mmv, 3-mmv, 4-mmv, 5-mmv, 6-mmv using respectively a plurality of global-navigation-satellite-system (GNSS) receivers 1-GNSS.

In one embodiment, said identification is achieved by executing, in the management component 1-mng, a directional scanning procedure in conjunction with the plurality of millimeter-wave communication nodes, in which the directional scanning procedure comprises:
selecting, out of a plurality of millimeter-wave communication nodes 1-mmv, 2-mmv, 3-mmv, 4-mmv, 5-mmv, 6-mmv, a potential group of at least three millimeter-wave communication nodes 1-mmv, 2-mmv, 3-mmv, 4-mmv;
commanding the first of the three millimeter-wave communication nodes selected 1-mmv to electronically steer a test millimeter-wave beam 12-BM toward a second of the three millimeter-wave communication nodes selected 2-mmv; and commanding the third of the three millimeter-wave communication nodes selected 3-mmv to try and receive the test millimeter-wave beam 12-BM, in which a failure to receive the test millimeter-wave beam is an indication that when geometrically interconnecting the locations of the at least three millimeter-wave communication nodes selected 1-mmv, 2-mmv, 3-mmv, 4-mmv, a non-straight path 12-L, 23-L, 34-L will be formed, and thereby concluding that the potential group of at least three millimeter-wave communication nodes 1-mmv, 2-mmv, 3-mmv, 4-mmv is to become the first group.

In one embodiment, said non-adjacent millimeter-wave communication nodes 1-mmv, 3-mmv in the first non-straight path 12-L, 23-L, 34-L do not interfere with one another as a result of the millimeter-wave beams 12-BM having a specific angular width 12-BM-ang which is sufficiently narrow such as to cause a transmission (e.g., 1-LK-1), made by any of the millimeter-wave communication nodes (e.g., 1-mmv) and directed to any adjacent millimeter-wave communication node (e.g., 2-mmv), to miss all non-adjacent millimeter-wave communication nodes (e.g., miss 3-mmv).

In one embodiment, said specific angular width 12-BM-ang is smaller than an angular difference 12-13-diff between (i) a line 12-L connecting the location 11-SL of a first of the millimeter-wave communication nodes 1-mmv to a location 12-SL of an adjacent millimeter-wave communication node 2-mmv and (ii) another line 13-L connecting the location 11-SL of this first millimeter-wave communication node 1-mmv to the location 13-SL of a non-adjacent millimeter-wave communication node 3-mmv, and therefore said specific angular width 12-BM-ang is qualified as being sufficiently narrow.

Figure 6A:
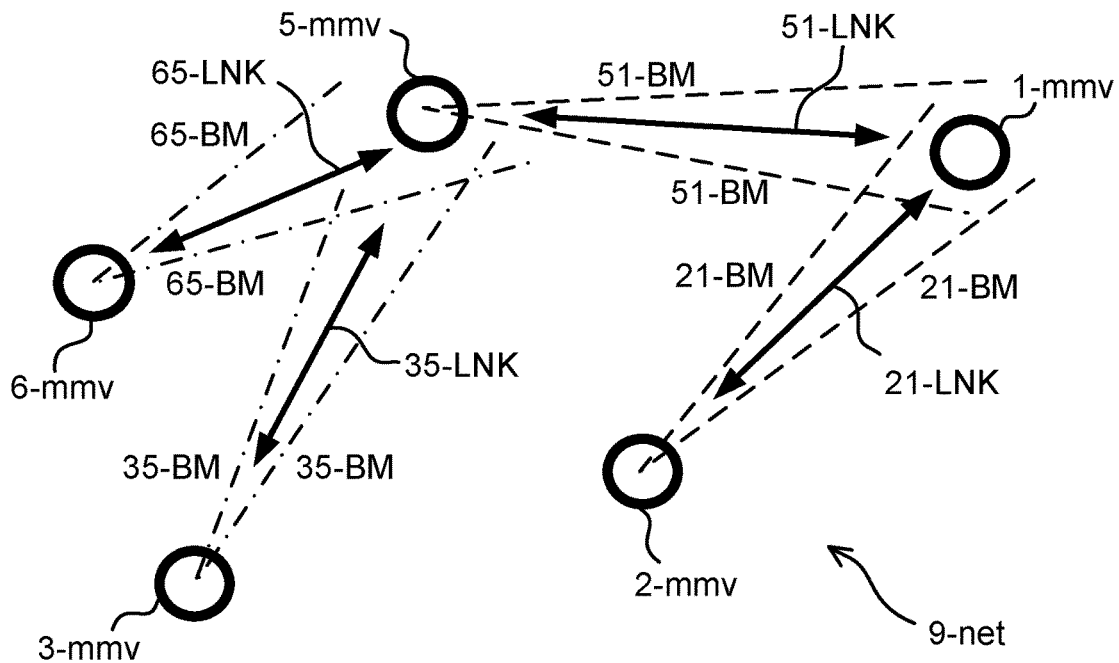
FIG. 6A illustrates one embodiment of a network of millimeter-wave communication nodes currently arranged according to a first network topology.

FIG. 6A illustrates one embodiment of a network of millimeter-wave communication nodes currently arranged according to a first network topology. The network 9-net of millimeter-wave communication nodes 1-mmv, 2-mmv, 3-mmv, 5-mmv, 6-mmv may be connected in many ways to form many network topologies. One such possible way of connecting the network is described here. Each of the nodes connects to at least one of the other nodes during formation of the network: Millimeter-wave node 6-mmv electronically steers a millimeter-wave beam 65-BM toward Millimeter-wave node 5-mmv, and then a communication link 65-LNK is established between the nodes 6-mmv, 5-mmv via beam 65-BM, through which data is transported between the nodes. Millimeter-wave node 3-mmv electronically steers a millimeter-wave beam 35-BM toward Millimeter-wave node 5-mmv, and then a communication link 35-LNK is established between the nodes 3-mmv, 5-mmv via beam 35-BM, through which data is transported between the nodes. Millimeter-wave node 5-mmv electronically steers a millimeter-wave beam 51-BM toward Millimeter-wave node 1-mmv, and then a communication link 51-LNK is established between the nodes 5-mmv, 1-mmv via beam 51-BM, through which data is transported between the nodes. Millimeter-wave node 2-mmv electronically steers a millimeter-wave beam 21-BM toward Millimeter-wave node 1-mmv, and then a communication link 21-LNK is established between the nodes 2-mmv, 1-mmv via beam 21-BM, through which data is transported between the nodes.

After the network 9-net is established as described, data can now flow along the communication links. Data may be originated at mode 6-mmv, sent over link 65-LNK via beam 65-BM to node 5-mmv, and then sent by node 5-mmv over link 51-LNK via beam 51-BM to node 1-mmv. Data may be originated at mode 3-mmv, sent over link 35-LNK via beam 35-BM to node 5-mmv, and then sent by node 5-mmv over link 51-LNK via beam 51-BM to node 1-mmv. Data may also be originated at mode 2-mmv, and sent over link 21-LNK via beam 21-BM to node 1-mmv. Data may also flow from node 1-mmv toward the other nodes, and this requires a reverse set of beams not illustrated here, i.e., a beam electronically steered from node 1-mmv to node 5-mmv, and beams electronically steered from node 5-mmv to nodes 3-mmv and 6-mmv.

Electronically steering each of the millimeter-wave beams may be achieved using different techniques such as beam switching and by means of phased arrays, all of which can be applied in millimeter-wave frequencies of between 30 GHz and 300 GHz. It is noted that due to the high frequencies associated with millimeter-waves, one must use narrow beams in order to facilitate useful communication between the nodes 1-mmv, 2-mmv, 3-mmv, 5-mmv, 6-mmv, so that aiming the different beams to the correct location of the destination nodes must be done somehow. Aiming of the beams could be done mechanically by manually rotating a directional antenna to the right direction, but this is incompatible with the various embodiments described next, at least because a fast and synchronous beam steering is required from the different millimeter-wave nodes, and such fast and synchronous beam steering can only be achieved by means of electronically steering the beams.

Figure 6B:
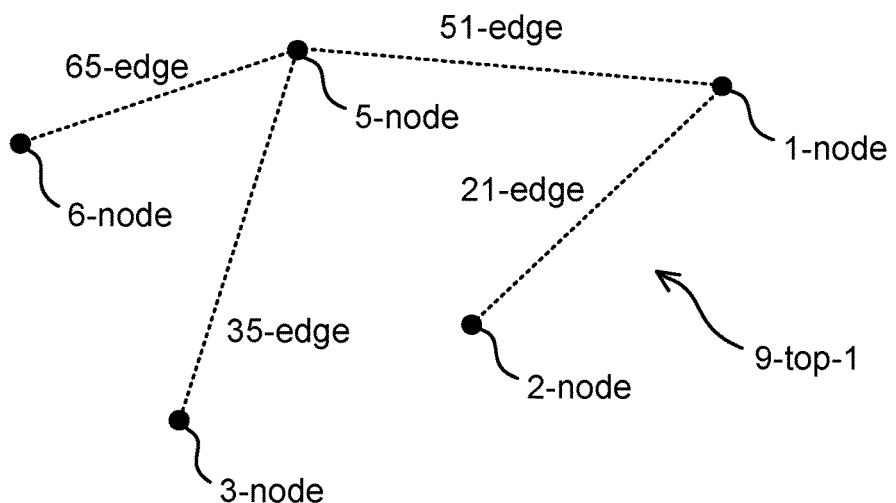
FIG. 6B illustrates one embodiment of the first network topology.

FIG. 6B illustrates one embodiment of the first network topology 9-top-1 according to which network 9-net is arranged. Graph nodes 1-node, 2-node, 3-node, 5-node, 6-node correspond respectively to millimeter wave nodes 1-mmv, 2-mmv, 3-mmv, 5-mmv, 6-mmv, and graph edges 35-edge, 65-edge, 51-edge, 21-edge correspond respectively to millimeter-wave links 35-LNK, 65-LNK, 51-LNK, 21-LNK.

Figure 6C:
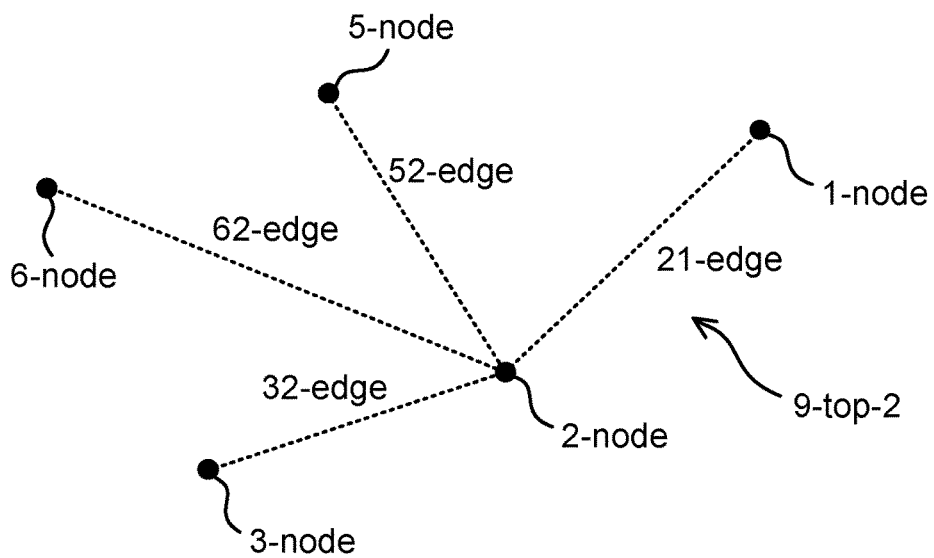
FIG. 6C illustrates one embodiment of a second network topology.

FIG. 6C illustrates one embodiment of a second network topology 9-top-2 according to which network 9-net could be arranged when the first network topology 9-top-1 is no longer capable of supporting data flow among the nodes. According to the second network topology 9-top-2, the same graph nodes 1-node, 2-node, 3-node, 5-node, 6-node still appear and still correspond respectively to the same millimeter wave nodes 1-mmv, 2-mmv, 3-mmv, 5-mmv, 6-mmv, but the connectivity of the nodes is different now: 5-node is now connected with 2-node via 52-edge, 6-node is now connected with 2-node via 62-edge, 3-node is now connected with 2-node via 32-edge, and 2-node is now connected with 1-node via edge 21-edge. When comparing the second network topology 9-top-2 with the first network topology 9-top-1, it is noted that 5-node is no longer directly connected to 1-node, and it is now only 2-node that is directly connect to 1-node, so that 5-node has to connect with 2-node in order to reach 1-node. It is also noted that although 6-node and 3-node could have stayed connected to 5-node and then reach 1-node via 2-node, they are now connected directly to 2-node instead, perhaps because reaching 1-node directly via 2-node is shorter (two hops) than reaching 1-node via 5-node and 2-node (three hops). The reason for switching between the first network topology 9-top-1 and the second network topology 9-top-2 may be related to some kind or a problem preventing proper operation of link 51-LNK, which requires a different, but still efficient, connectivity of the nodes without involving link 51-LNK (corresponding to the elimination of graph edge 51-edge).

Figure 6D:
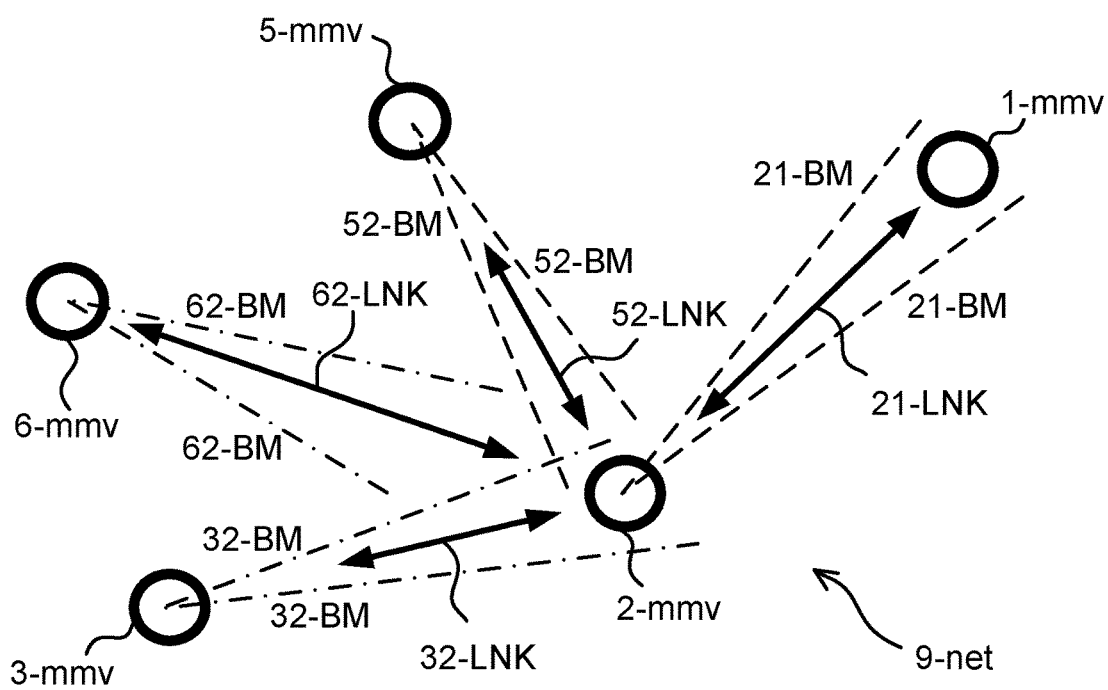
FIG. 6D illustrates one embodiment of the network of millimeter-wave communication nodes now arranged according to the second network topology.

FIG. 6D illustrates one embodiment of the network 9-net of millimeter-wave communication nodes now arranged according to the second network topology 9-top-2. Millimeter-wave node 3-mmv, acting to realize the new graph edge 32-edge, electronically steers a millimeter-wave beam 32-BM toward Millimeter-wave node 2-mmv, and then a communication link 32-LNK is established between the nodes 3-mmv, 2-mmv via beam 32-BM. Millimeter-wave node 6-mmv, acting to realize the new graph edge 62-edge, electronically steers a millimeter-wave beam 62-BM toward Millimeter-wave node 2-mmv, and then a communication link 62-LNK is established between the nodes 6-mmv, 2-mmv via beam 62-BM. Millimeter-wave node 5-mmv, acting to realize the new graph edge 52-edge, electronically steers a millimeter-wave beam 52-BM toward Millimeter-wave node 2-mmv, and then a communication link 52-LNK is established between the nodes 5-mmv, 2-mmv via beam 52-BM. Millimeter-wave node 2-mmv does not need to change link 21-LNK and beam 21-BM, since the graph edge 21-edge is common to both network topologies 9-top-1 and 9-top-2. The transition between network topology 9-top-1 and network topology 9-top-2, as described above, which includes many actions including the electronically steering of many millimeter-wave beams, is done during a period of time that is sufficiently short so as to not adversely affect ongoing communication. Such short period of time can be engineered to be shorter than the time needed for a single packet of data to be transported over one of the links, or can be engineered to be shorter than the average time between two successive packets of data, or can be engineered to be shorter than the time it takes for a Transmission Control Protocol (TCP) session to tear down. In most cases, the short period of time can be as long as 100 milliseconds and still not adversely affect real-time protocols such as Voice Over IP (VoIP), and could sometimes be as long as one second if hard real-time requirement are not needed. In any case, it is clear that the only way such short periods of time could be achieved is by synchronizing all of the above actions and using fast responding electronically steered millimeter-wave beams.

Figure 6E:
FIG. 6E illustrates one embodiment of a management component associated with the network of millimeter-wave communication nodes.

FIG. 6E illustrates one embodiment of a management component 9-MNG associated with the network 9-net of millimeter-wave communication nodes. The management component 9-MNG can have several functions, which include the identification of a need to switch between two network topologies, the determination of a new network topology that could resolve a given problem, and the control over millimeter-wave communication nodes in the network 9-net. The management component 9-MNG is in communicative contact with the millimeter-wave communication nodes in the network 9-net, possibly via the network itself, and is capable of receiving telemetry from the different nodes regarding various parameters related to the communication links and millimeter-wave beams. Further, the management component 9-MNG may decide to switch between two network topologies as a result of the telemetry received, and based on said decision, to command and synchronize the various nodes before and during the switching process.

Figure 6F:
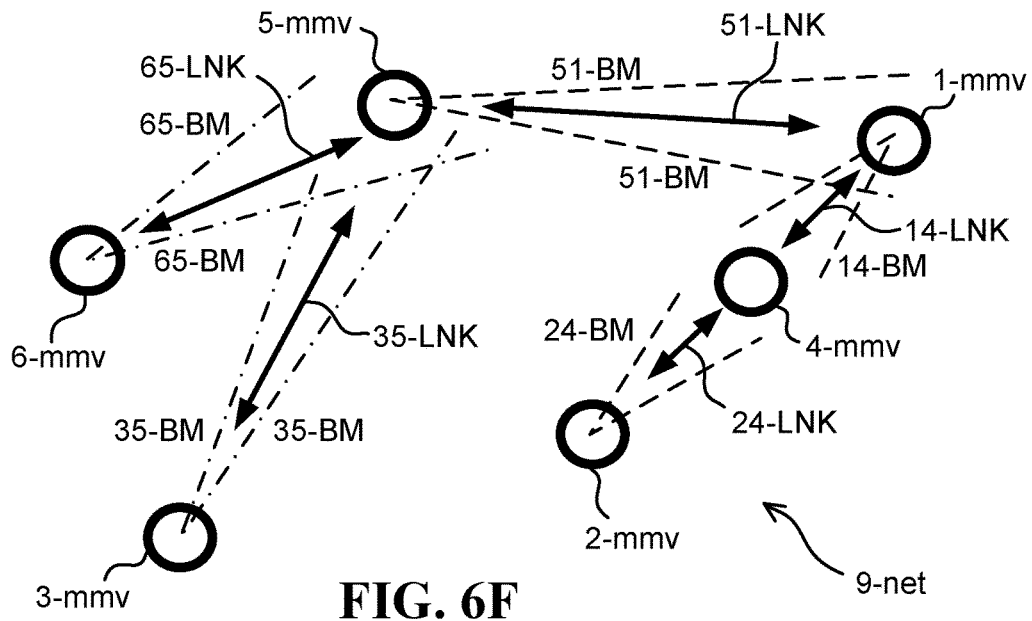
FIG. 6F illustrates one embodiment of the network of millimeter-wave communication nodes, in which a new millimeter-wave communication node has been added.

FIG. 6F illustrates one embodiment of the network 9-net of millimeter-wave communication nodes, in which a new millimeter-wave communication node 4-mmv has been added. When a new millimeter-wave communication node 4-mmv is made available for inclusion in the original network 9-net of FIG. 6A, a decision has to be made, possibly by the management component 9-MNG, as to the new topology that accommodates such inclusion. In the above example of adding node 4-mmv, the new network topology is selected to be the network topology 9-top-3 illustrated in FIG. 6G, in which 9-top-3 replaces 9-top-1, and in which the new millimeter-wave communication node 4-mmv, corresponding to graph node 4-node in 9-top-3, is inserted between 1-node and 2-node (corresponding to 1-mmv and 2-mmv respectively). After selection of network topology 9-top-3, the following process takes place in conjunction with a synchronized and fast transition between network topology 9-top-1 and network topology 9-top-3: 1-mmv is instructed to disengage 21-LNK, electronically steer the respective millimeter-wave beam 21-BM away from 1-mmv and toward 4-mmv (thereby becoming 24-BM), and engage a new millimeter-wave link 24-LNK with 4-mmv; 1-mmv is instructed to disengage 21-LNK, electronically steer the respective millimeter-wave beam (not shown) away from 2-mmv and toward 4-mmv (thereby becoming 14-BM), and engage a new millimeter-wave link 14-LNK with 4-mmv. Node 4-mmv may also be instructed to electronically steer millimeter-wave beams (not shown) toward 2-mmv and 1-mmv. The transition between network topology 9-top-1 and network topology 9-top-3, as described above, which includes many actions including the electronically steering of many millimeter-wave beams, is done during a period of time that is sufficiently short so as to not adversely affect ongoing communication, in accordance with some embodiments.

Figure 6G:
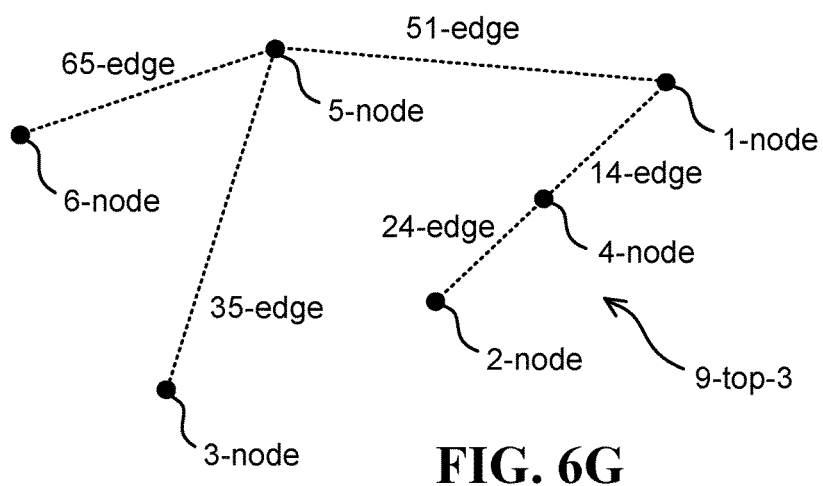
FIG. 6G illustrates one embodiment of a network topology corresponding to the network of millimeter-wave communication nodes now including the newly added millimeter-wave communication node.

FIG. 6G illustrates one embodiment of a network topology 9-top-3 corresponding to the network 9-net of millimeter-wave communication nodes now including the newly added millimeter-wave communication node 4-mmv. Graph nodes 1-node, 2-node, 3-node, 4-node, 5-node, 6-node correspond respectively to millimeter wave nodes 1-mmv, 2-mmv, 3-mmv, 4-mmv, 5-mmv, 6-mmv, and graph edges 35-edge, 65-edge, 51-edge, 24-edge, 14-edge correspond respectively to millimeter-wave links 35-LNK, 65-LNK, 51-LNK, 24-LNK, 14-LNK.

Figure 6H:
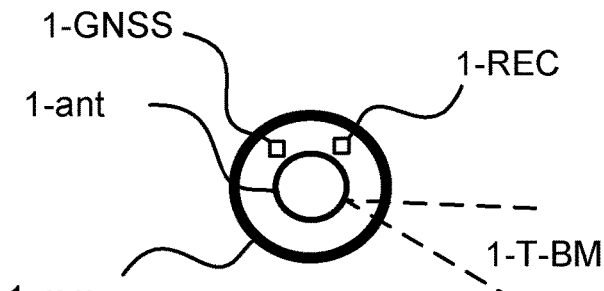
FIG. 6H illustrates one embodiment of a millimeter-wave communication node.

FIG. 6H illustrates one embodiment of a millimeter-wave communication node. Millimeter-wave communication node 1-mmv is illustrated as an example, but this example may be extended to all of the nodes of network 9-net. Millimeter-wave communication node 1-mmv includes an antenna configuration 1-ant, in which the antenna configuration is any combination of any type of antenna/s and related circuitry operative to facilitate electronically steering of millimeter-wave beams. For example, antenna configuration 1-ant may be a phased array sub-system including a matrix of many wide-angle millimeter-wave antennas controlled by a phase shifting mechanism operative to electronically steer a millimeter-wave beam by controlling phase differences between different signals feeding the matrix of wide-angle antennas, or 1-ant may possibly be a beam switching sub-system including many directional millimeter-wave antennas directed in many different direction and a related circuitry operative to activate one or more of the directional millimeter-wave antennas at any given time, or 1-ant may even be a millimeter-wave lens sub-system including many millimeter-wave radiating sources placed on different locations on a focal plane of the millimeter-wave lens and operative to be electronically switched according to desired direction of the beam. Millimeter-wave communication node 1-mmv further includes a data record 1-REC operative to store information needed by the antenna configuration 1-ant to electronically steer a millimeter-wave beam toward a specific set of directions. For example, data record 1-REC may store several sets of phase differences, in which each of the sets of phase differences is operative to cause a phased array sub-system (1-ant) to transmit a millimeter-wave beam toward a specific direction which may be the direction of one of the neighboring millimeter-wave communication node. Millimeter-wave communication node 1-mmv may construct the data record 1-REC in several ways. One of the ways for constructing data record 1-REC may be by electronically steering a test millimeter-wave beam 1-T-BM toward different directions until reaching one specific neighboring nodes, in which the parameters associated with the test beam at the time of reaching the specific neighboring node are recorded in data record 1-REC for future use, in which the future use may be associated with a future instruction to direct a beam toward this specific neighboring node in conjunction with a switch between two network topologies in accordance with some embodiments. Another way for constructing data record 1-REC may be by using a global-navigation-satellite-system (GNSS), such as a global-positioning-system (GPS), in which a GNSS receiver 1-GNSS on each of the nodes determines the position of the node, so that relative directions between all pairs of nodes can be established and then used to calculate, rather than test and find, the parameters needed by data records such as 1-REC.

One embodiment is a system operative to adapt a network of millimeter-wave communication nodes in response to a changing condition. The system includes: (i) a plurality of millimeter-wave communication nodes 1-mmv, 2-mmv, 3-mmv, 5-mmv, 6-mmv located respectively at a plurality of different location, and (ii) a plurality of millimeter-wave links 35-LNK, 65-LNK, 51-LNK, 21-LNK, in which each of the millimeter-wave links communicatively connects specific two of the plurality of millimeter-wave communication nodes (e.g., 35-LNK connects 3-mmv and 5-mmv, 65-LNK connects 6-mmv and 5-mmv, 51-LNK connects 5-mmv and 1-mmv, and 21-LNK connects 2-mmv and 1-mmv), thereby forming a communication network 9-net having a certain current network topology 9-top-1, in which each of the millimeter-wave links is formed by at least one of the millimeter-wave communication nodes electronically steering a millimeter-wave beam toward another of the millimeter-wave communication nodes (e.g., millimeter-wave beam 65-BM is steered by 6-mmv toward 5-mmv thereby forming 65-LNK, millimeter-wave beam 35-BM is steered by 3-mmv toward 5-mmv thereby forming 35-LNK, millimeter-wave beam 51-BM is steered by 5-mmv toward 1-mmv thereby forming 51-LNK, and millimeter-wave beam 21-BM is steered by 2-mmv toward 1-mmv thereby forming 21-LNK).

In one embodiment, the system is configured to: (i) detect a change in a condition associated with the communication network 9-net, in which said change requires a transition from the certain current network topology 9-top-1 to a new network topology 9-top-2, (ii) select the new network topology 9-top-2, and (iii) perform said transition, by instructing each of at least two of the millimeter-wave communication nodes (e.g., 5-mmv, 6-mmv, 3-mmv) to: disengage the respective millimeter-wave link, electronically steer the respective millimeter-wave beam away from current bearing and toward one of the millimeter-wave communication nodes specifically identified, and engage a new millimeter-wave link therewith. For example, as a result of a problem in millimeter-wave link 51-LNK, the following takes place in conjunction with a transition from 9-top-1 to 9-top-2: (i) 5-mmv is instructed to: disengage 51-LNK, electronically steer the respective millimeter-wave beam 51-BM away from 1-mmv and toward 2-mmv (thereby becoming 52-BM), and engage a new millimeter-wave link 52-LNK with 2-mmv, (ii) 6-mmv is instructed to: disengage 65-LNK, electronically steer the respective millimeter-wave beam 65-BM away from 5-mmv and toward 2-mmv (thereby becoming 62-BM), and engage a new millimeter-wave link 62-LNK with 2-mmv, and (iii) 3-mmv is instructed to: disengage 35-LNK, electronically steer the respective millimeter-wave beam 35-BM away from 5-mmv and toward 2-mmv (thereby becoming 32-BM), and engage a new millimeter-wave link 32-LNK with 2-mmv.

In one embodiment, the system further includes a management component 9-MNG operative to: (i) determine, based on the new network topology 9-top-2, which of the plurality of millimeter-wave communication nodes 1-mmv, 2-mmv, 3-mmv, 5-mmv, 6-mmv are the at least two of the millimeter-wave communication nodes (e.g., 5-mmv, 6-mmv, 3-mmv) to be involved in said transition, and (ii) issue said instruction to each of at least two of the millimeter-wave communication nodes determined.

In one embodiment, the management component 9-MNG is further operative to determine which specific two of the plurality of millimeter-wave communication nodes 1-mmv, 2-mmv, 3-mmv, 5-mmv, 6-mmv forms a particular one of the millimeter-wave links 35-LNK, 65-LNK, 51-LNK, 21-LNK, thereby establishing said certain current network topology 9-top-1 prior to said transition.

In one embodiment, said detection of a change in a condition associated with the communication network is a detection of a communication problem associated with at least one of the millimeter-wave links in the certain current network topology (e.g., a problem associated with millimeter-wave link 51-LNK in 9-top-1), in which the new network topology 9-top-2 does not include said at least one millimeter-wave link (e.g., link 51-LNK) having the communication problem.

In one embodiment, the communication problem comprises at least one of: (i) fading of the millimeter-wave link (e.g., link 51-LNK), in which the fading is associated with a weather condition such as rain, (ii) fading of the millimeter-wave link, in which the fading is associated with a physical obstruction such as an object currently blocking the millimeter-wave link, (iii) a malfunction in one of the millimeter-wave communication nodes associated with the millimeter-wave link (e.g., a malfunction in 5-mmv associated with link 51-LNK), and (iv) an electromagnetic interference affecting the millimeter-wave link.

In one embodiment, said detection of a change in a condition associated with the communication network is a detection of a communication performance issue associated with the certain current network topology 9-top-1, in which the new network topology 9-top-2 at least partially resolves said communication performance issue.

In one embodiment, the communication performance issue comprises at least one of: (i) a latency issue associated with transporting data sets across the certain current network topology 9-top-1 or among the millimeter-wave communication nodes thereof, (ii) a throughput issue associated with transporting data sets across the certain current network topology 9-top-1 or among the millimeter-wave communication nodes thereof, and (iii) a packet loss issue associated with transporting data sets across the certain current network topology 9-top-1 or among the millimeter-wave communication nodes thereof.

In one embodiment, said transition from the certain current network topology 9-top-1 to a new network topology 9-top-2 is done synchronously in conjunction with the at least two millimeter-wave communication nodes (e.g., 5-mmv, 6-mmv, 3-mmv).

In one embodiment, said synchronicity is achieved in conjunction with said transition being completed in less than a certain period of time, such that said transition from the certain current network topology 9-top-1 to the new network topology 9-top-2 appears to be instantaneous.

In one embodiment, the certain period of time is 100 (one hundred) milliseconds.

In one embodiment, the certain period of time is the time needed to transport a single packet of data over one of the millimeter-wave links.

In one embodiment, the certain period of time is the time it takes for a transmission-control-protocol (TCP) session to tear down.

In one embodiment, said synchronicity is achieved in conjunction with each of said instructions being sent to the respective millimeter-wave communication node essentially instantaneously, such that all the instructions are sent within a certain period of time.

In one embodiment, said synchronicity is achieved by ordering all of the relevant millimeter-wave communication nodes (e.g., 5-mmv, 6-mmv, 3-mmv) to start the transition at a predetermined time, in which the millimeter-wave communication nodes are time-synchronized using a global-navigation-satellite-system (GNSS) 1-GNSS such as a global-positioning-system (GPS), or using a time-synchronizing network protocol such as Network Time Protocol (NTP) or IEEE 1588 Precision Time Protocol (PTP), or using any other means to synchronize time among different nodes.

In one embodiment, said electronically steering, of each of the millimeter-wave beams, toward the respective one of the millimeter-wave communication nodes specifically identified, is achieved by using a data record (e.g., 1-REC) operative to inform the respective millimeter-wave communication node (e.g., 1-mmv) regarding a state, of an associated antenna configuration (e.g., 1-ant), which is needed to achieve said steering and cause the millimeter-wave beam (e.g., 14-BM) to reach the respective millimeter-wave communication node specifically identified (e.g., 4-mmv).

In one embodiment, said state, which is needed to achieve said steering and said reach, is determined using a spatial analysis of the different location that are gathered in conjunction with the millimeter-wave communication nodes 1-mmv, 2-mmv, 3-mmv, 5-mmv, 6-mmv using a global-navigation-satellite-system (GNSS) (e.g., 1-GNSS) such as a global-positioning-system (GPS).

In one embodiment, said state, which is needed to achieve said steering and said reach, is determined using a procedure, which is carried out prior to said detection, in which said procedure comprises steering a test millimeter-wave beam 1-T-BM toward different directions, until reaching a neighbor millimeter-wave communication node.

Figure 7:
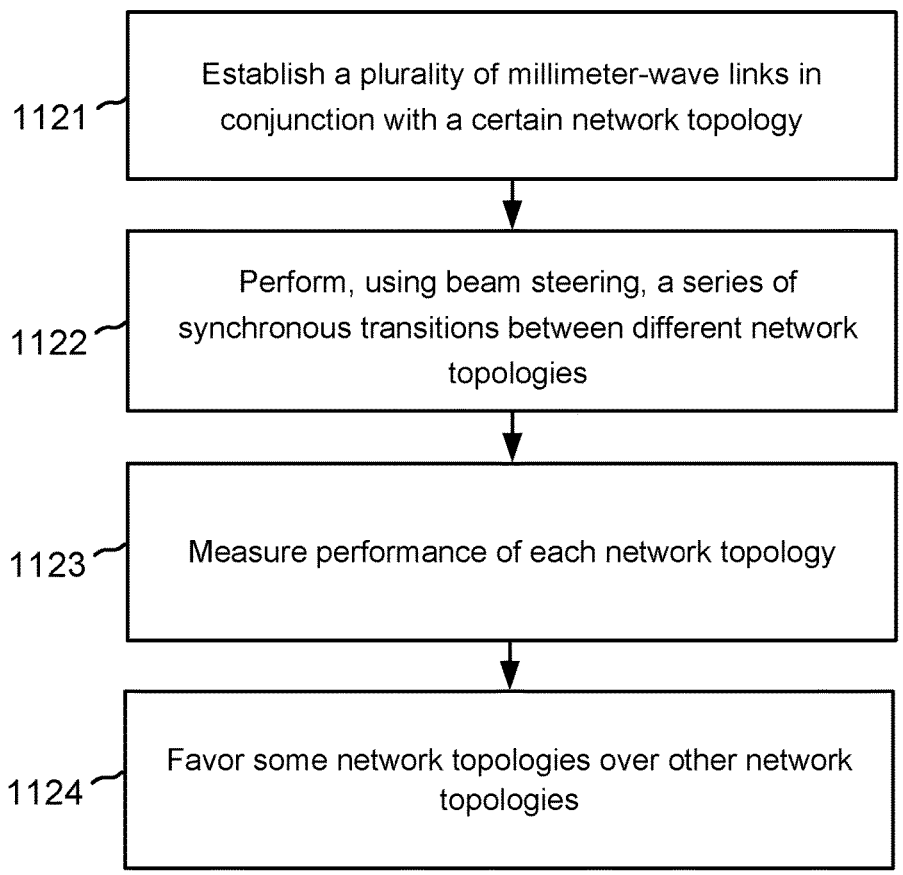
FIG. 7 illustrates one embodiment of a method for adapting a network of millimeter-wave communication nodes.

FIG. 7 illustrates one embodiment of a method for adapting a network of millimeter-wave communication nodes. The method includes:

In step 1121, establishing, in conjunction with a plurality of millimeter-wave communication nodes 1-mmv, 2-mmv, 3-mmv, 5-mmv, 6-mmv located respectively at a plurality of different location, a plurality of millimeter-wave links 35-LNK, 65-LNK, 51-LNK, 21-LNK, in which each of the millimeter-wave links communicatively connects specific two of the plurality of millimeter-wave communication nodes (e.g., 35-LNK connects 3-mmv and 5-mmv, 65-LNK connects 6-mmv and 5-mmv, 51-LNK connects 5-mmv and 1-mmv, and 21-LNK connects 2-mmv and 1-mmv), thereby forming a communication network 9-net having a certain network topology 9-top-1, in which each of the millimeter-wave links is formed by at least one of the millimeter-wave communication nodes electronically steering a millimeter-wave beam toward another of the millimeter-wave communication nodes (e.g., millimeter-wave beam 65-BM is steered by 6-mmv toward 5-mmv thereby forming 65-LNK, millimeter-wave beam 35-BM is steered by 3-mmv toward 5-mmv thereby forming 35-LNK, millimeter-wave beam 51-BM is steered by 5-mmv toward 1-mmv thereby forming 51-LNK, and millimeter-wave beam 21-BM is steered by 2-mmv toward 1-mmv thereby forming 21-LNK).

In step 1122, performing, in conjunction with the communication network, a series of synchronous transitions between different network topologies 9-top-1, 9-top-2 comprising the certain network topology 9-top-1, in which each of the synchronous transitions comprises instructing at least some of the millimeter-wave communication nodes to disengage the respective millimeter-wave link and establish a new millimeter-wave link instead. For example, the following takes place in conjunction with a synchronous transition from 9-top-1 to 9-top-2: 5-mmv is instructed to disengage 51-LNK, electronically steer the respective millimeter-wave beam 51-BM away from 1-mmv and toward 2-mmv (thereby becoming 52-BM), and engage a new millimeter-wave link 52-LNK with 2-mmv; 6-mmv is instructed to disengage 65-LNK, electronically steer the respective millimeter-wave beam 65-BM away from 5-mmv and toward 2-mmv (thereby becoming 62-BM), and engage a new millimeter-wave link 62-LNK with 2-mmv; and 3-mmv is instructed to disengage 35-LNK, electronically steer the respective millimeter-wave beam 35-BM away from 5-mmv and toward 2-mmv (thereby becoming 32-BM), and engage a new millimeter-wave link 32-LNK with 2-mmv.

In step 1123, measuring network performance of each of the different network topologies 9-top-1, 9-top-2.

In step 1124, favoring specific network topologies, out of the different network topologies, based on the measurements, thereby adapting the communication network 9-net to better perform.

In one embodiment, at least some of the transitions into the respective network topologies are done for a short period of time that is just long enough to carry out the respective measurements before transitioning back or forth into another of the network topologies.

In one embodiment, at least some of the synchronous transitions are done periodically and for the purpose of transporting data sets across the communication network.

One embodiment is a system operative to adapt a network of millimeter-wave communication nodes in response to a changing condition. The system includes: (i) a plurality of millimeter-wave communication nodes 1-mmv, 2-mmv, 3-mmv, 5-mmv, 6-mmv located respectively at a plurality of different location, (ii) a plurality of millimeter-wave links 35-LNK, 65-LNK, 51-LNK, 21-LNK, in which each of the millimeter-wave links communicatively connects specific two of the plurality of millimeter-wave communication nodes (e.g., 35-LNK connects 3-mmv and 5-mmv, 65-LNK connects 6-mmv and 5-mmv, 51-LNK connects 5-mmv and 1-mmv, and 21-LNK connects 2-mmv and 1-mmv), thereby forming a communication network 9-net having a certain current network topology 9-top-1, in which each of the millimeter-wave links is formed by at least one of the millimeter-wave communication nodes electronically steering a millimeter-wave beam toward another of the millimeter-wave communication nodes (e.g., millimeter-wave beam 65-BM is steered by 6-mmv toward 5-mmv thereby forming 65-LNK, millimeter-wave beam 35-BM is steered by 3-mmv toward 5-mmv thereby forming 35-LNK, millimeter-wave beam 51-BM is steered by 5-mmv toward 1-mmv thereby forming 51-LNK, and millimeter-wave beam 21-BM is steered by 2-mmv toward 1-mmv thereby forming 21-LNK). Further, the system is configured to: (i) detect a change in a condition associated with the communication network 9-net, in which said change requires a transition from the certain current network topology 9-top-1 to a new network topology 9-top-3 (FIG. 6G), (ii) select the new network topology 9-top-3, and (iii) perform said transition, by instructing each of at least two of the millimeter-wave communication nodes (e.g., 1-mmv, 2-mmv) to: disengage the respective millimeter-wave link, electronically steer the respective millimeter-wave beam away from current bearing and toward one of the millimeter-wave communication nodes specifically identified, and engage a new millimeter-wave link therewith. For example, as a result of adding a new node 4-mmv (FIG. 6F) to the system, the following takes place in conjunction with a transition from 9-top-1 to 9-top-3: 1-mmv is instructed to disengage 21-LNK, electronically steer the respective millimeter-wave beam 21-BM away from 1-mmv and toward 4-mmv (thereby becoming 24-BM), and engage a new millimeter-wave link 24-LNK with 4-mmv; 1-mmv is instructed to disengage 21-LNK, electronically steer the respective millimeter-wave beam (not shown) away from 2-mmv and toward 4-mmv (thereby becoming 14-BM), and engage a new millimeter-wave link 14-LNK with 4-mmv.

In one embodiment, said detection of a change in a condition associated with the communication network is a detection of a condition in which one of the millimeter-wave communication nodes (4-mmv, FIG. 6F) is a new millimeter-wave communication node that has been just made available to the system, and is to be incorporated in the system as a functioning millimeter-wave communication node, in which the new millimeter-wave communication node 4-mmv is the millimeter-wave communication node that was specifically identified.

In one embodiment, said selection of the new network topology (referring now to 9-top-3, FIG. 6G as the new network topology to replace 9-top-1) is made such that the new network topology 9-top-3 incorporates the new millimeter-wave communication node 4-mmv, in which the new millimeter-wave communication node 4-mmv is now connected via two of the new millimeter-wave links 24-LNK, 14-LNK respectively to two of the millimeter-wave communication nodes 2-mmv, 1-mmv that were previously connected directly by a link 21-LNK (FIG. 6A) that was disengaged during said transition.

Figure 8A:
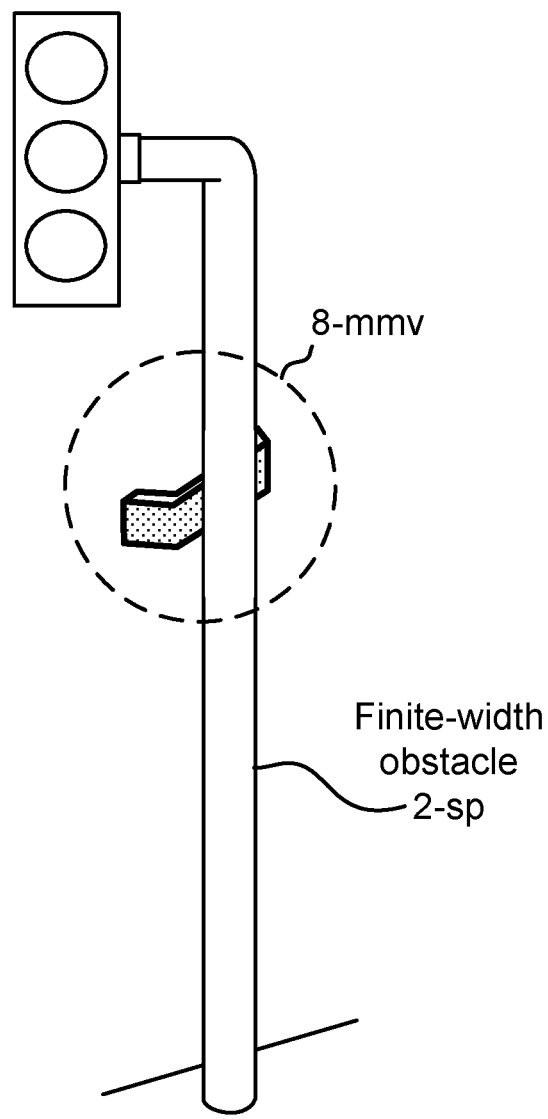
FIG. 8A illustrates one embodiment of a millimeter-wave communication component mounted on a pole that constitutes a finite-width obstacle for propagating millimeter-waves.

FIG. 8A illustrates one embodiment of a millimeter-wave communication component 8-mmv mounted on a pole 2-sp that constitutes a finite-width obstacle for propagating millimeter-waves. Millimeter-wave communication component 8-mmv is mounted on a finite-width obstacle 2-sp, such as a street pole. The millimeter-wave communication component 8-mmv may be any one of: a millimeter-wave mesh node operative to communicate using millimeter-waves with other millimeter-wave communication components, or a backhaul node delivering data to elements in a communication network, or even a millimeter-wave access node in accordance with some standards such as 5th generation mobile networks/systems (5G) and related standards, in which millimeter-waves may be used to access a wireless client device directly, thereby forming a radio access network (RAN). The finite-width obstacle 2-sp is shown as a pole of some sort, but it could also be any finite-width obstacle potentially blocking millimeter-waves from propagating toward certain directions relative to the millimeter-wave communication component 8-mmv, such as a part of a wall, or even a tree brunch. The finite-width obstacle 2-sp is shown to be vertical, but it could also be horizontal.

Figure 8B:
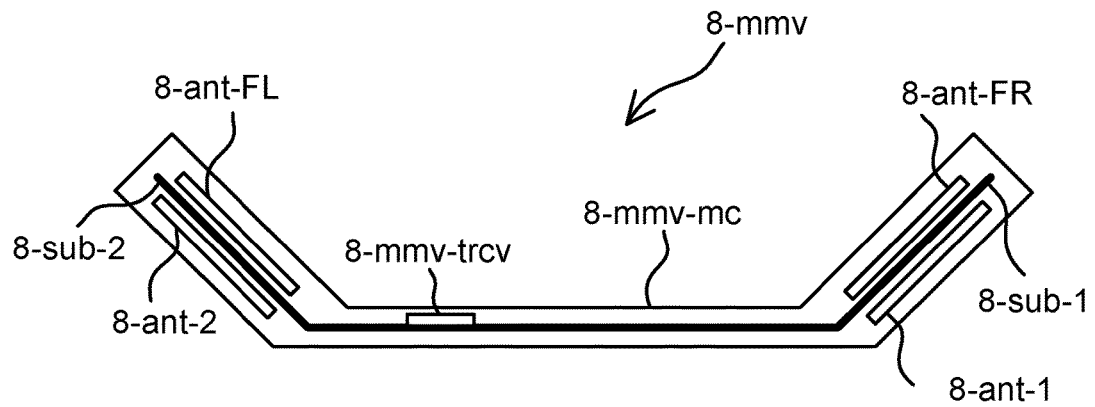
FIG. 8B illustrates one embodiment of the millimeter-wave communication component with several millimeter-wave antennas and other components embedded inside a single chassis.

FIG. 8B illustrates one embodiment of the millimeter-wave communication component 8-mmv with several millimeter-wave antennas and other components embedded inside a single chassis. Four millimeter-wave antennas 8-ant-1, 8-ant-2, 8-ant-FR, 8-ant-FL are shown as a non-limiting example. Each of the millimeter-wave antennas is pointing to a different direction. Each of the millimeter-wave antennas may generate a fixed radiation pattern, or it may be of a phased array type or a beam switching type operative to steer or switch electronically a millimeter-wave beam into a plurality of directions. A millimeter-wave transceiver 8-mmv-trcv is operative to generate and receive millimeter-waves in conjunction with the millimeter-wave antennas 8-ant-1, 8-ant-2, 8-ant-FR, 8-ant-FL, in which the millimeter-wave communication component 8-mmv may include a single millimeter-wave transceiver 8-mmv-trcv, or it may include a dedicated millimeter-wave transceiver per each of the millimeter-wave antennas. A substrate 8-sub-1, 8-sub-2 is shown, in which the millimeter-wave antennas 8-ant-1, 8-ant-2, 8-ant-FR, 8-ant-FL may be placed on the substrate. The substrate 8-sub-1, 8-sub-2 may be a single substrate, or several substrates. The substrate 8-sub-1, 8-sub-2 may take the form of a printed circuit board (PCB), or it may be a low temperature co-fired ceramics (LTCC), or any other surface capable of carrying the millimeter-wave antennas. The millimeter-wave antennas 8-ant-1, 8-ant-2, 8-ant-FR, 8-ant-FL, the millimeter-wave transceiver 8-mmv-trcv, and the substrate 8-sub-1, 8-sub-2 are all contained in a single mechanical casing 8-mmv-mc, thereby constituting a single rigid mechanical element.

Figure 8C:
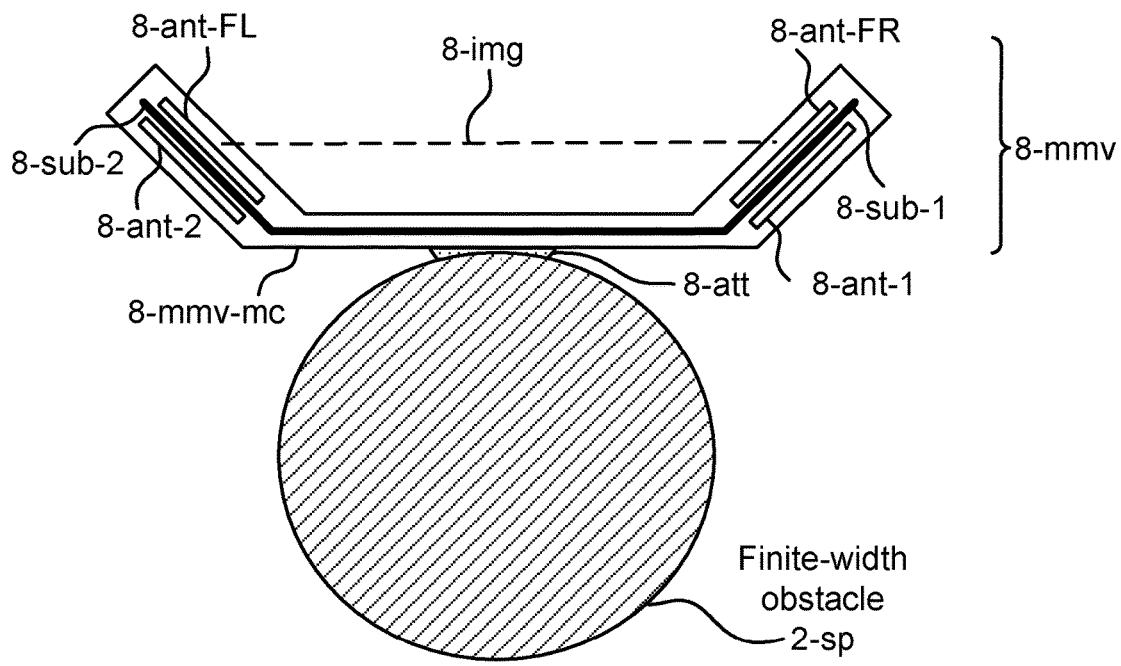
FIG. 8C illustrates one embodiment of the millimeter-wave communication component mounted on the finite-width obstacle with the different millimeter-wave antennas arranged in a certain way relative to the finite-width obstacle.

FIG. 8C illustrates one embodiment of the millimeter-wave communication component 8-mmv mounted on the finite-width obstacle 2-sp with the different millimeter-wave antennas 8-ant-1, 8-ant-2, 8-ant-FR, 8-ant-FL arranged in a certain way relative to the finite-width obstacle. In some embodiments, the finite-width obstacle 2-sp is clear of an imaginary geometrical line 8-img connecting two of millimeter-wave antennas 8-ant-1, 8-ant-2, thereby signifying that the two of millimeter-wave antennas 8-ant-1, 8-ant-2 are located in front of the finite-width obstacle 2-sp. In some embodiments, the entire millimeter-wave communication component 8-mmv is located in front of the finite-width obstacle 2-sp. The millimeter-wave communication component 8-mmv is attached 8-att to the finite-width obstacle 2-sp as a single rigid mechanical element, thereby simplifying installation of the millimeter-wave communication component in conjunction with the finite-width obstacle. The finite-width obstacle 2-sp is shown to have a circular-shaped cross-section, but it could have any cross-section shape, including rectangular-shaped, or even an irregularly shaped cross-section.

Figure 8D:
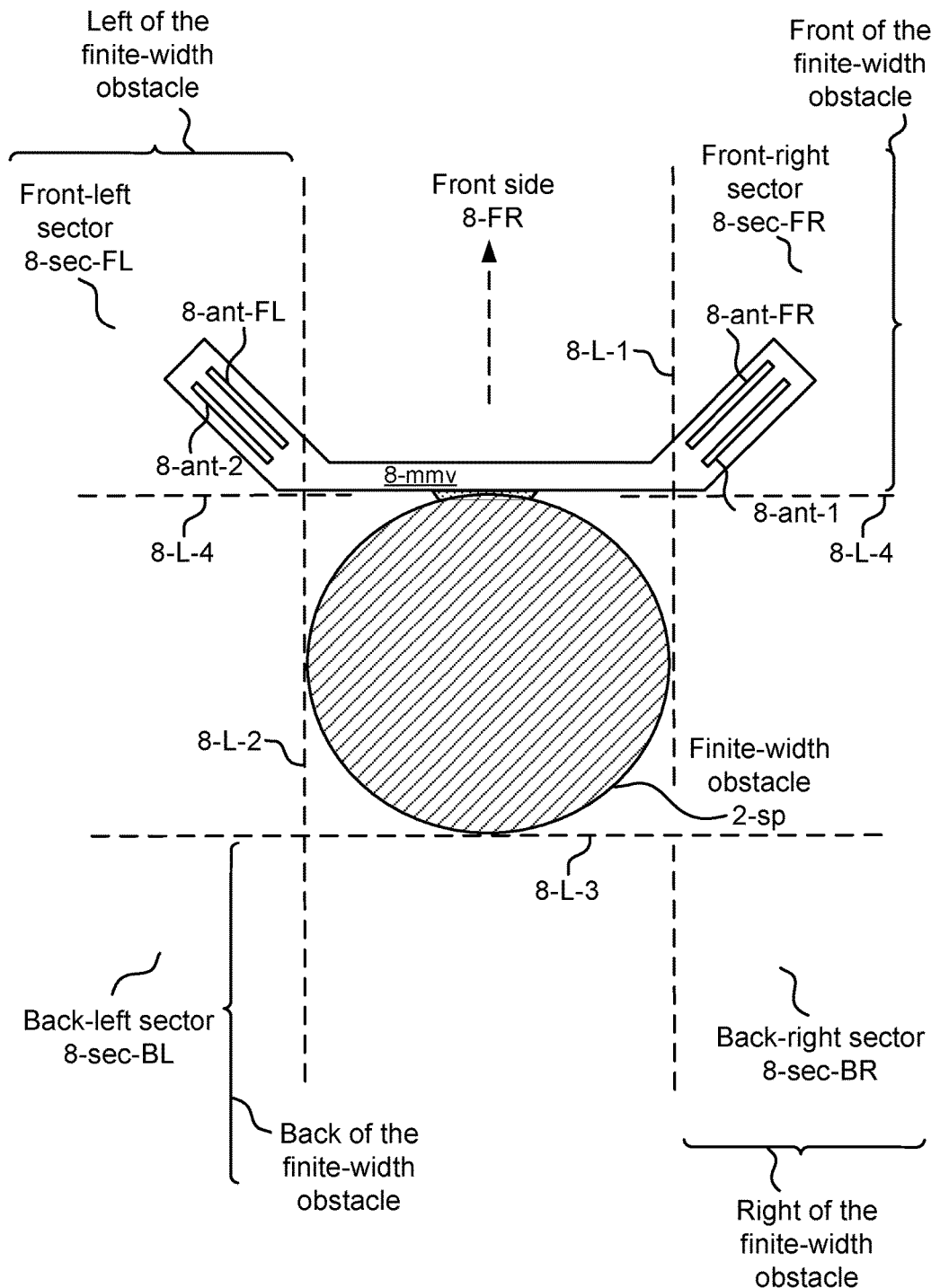
FIG. 8D illustrates one embodiment of the millimeter-wave communication component mounted on the finite-width obstacle, in which the surrounding of the finite-width obstacle is partitioned into several sides.

FIG. 8D illustrates one embodiment of the millimeter-wave communication component 8-mmv mounted on the finite-width obstacle 2-sp, in which the surrounding of the finite-width obstacle is partitioned into several sides/quadrants. An arrow 8-FR points to the front of the finite-width obstacle 2-sp, such that any object located above the imaginary line 8-L-4 is said to be located in front (or to the front) of the finite-width obstacle 2-sp. Any object located below the imaginary line 8-L-3 is said to be located to the back of the finite-width obstacle 2-sp. Any object located to the right of the imaginary line 8-L-1 is said to be located to the right of the finite-width obstacle 2-sp. Any object located to the left of the imaginary line 8-L-2 is said to be located to the left of the finite-width obstacle 2-sp. Accordingly, four sectors (or quadrants) are identified: a front-right sector 8-sec-FR located to the right and to the front of the finite-width obstacle 2-sp, a front-left sector 8-sec-FL located to the left and to the front of the finite-width obstacle 2-sp, a back-left sector 8-sec-BL located to the left and to the back of the finite-width obstacle 2-sp, and a back-right sector 8-sec-BR located to the right and to the back of the finite-width obstacle 2-sp. In some embodiments, millimeter-wave antenna 8-ant-1 is located in the front-right sector 8-sec-FR, and millimeter-wave antenna 8-ant-2 is located in the front-left sector 8-sec-FL. This specific placement has a particular significance as explained below.

Figure 8E:
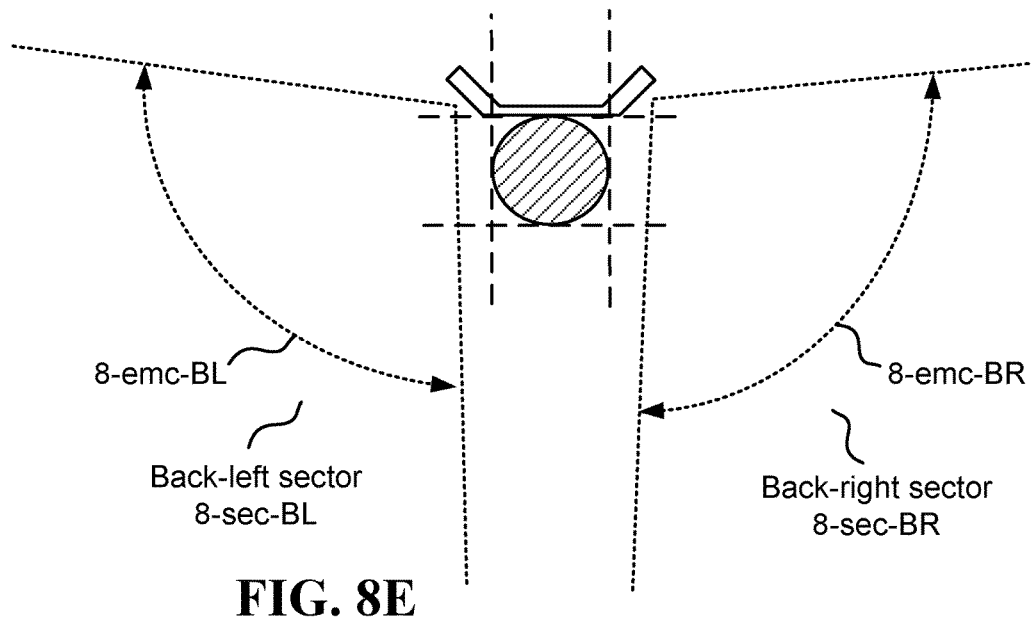
FIG. 8E illustrates one embodiment of the millimeter-wave communication component covering electromagnetically two separate sectors.

FIG. 8E illustrates one embodiment of the millimeter-wave communication component 8-mmv covering electromagnetically two separate sectors. Sector 8-sec-BR is covered electromagnetically 8-ems-BR by millimeter-wave antenna 8-ant-1, as a result of 8-ant-1 being located to the right of the finite-width obstacle 2-sp. Sector 8-sec-BL is covered electromagnetically 8-ems-BL by millimeter-wave antenna 8-ant-2, as a result of 8-ant-2 being located to the left of the finite-width obstacle 2-sp.

Figure 8F:
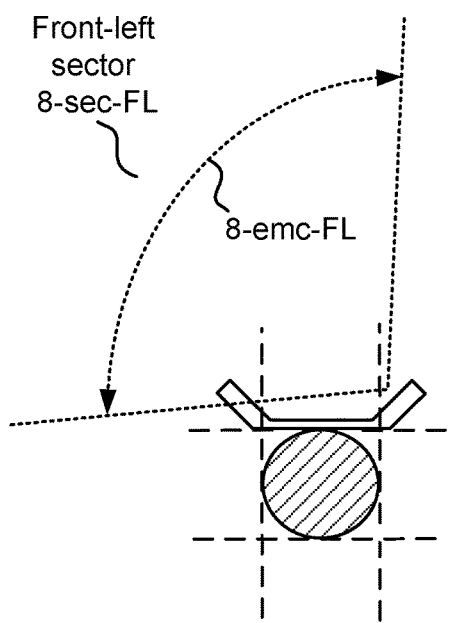
FIG. 8F illustrates one embodiment of the millimeter-wave communication component covering electromagnetically one additional sector.

FIG. 8F illustrates one embodiment of the millimeter-wave communication component 8-mmv covering electromagnetically one additional sector. Sector 8-sec-FL is covered electromagnetically 8-ems-FL by millimeter-wave antenna 8-ant-FR.

Figure 8G:
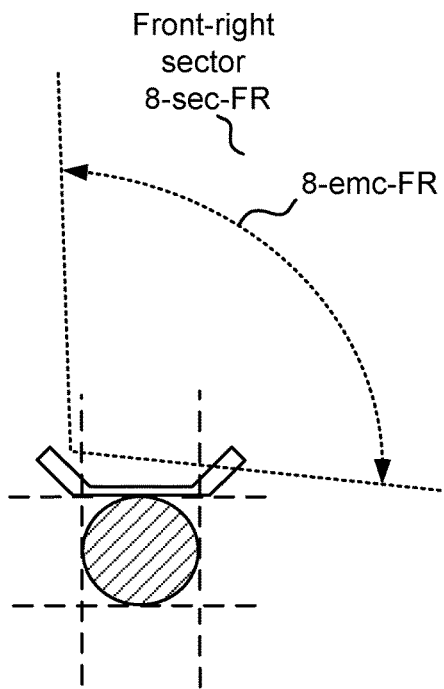
FIG. 8G illustrates one embodiment of the millimeter-wave communication component covering electromagnetically yet another sector.

FIG. 8G illustrates one embodiment of the millimeter-wave communication component 8-mmv covering electromagnetically yet another sector. Sector 8-sec-FR is covered electromagnetically 8-ems-FR by millimeter-wave antenna 8-ant-FL.

Figure 8H:
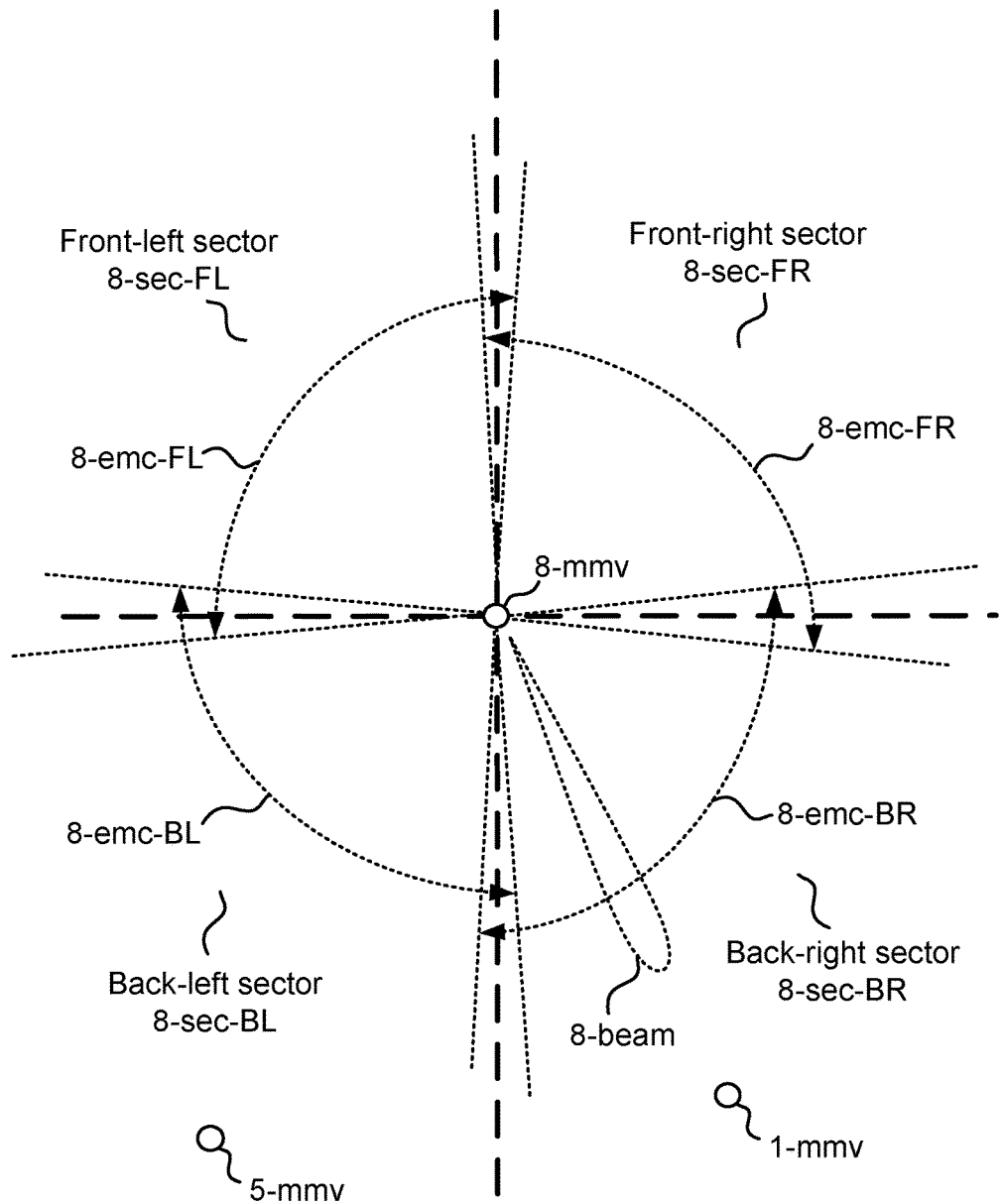
FIG. 8H illustrates one embodiment of the millimeter-wave communication component covering all sectors simultaneously, in which there is a continuity in coverage between the sectors despite a presence of the finite-width obstacle.

FIG. 8H illustrates one embodiment of the millimeter-wave communication component 8-mmv covering all sectors simultaneously 8-sec-BR, 8-sec-BL, 8-sec-FL, 8-sec-FR, in which there is a continuity in coverage 8-emc-BR, 8-emc-BL, 8-sec-FL, 9-sec-FR between the sectors despite a presence of the finite-width obstacle 2-sp. The coverage could be static, or it could be dynamic using pashed arrays as an example. In one embodiment, millimeter-wave beam 8-beam is steered electronically by millimeter-wave antenna 8-ant-1 over a span of directions contained within the back-right sector 8-sec-BR, possibly in order to communicate with another millimeter-wave communication component 1-mmv. millimeter-wave antenna 8-ant-2 is used to communicate with yet another millimeter-wave communication component 5-mmv located in the back-left sector 8-sec-BL and which is covered via 8-emc-BL. It is noted that the coverage 8-emc-BR, 8-emc-BL of sectors 8-sec-BR, 8-sec-BL overlaps, as a direct result of millimeter-wave antenna 8-ant-1 being located to the right of the finite-width obstacle 2-sp, and as a direct result of millimeter-wave antenna 8-ant-2 being located to the left of the finite-width obstacle 2-sp. Other arrangements of millimeter-wave antennas 8-ant-1, 8-and-2 could have caused a discontinuous coverage of sectors 8-sec-BR, 8-sec-BL, as a result of coverage blocking by finite-width obstacle 2-sp.

Figure 8I:
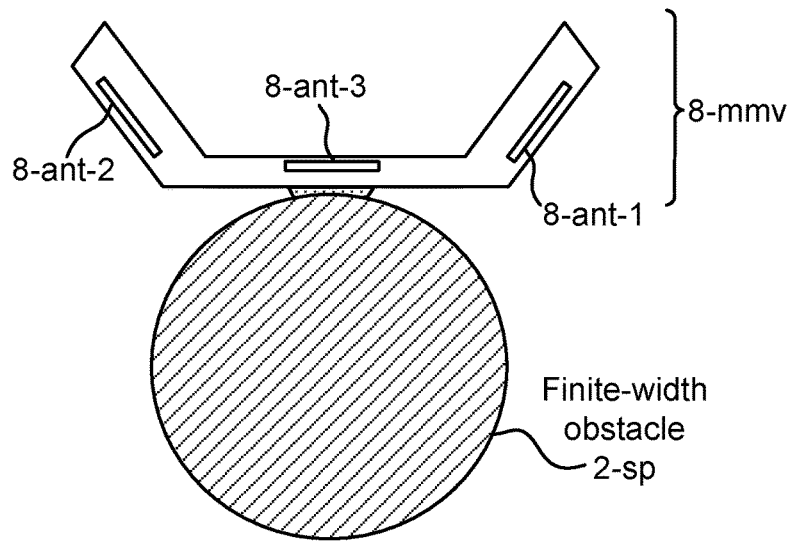
FIG. 8I illustrates one embodiment of the millimeter-wave communication component having three millimeter-wave antennas.

FIG. 8I illustrates one embodiment of the millimeter-wave communication component 8-mmv having three millimeter-wave antennas 8-ant-1, 8-ant-2, 8-ant-3.

Figure 8J:
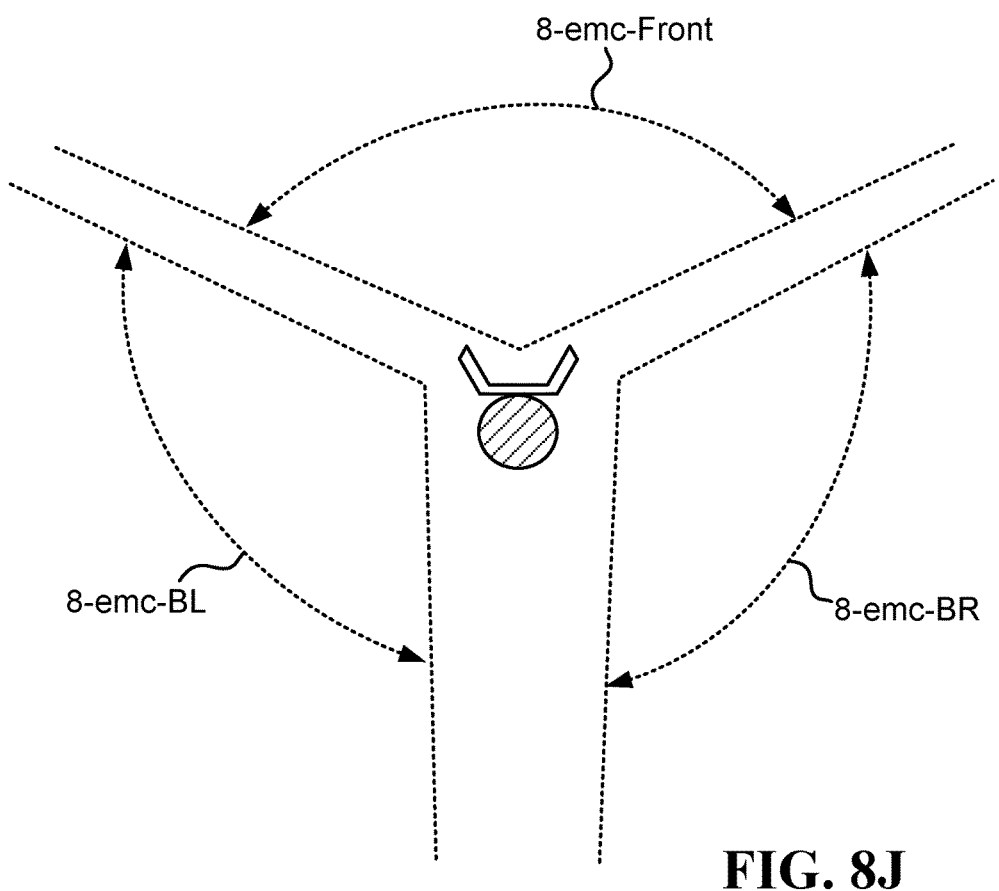
FIG. 8J illustrates one embodiment of the millimeter-wave communication component using the three millimeter-wave antennas to cover three sectors respectively.

FIG. 8J illustrates one embodiment of the millimeter-wave communication component 8-mmv using the three millimeter-wave antennas 8-ant-1, 8-ant-2, 8-ant-3 to cover three sectors respectively. The resulting coverage patterns using the three millimeter-wave antennas 8-ant-1, 8-ant-2, 8-ant-3 are 8-emc-BR, 8-emc-BL, and 8-emc-Front respectively. It is noted that the coverage 8-emc-BR overlaps with the coverage 8-emc-BL, as a direct result of millimeter-wave antenna 8-ant-1 being located to the right of the finite-width obstacle 2-sp, and as a direct result of millimeter-wave antenna 8-ant-2 being located to the left of the finite-width obstacle 2-sp. It is also noted that full 360 degrees coverage is possible with three millimeter-wave antennas or with four millimeter-wave antennas, or with a higher number of millimeter-wave antennas, or possibly also with only two millimeter-wave antennas.

Figure 9:
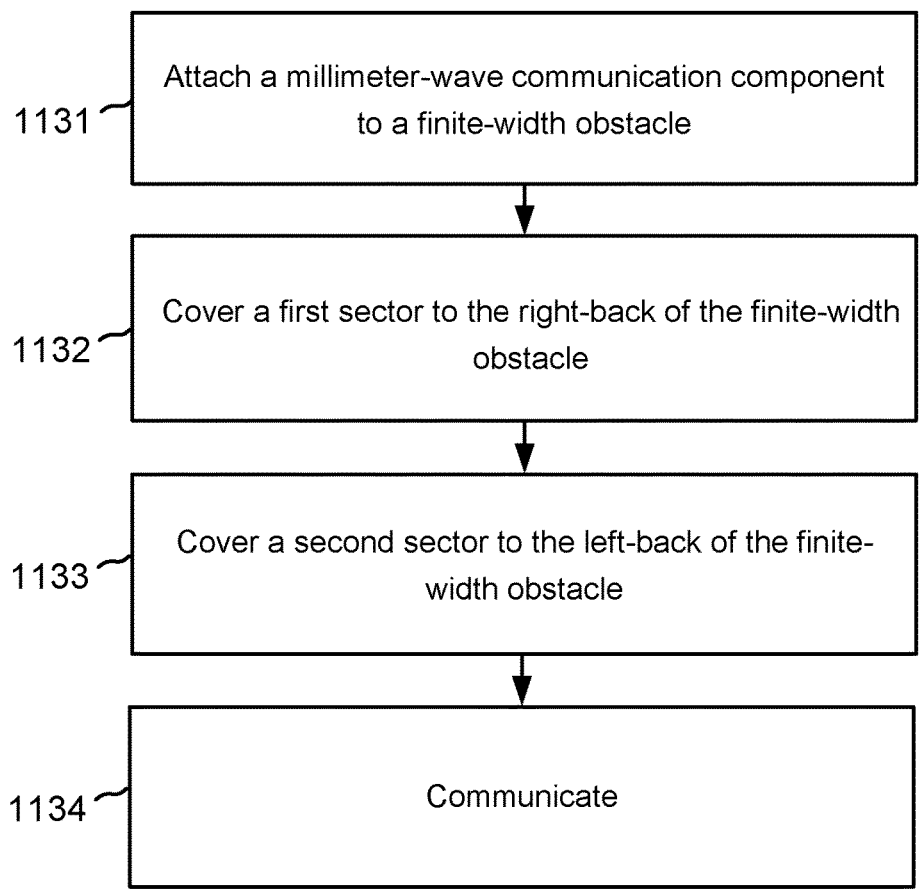
FIG. 9 illustrates one embodiment of a method for propagating millimeter-waves sideways to a finite-width obstacle.

FIG. 9 illustrates one embodiment of a method for propagating millimeter-waves sideways to a finite-width obstacle. The method includes: In step 1131, attaching mechanically 8-att, to a finite-width obstacle 2-sp, a millimeter-wave communication component 8-mmv, so as to cause a first millimeter-wave antenna 8-ant-1 to be located to the right of a finite-width obstacle, and so as to cause a second millimeter-wave antenna 8-ant-2 to be located to the left of the finite-width obstacle. In step 1131, generating millimeter-waves via the first millimeter-wave antenna 8-ant-1, thereby covering electromagnetically 8-emc-BR a first sector 8-sec-BR located to the right and to the back of the finite-width obstacle 2-sp. In step 1133, generating millimeter-waves via the second millimeter-wave antenna 8-ant-2, thereby covering electromagnetically 8-emc-BL a second sector 8-sec-BL located to the left and to the back of the finite-width obstacle 2-sp. In step 1134, communicating, using said millimeter-waves generated, with a second millimeter-wave communication component 1-mmv located within the first sector 8-sec-BR, and with a third millimeter-wave communication component 5-mmv located within the second sector 8-sec-BL.

In one embodiment, said method further includes: steering electronically, by the millimeter-wave communication component 8-mmv, using the first millimeter-wave antenna 8-ant-1, a first beam toward an angular location of the second millimeter-wave communication component 1-mmv within the first sector 8-sec-BR, and steering electronically, by the millimeter-wave communication component 8-mmv, using the second millimeter-wave antenna 8-ant-2, a second beam toward an angular location of the third millimeter-wave communication component 5-mmv within the second sector 8-sec-BL.

In one embodiment, said attaching comprises connecting a mechanical interface 8-att in the millimeter-wave communication component 8-mmv to the finite-width obstacle 2-sp.

In one embodiment, said mechanical interface 8-att is located half-way between the two millimeter-wave antennas 8-ant-1, 8-ant-2.

In one embodiment, said first millimeter-wave antenna 8-ant-1 is directed +130 to +140 (plus hundred and thirty to plus hundred and forty) degrees relative to a front side 8-FR of the finite-width obstacle 2-sp, and said second millimeter-wave antenna 8-ant-2 is directed −130 to −140 (minus hundred and thirty to minus hundred and forty) degrees relative to the front side 8-FR of the finite-width obstacle 2-sp.

In one embodiment, the first sector 8-sec-BR and the second sector 8-sec-BL have at least a 2 (two) degrees overlap in coverage, as a result of electromagnetic diffraction effects associated with electromagnetic interaction between the first millimeter-wave antenna 8-ant-1 and a right side of the finite-width obstacle 2-sp, and as a further result of electromagnetic diffraction effects associated with electromagnetic interaction between the second millimeter-wave antenna 8-ant-2 and a left side of the finite-width obstacle 2-sp.

One embodiment is a system 8-mmv operative to propagate millimeter-waves sideways to a finite-width obstacle. The system includes: (i) a first millimeter-wave antenna 8-ant-1 located to the right of a finite-width obstacle 2-sp, (ii) a second millimeter-wave antenna 8-ant-2 located to the left of the finite-width obstacle 2-sp, in which both millimeter-wave antennas 8-ant-1, 8-ant-2 are located in front of the finite-width obstacle 2-sp, such that the finite-width obstacle is clear of an imaginary geometrical line 8-img connecting the two millimeter-wave antennas 8-ant-1, 8-ant-2, (iii) at least one millimeter-wave transceiver 8-mmv-trcv, (iv) and a mechanical casing 8-mmv-mc enclosing the two millimeter-wave antennas 8-ant-1, 8-ant-2 and the millimeter-wave transceiver 8-mmv-trcv, in which the mechanical casing is attached 8-att to the finite-width obstacle 2-sp and is located in front of the finite-width obstacle.

In one embodiment, the millimeter-wave transceiver 8-mmv-trcv is configured to transmit and receive millimeter-waves via the first millimeter-wave antenna 8-ant-1, thereby covering electromagnetically 8-emc-BR at least a first sector 8-sec-BR located to the right and to the back of the finite-width obstacle 2-sp, and the millimeter-wave transceiver 8-mmv-trcv is further configured to transmit and receive millimeter-waves via the second millimeter-wave antenna 8-ant-2, thereby covering electromagnetically 8-emc-BL at least a second sector 8-sec-BL located to the left and to the back of the finite-width obstacle 2-sp, so that a first combined effect of said covering electromagnetically of the two sectors is a coverage 8-emc-BR+8-emc-BL of at least a continuous sector 8-sec-BR+8-sec-BL located to the back of the finite-width obstacle 2-sp.

In one embodiment, the system 8-mmv further comprises at least a third millimeter-wave antenna (e.g., 8-ant-FR, or 8-ant-FL, or both) enclosed by the mechanical casing 8-mmv-mc, in which the millimeter-wave transceiver 8-mmv-trcv is further configured to transmit and receive millimeter-waves via the third millimeter-wave antenna (8-ant-FR, or 8-ant-FL, or both together), thereby covering electromagnetically 8-emc-FL+8-emc-FR at least a third sector 8-sec-FL+8-sec-FR located to the front of the finite-width obstacle 2-sp, so that a second combined effect of said covering electromagnetically of the three sectors is a 360 (three hundred and sixty) degrees coverage 8-emc-BR+8-emc-BL+8-emc-FL+8-emc-FR of a continuous sector 8-sec-BR+8-sec-BL+8-sec-FL+8-sec-FR located all around the finite-width obstacle.

In one embodiment, said third millimeter-wave antenna comprises a front-left millimeter-wave antenna 8-ant-FL and a front-right millimeter-wave antenna 8-ant-FR, in which the front-left millimeter-wave antenna 8-ant-FL is configured to cover electromagnetically 8-emc-FR at least a front-right part 8-sec-FR of said third sector 8-sec-FL+8-sec-FR, and in which the front-right millimeter-wave antenna 8-ant-FR is configured to cover electromagnetically 8-emc-FL at least a front-left 8-sec-FL part of said third sector.

In one embodiment, the front-right millimeter-wave antenna 8-ant-FR is co-located with the first millimeter-wave antenna 8-ant-1 on a first common substrate 8-sub-1 located at a right corner of the mechanical casing 8-mmv-mc, and the front-left millimeter-wave antenna 8-ant-FL is co-located with the second millimeter-wave antenna 8-ant-2 on a second common substrate 8-sub-2 located at a left corner of the mechanical casing 8-mmv-mc.

In one embodiment, the front-right millimeter-wave antenna 8-ant-FR, the first millimeter-wave antenna 8-ant-1, the front-left millimeter-wave antenna 8-ant-FL, and the second millimeter-wave antenna 8-ant-2, are all phased array antennas, in which the front-right millimeter-wave antenna 8-ant-FR is facing opposite to a direction in which the first millimeter-wave antenna is facing 8-ant-1, and the front-left millimeter-wave antenna 8-ant-FL is facing opposite to a direction in which the second millimeter-wave antenna 8-ant-2 is facing.

In one embodiment, each of the millimeter-wave antennas 8-ant-1, 8-ant-2 is a phased array antenna.

In one embodiment, each of the phased array antennas is configured to steer electronically a millimeter-wave beam 8-beam toward any bearing within the respective coverage sector, i.e., 8-ant-1 steers electronically a millimeter-wave beam 8-beam within 8-sec-BR, and 8-ant-2 steers electronically a millimeter-wave beam (not shown) within 8-sec-BL.

In one embodiment, each of the millimeter-wave beams (e.g., 8-beam) has a width of between 1 (one) degree and 6 (six) degrees.

In one embodiment, the finite-width obstacle 2-sp is a street pole, in which the mechanical casing 8-mmv-mc is attached to the street pole.

In one embodiment, the street pole 2-sp has a diameter between 10 (ten) centimeters and 60 (sixty) centimeters.

In one embodiment, said imaginary geometrical line 8-img connecting the two millimeter-wave antennas has a length which is at least 20 (twenty) centimeters greater than said diameter.

In one embodiment, the mechanical casing 8-mmv-mc is mechanically attached 8-att to the street pole 2-sp.

In one embodiment, the millimeter-wave transceiver 8-mmv-trcv is a single millimeter-wave transceiver configured to switch between the different millimeter-wave antennas.

In one embodiment, the millimeter-wave transceiver 8-mmv-trcv comprises a plurality of millimeter-wave transceivers (not shown), in which each of the millimeter-wave transceivers is associated with one of the millimeter-wave antennas.

One embodiment is a system 8-mmv operative to propagate millimeter-waves sideways to a finite-width obstacle. The system includes: (i) a first millimeter-wave antenna 8-ant-1 located to the right of a finite-width obstacle 2-sp, (ii) a second millimeter-wave antenna 8-ant-2 located to the left of the finite-width obstacle 2-sp, (iii) at least one millimeter-wave transceiver 8-mmv-trcv, (iv) and a mechanical casing 8-mmv-mc enclosing the two millimeter-wave antennas 8-ant-1, 8-ant-2 and the millimeter-wave transceiver 8-mmv-trcv, in which the mechanical casing is attached 8-att to the finite-width obstacle 2-sp.

In one embodiment, the millimeter-wave transceiver 8-mmv-trcv is configured to transmit and receive millimeter-waves via the first millimeter-wave antenna 8-ant-1, thereby covering electromagnetically 8-emc-BR at least a first sector 8-sec-BR located to the right and to the back of the finite-width obstacle 2-sp, and the millimeter-wave transceiver 8-mmv-trcv is further configured to transmit and receive millimeter-waves via the second millimeter-wave antenna 8-ant-2, thereby covering electromagnetically 8-emc-BL at least a second sector 8-sec-BL located to the left and to the back of the finite-width obstacle 2-sp, so that a first combined effect of said covering electromagnetically of the two sectors is a coverage 8-emc-BR+8-emc-BL of at least a continuous sector 8-sec-BR+8-sec-BL located to the back of the finite-width obstacle 2-sp.

Figure 10A:
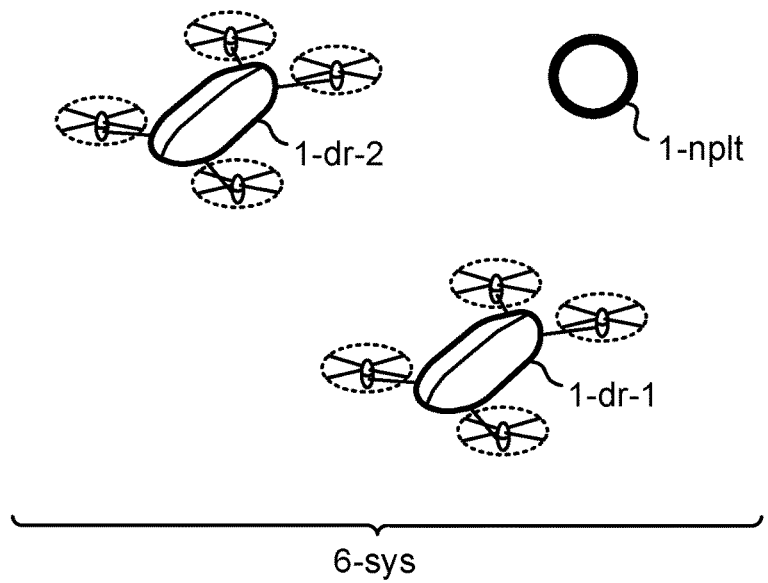
FIG. 10A illustrates one embodiment of a system comprising a network planning tool operative to use drones for determining the existence of line-of-sight between pairs of geospatial locations.

FIG. 10A illustrates one embodiment of a system 6-sys comprising a network planning tool 1-nplt operative to use drones 1-dr-1, 1-dr-2 for determining the existence of line-of-sight between pairs of geospatial locations. The network planning tool 1-nplt is operative to plan a wireless network such as a millimeter-wave network, or aid in the planning of such networks, in which the planned network is to include communication nodes to be placed in several geospatial locations, such as poles, roofs, or dedicated installations. The network planning tool 1-nplt uses the drones 1-dr-1, 1-dr-2 (one of them, the two of them, or more of them) to check and validate the existence of lines-of-sight in the planned network and in conjunction with the several geospatial locations soon to accommodate the communication nodes. The existence of lines-of-sight in the planned network may be critical for the proper operation of the network, as wireless signals in general are better received via lines-of-sight paths, and the high frequency millimeter-waves in particular have relatively weak diffraction properties, and are therefore poorly adapted for bypassing obstacles blocking the line of sight. The network planning tool 1-nplt may communicate directly or indirectly with the drones 1-dr-1, 1-dr-2, while ordering and managing them in conjunction with checking and validating the existence of lines-of-sight.

Figure 10B:
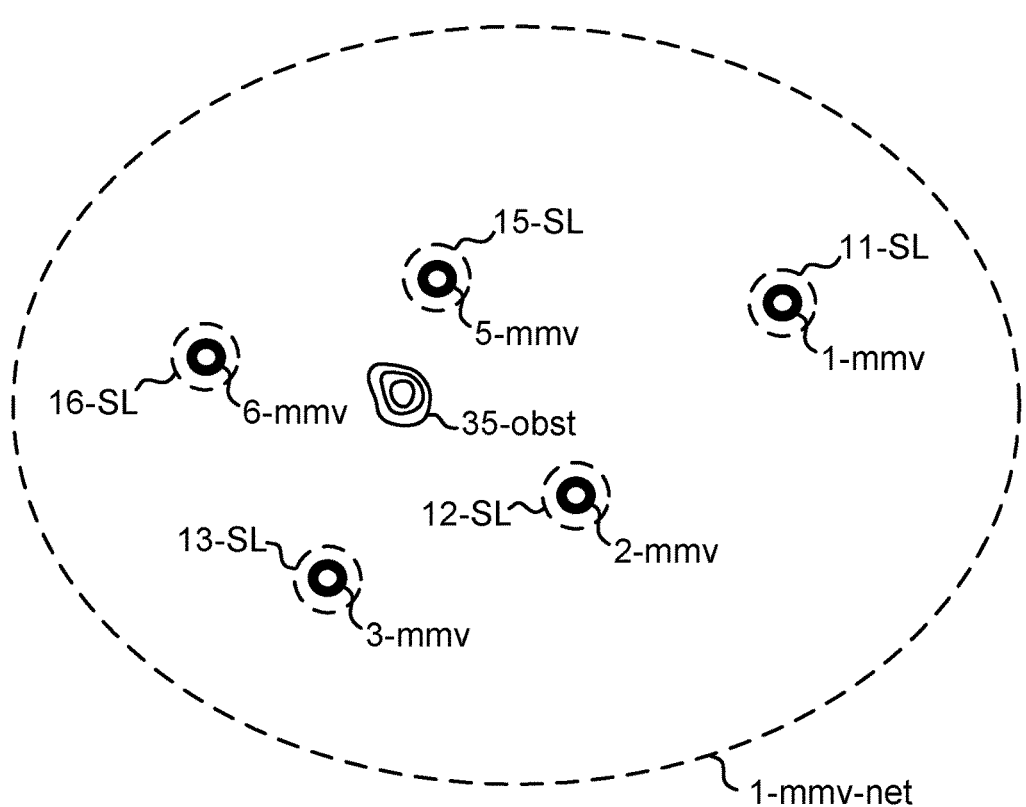
FIG. 10B illustrates one embodiment of a plan for a millimeter-wave network comprising a plurality of millimeter-wave communication nodes to be placed respectively at a plurality of geospatial locations associated respectively with a plurality of sets of geospatial coordinates.

FIG. 10B illustrates one embodiment of a plan for a millimeter-wave network 1-mmv-net comprising a plurality of millimeter-wave communication nodes 1-mmv, 2-mmv, 3-mmv, 5-mmv, 6-mmv to be placed respectively at a plurality of geospatial locations 11-SL, 12-SL, 13-SL, 15-SL, 16-SL associated respectively with a plurality of sets of geospatial coordinates. An obstacle 35-obs is shown, in which the obstacle disrupts a line-of-sight between the geospatial location 13-SL and the geospatial location 15-SL. The obstacle 35-obs may be natural such as a hill or trees, or it could me man-made such as buildings or antennas. The existence of obstacle 35-obs is likely to prevent the communication node 3-mmv, placed at 13-SL, from communicating wirelessly with the communication node 5-mmv placed at 15-SL, and vice-versa, especially when the communication nodes 3-mmv, 5-mmv utilize millimeter-wave for communication. The system 6-sys is not yet aware of the fact that obstacle 35-obs prevents 3-mmv and 5-mmv from communicating, but this fact will be discovered by the system 6-sys, prior to the actual deployment of nodes 3-mmv and 5-mmv, using at least one of the drones as explained in the following paragraphs.

Figure 10C:
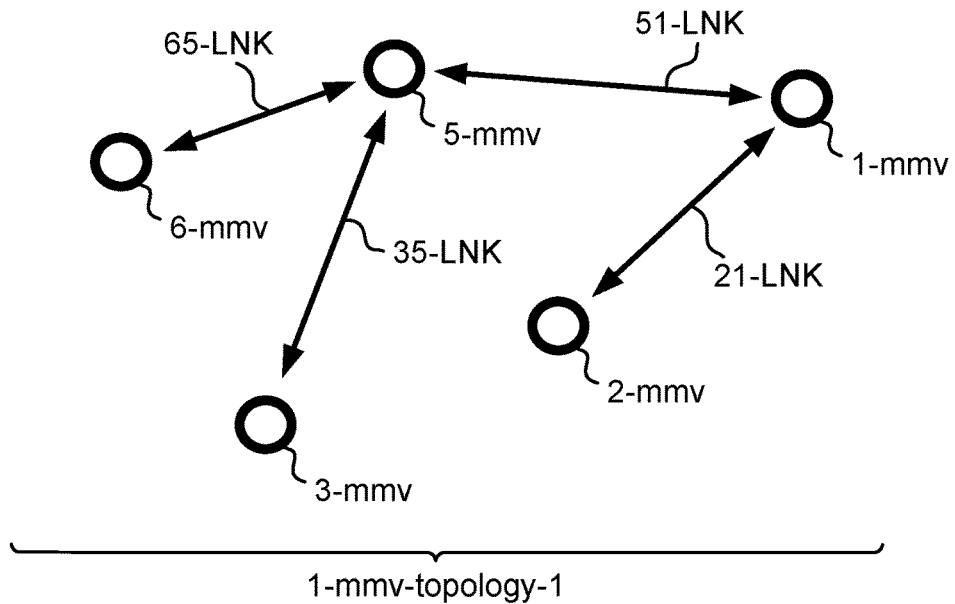
FIG. 10C illustrates one embodiment of a first suggested network topology having a particular set of suggested millimeter-wave communication links.

FIG. 10C illustrates one embodiment of a first suggested network topology 1-mmv-topology-1 having a particular set of suggested millimeter-wave communication links 65-LNK, 35-LNK, 51-LNK, 21-LNK. The network planning tool 1-nplt, in an attempt to interconnects all of the nodes 1-mmv, 2-mmv, 3-mmv, 5-mmv, 6-mmv in the network 1-mmv-net, is currently suggesting to use several millimeter-wave links, in which 65-LNK is suggested to interconnect 6-mmv with 5-mmv, 35-LNK is suggested to interconnect 3-mmv with 5-mmv, 51-LNK is suggested to interconnect 5-mmv with 1-mmv, and 21-LNK is suggested to interconnect 2-mmv with 1-mmv (interconnections are usually bi-directions). The network planning tool 1-nplt now needs to validate the existence of lines-of-sight in conjunction with each of the links 65-LNK, 35-LNK, 51-LNK, 21-LNK, in which said validation will be done using at least one of the drones 1-dr-1, 1-dr-2 prior to installing any actual nodes 1-mmv, 2-mmv, 3-mmv, 5-mmv, 6-mmv.

Figure 10D:
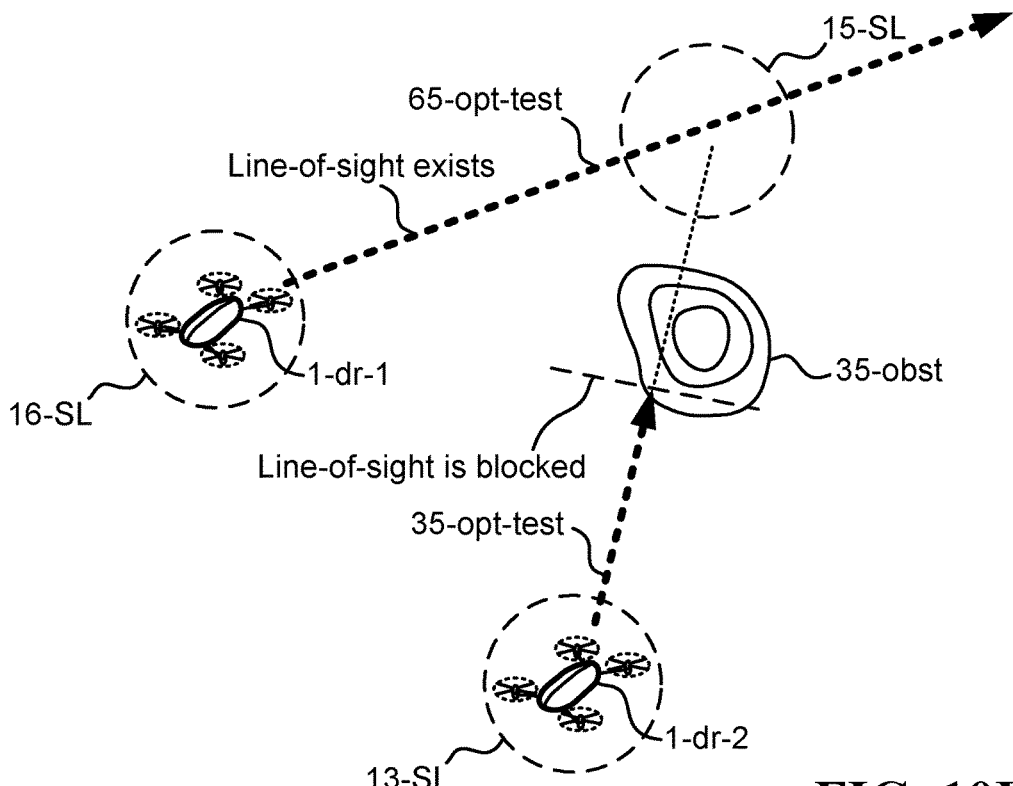
FIG. 10D illustrates one embodiment of a single drone checking for a line-of-sight condition in conjunction with two of the geospatial locations by performing an optical test.

FIG. 10D illustrates one embodiment of a single drone 1-dr-1 checking for a line-of-sight condition in conjunction with two of the geospatial locations 16-SL, 15-SL by performing an optical test 65-opt-test. The network planning tool 1-nplt now instructs drone 1-dr-1 to start checking for lines-of-sight in conjunction with the suggested links 65-LNK, 35-LNK, 51-LNK, 21-LNK. The instruction may be given to the drone per each of the links separately, or for all of the links. The instruction may include pairs of geospatial coordinate sent to the drone, in which each of the pairs corresponds to a pair of the geospatial locations associated with one of the links (e.g., the pair 16-SL, 15-SL associated with link 65-LNK). After receiving the instruction, the drone 1-dr-1 positions itself at one of the locations (e.g., at 16-SL as shown), and then performs an optical test 65-opt-test in conjunction with the respective paired location 15-SL. In the case of the pair 16-SL, 15-SL, there is no intervening obstacle, and therefore optical test 65-opt-test is successful, and the successful result is communicated back to the network planning tool 1-nplt, which now knows that link 65-LNK is indeed possible, and that nodes 6-mmv, 5-mmv will be able to communicate directly. After receiving further instructions, the drone 1-dr-1, or another of the drones (1-dr-2 is shown) positions itself at another of the locations (e.g., at 13-SL as shown), and then performs another optical test 35-opt-test in conjunction with the respective paired location 15-SL. In the case of the pair 13-SL, 15-SL, there is an intervening obstacle 35-obst, and therefore optical test 35-opt-test fails, and the failure result is communicated back to the network planning tool 1-nplt, which now knows that link 35-LNK is not possible, and that nodes 3-mmv, 5-mmv will not be able to communicate directly. The optical tests, such as optical test 65-opt-test, may be performed using a laser range-finding device. For example, when drone 1-dr-1 reaches location 16-SL, it aims a laser range-finding device to the direction of location 15-SL, and then measures the distance. If the measured distance is greater than the actual distance between 16-SL and 15-SL, then a line-of-sight must exist, which is the case in optical test 65-opt-test. The actual distance may be calculated using the geospatial coordinates associated with 15-L and 16-L. However, if the measured distance is shorter, then something must be blocking the line-of-sight, which is the case in optical test 35-opt-test, where 35-obst is blocking the line-of-sight, and consequently the measured distance in optical test 35-opt-testis shorter than the actual distance between 13-SL and 15-SL.

Figure 10E:
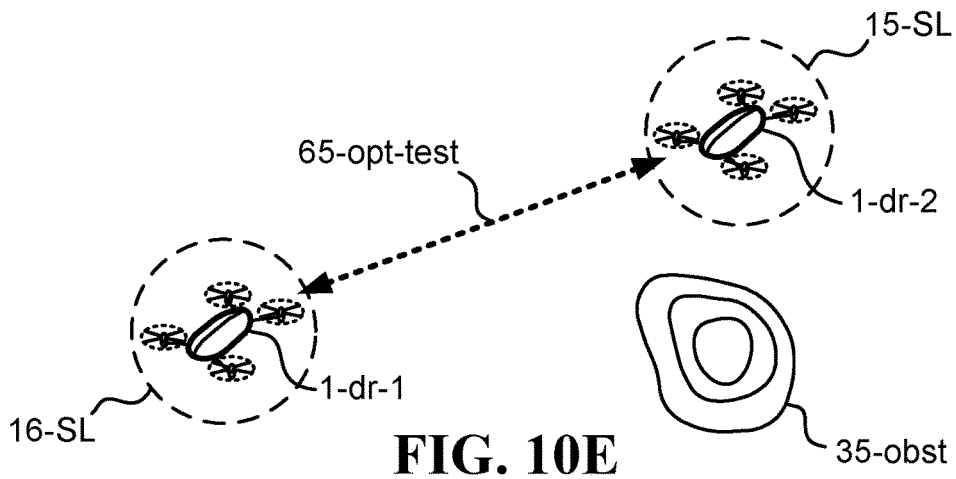
FIG. 10E illustrates one embodiment of two drones checking for a line-of-sight condition in conjunction with two of the geospatial locations by performing an optical test.

FIG. 10E illustrates one embodiment of two drones 1-dr-1, 1-dr-2 checking for a line-of-sight condition in conjunction with two of the geospatial locations 16-SL, 15-SL by performing an optical test 65-opt-test. In this case, the optical test 65-opt-test is performed using two drones 1-dr-1, 1-dr-2 simultaneously, and without necessarily using a laser range-finding device. In this embodiment, the drones 1-dr-1, 1-dr-2 locate themselves at the two locations 16-SL, 15-SL respectively, and then look for indication that a light signal or a millimeter-wave signal, as produced by one of the drones, is detected by the other drone. A detection of such a signal is an indication that a line-of-sight exists between 16-SL and 15-SL. The lack of detection of the signal is an indication that a line-of-sight does not exist between 16-SL and 15-SL.

Figure 10F:
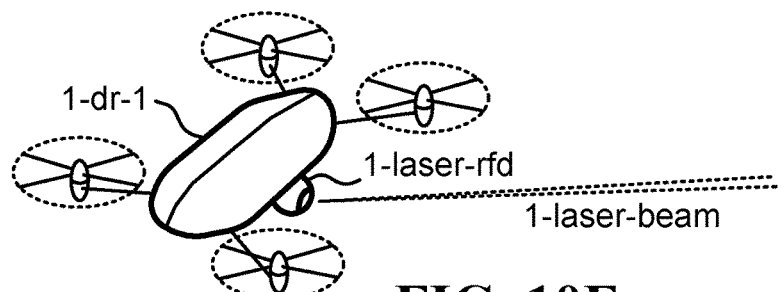
FIG. 10F illustrates one embodiment of a single drone checking for a line-of-sight condition using a laser range finding device.

FIG. 10F illustrates one embodiment of a single drone 1-dr-1 checking for a line-of-sight condition using a laser range finding device 1-laser-rfd. For example, in the optical test 65-opt-test, drone 1-dr-1 may be using the laser range-finding device 1-laser-rfd to aim a laser beam 1-laser-beam from 16-SL to the direction of location 15-SL, and then measure the distance to determine the existence of a line-of-sight between 16-SL and 15-SL, as explained before.

Figure 10G:
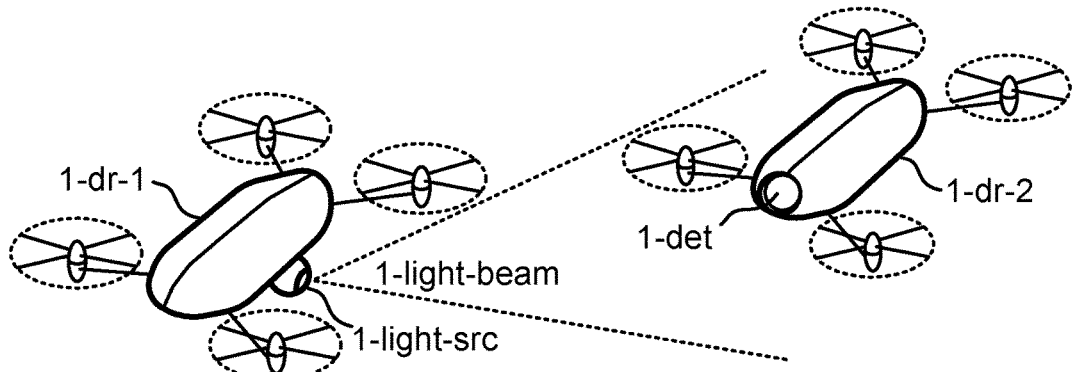
FIG. 10G illustrates one embodiment of two drones checking for a line-of-sight condition using light signals communicated from one drone to the other.

FIG. 10G illustrates one embodiment of two drones 1-dr-1, 1-dr-2 checking for a line-of-sight condition using light signals communicated from one drone to the other. The drones 1-dr-1, 1-dr-2 locate themselves in two locations (e.g., 16-SL and 15-SL) respectively, and then look (e.g., using a detector 1-det such as a camera onboard 1-dr-2) for indication that a light signal or a millimeter-wave signal 1-light-beam, as produced by one of the drones 1-dr-1 using a relevant signal source 1-light-src, is detected by the other drone. A detection indicates the existence of a line-of-sight, as explained before.

Figure 10H:
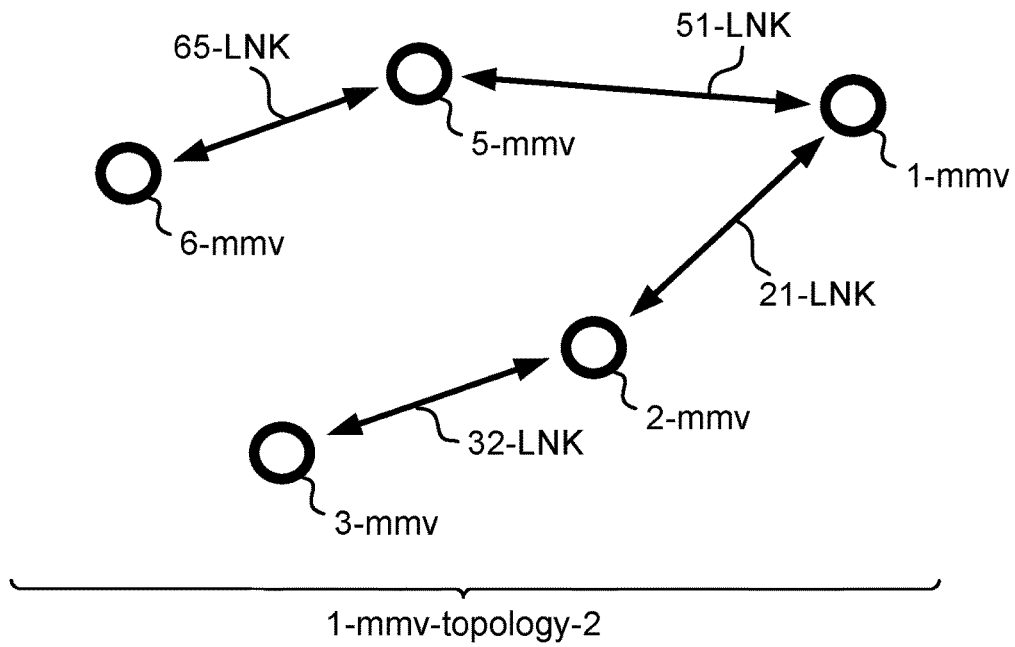
FIG. 10H illustrates one embodiment of a second suggested network topology having another set of suggested millimeter-wave communication links.

FIG. 10H illustrates one embodiment of a second suggested network topology 1-mmv-topology-2 having another set of suggested millimeter-wave communication links 65-LNK, 32-LNK, 51-LNK, 21-LNK. After determining, using the drones, that a line-of-sight does not exist between 16-SL and 15-SL, an alternative network topology 1-mmv-topology-2 needs to be suggested and tested. For example, the network planning tool 1-nplt may decide that instead of connecting node 3-mmv to the network via node 5-mmv, the node 3-mmv will be connected to the network via another node, such as 2-mmv and using another link 32-LNK, thereby resulting in the new network topology 1-mmv-topology-2 suggested.

Figure 10I:
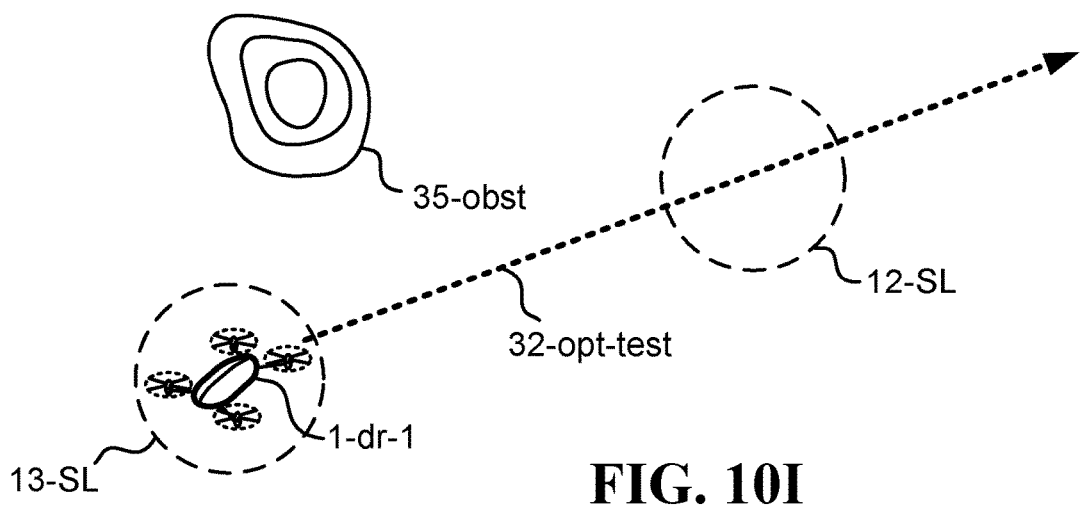
FIG. 10I illustrates one embodiment of a drone re-checking for a line-of-sight condition in conjunction with the second suggested network topology.

FIG. 10I illustrates one embodiment of a drone 1-dr-1 re-checking for a line-of-sight condition in conjunction with the second suggested network topology 1-mmv-topology-2. The drone 1-dr-1 performs the optical test 32-opt-test to determine the existence of a line-of-sight between 13-SL and 12-SL, which are the endpoints of the newly suggested link 32-LNK in conjunction with network topology 1-mmv-topology-2. Since there are no obstacles between locations 13-SL and 12-SL, it is concluded that the second suggested network topology 1-mmv-topology-2 is indeed possible, and the system may now give a go ahead for deploying the nodes and the specific links 65-LNK, 32-LNK, 51-LNK, 21-LNK.

Figure 10J:
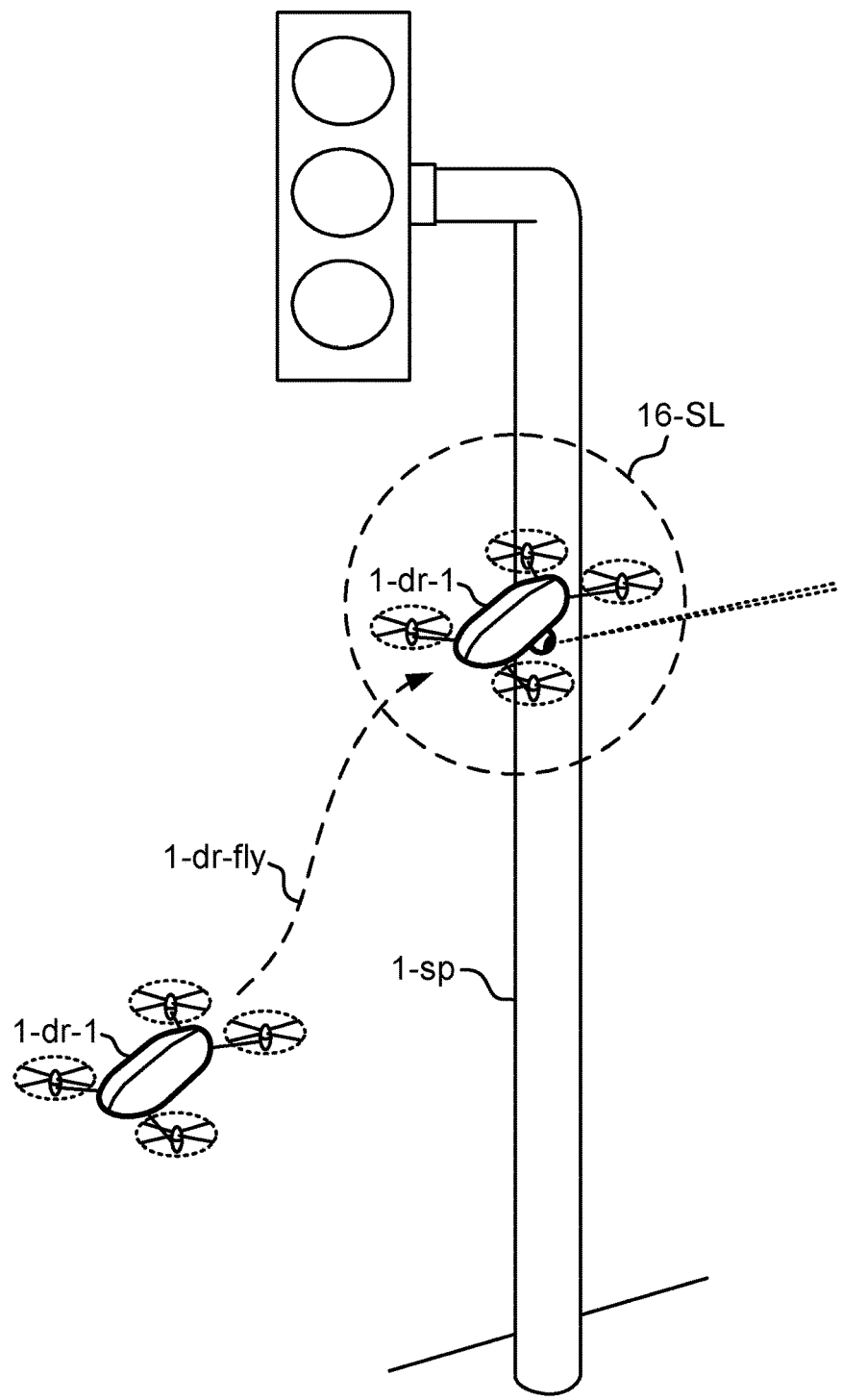
FIG. 10J illustrates one embodiment of a drone approaching one of the geospatial locations for the performing of one of the optical tests.

FIG. 10J illustrates one embodiment of a drone 1-dr-1 approaching 1-dr-fly one of the geospatial locations 16-SL for the performing of one of the optical tests (e.g., 65-opt-test). As shown, geospatial location 16-SL may be a very specific location on a street pole 1-sp, such as a traffic light pole, in which the accuracy of the drone positioning itself at geospatial locations 16-SL may be better than one meter, which is a positioning accuracy readily achievable using a global navigation satellite system (GNSS) such as global positioning system (GPS). After accurately positioning itself near the pole at the designated accurate location 16-S, the drone 1-dr-1 may commence the optical test.

Figure 10K:
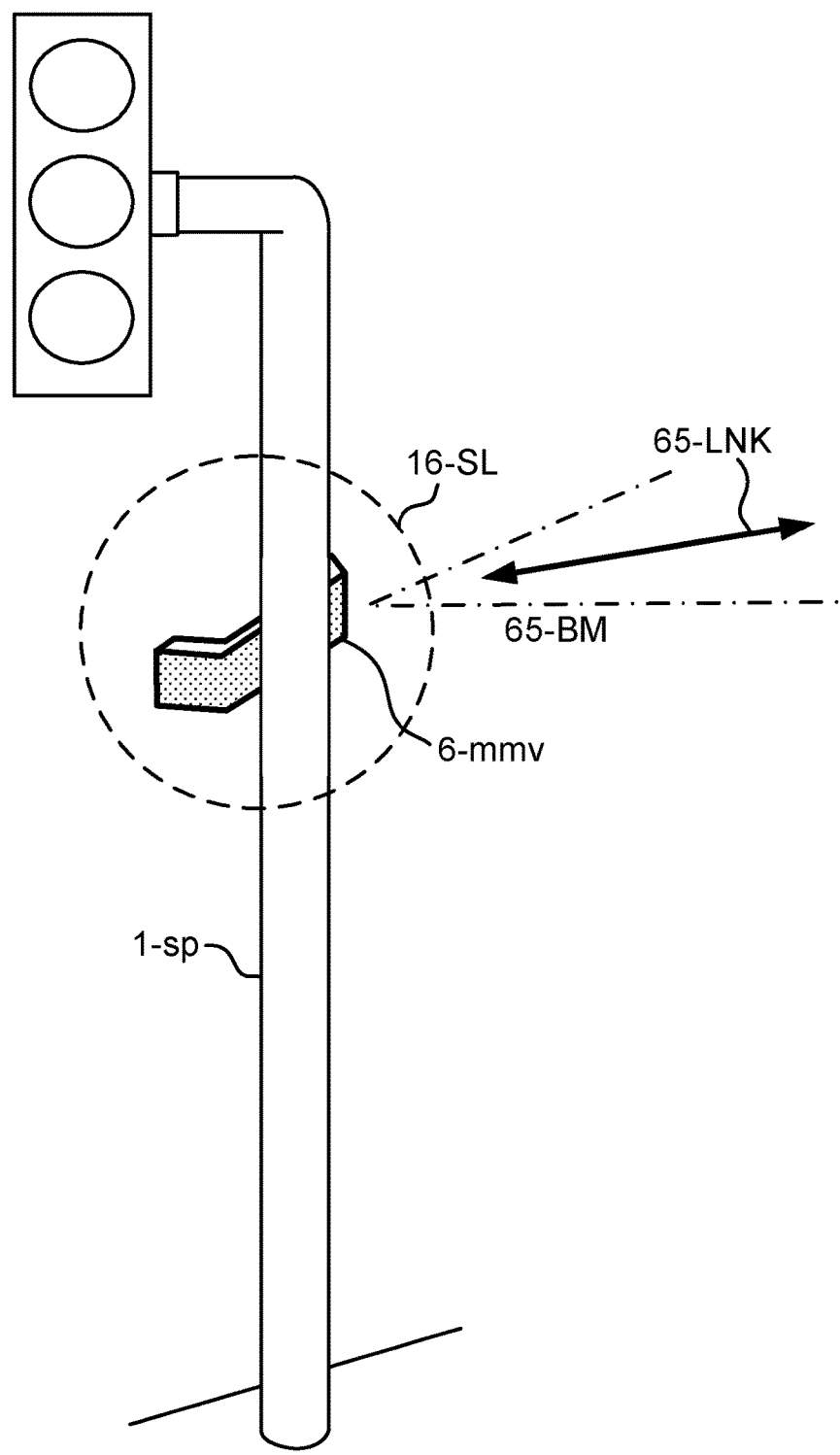
FIG. 10K illustrates one embodiment of a millimeter-wave communication node placed at one of the geospatial locations for which a line-of-sight was previously established in conjunction with another geospatial location.

FIG. 10K illustrates one embodiment of a millimeter-wave communication node 6-mmv placed at one of the geospatial locations 16-SL for which a line-of-sight was previously established in conjunction with another geospatial location (e.g., 15-SL). After establishing by system 6-sys that link 65-LNK is indeed possible, together with the other links in the network, a user of system 6-sys may now proceed with installing the actual communication nodes 1-mmv, 2-mmv, 3-mmv, 5-mmv, 6-mmv. As shown, node 6-mmv is installed exactly at location 16-SL previously tested, and a beam, such as millimeter beam 65-BM, is then established toward the associated other node (e.g., node 5-mmv at location 15-SL).

In one embodiment, the system 6-sys is operative to locate potential geospatial locations, relative to a pivotal location, at which communication nodes may be placed in conjunction with establishing links with said pivotal location. In one embodiment, the system 6-sys instruct drone 1-dr-1 to position itself in a specific pivotal location, such as location 11-SL, and from there to search for locations having a line-of-sight with the pivotal location. For example, the system 6-sys may know that the network 1-mmv-net includes the location 11-SL, but it may not yet know the identity of the other locations. In that case, drone 1-dr-1 may be ordered to position itself at location 11-SL, and start performing optical tests in conjunction with random or otherwise predetermined locations around pivotal location 11-SL. The optical search may reveal locations, such as locations 15-SL and 12-SL, or other locations not shown, which have a line-of-sight with pivotal location 11-SL. In a similar manner, the system may continue the search for other locations, in which new pivotal locations are selected, such as 15-SL and 12-SL, as to eventually discover all locations that are necessary for establishing a network such as 1-mmv-net.

Figure 11:
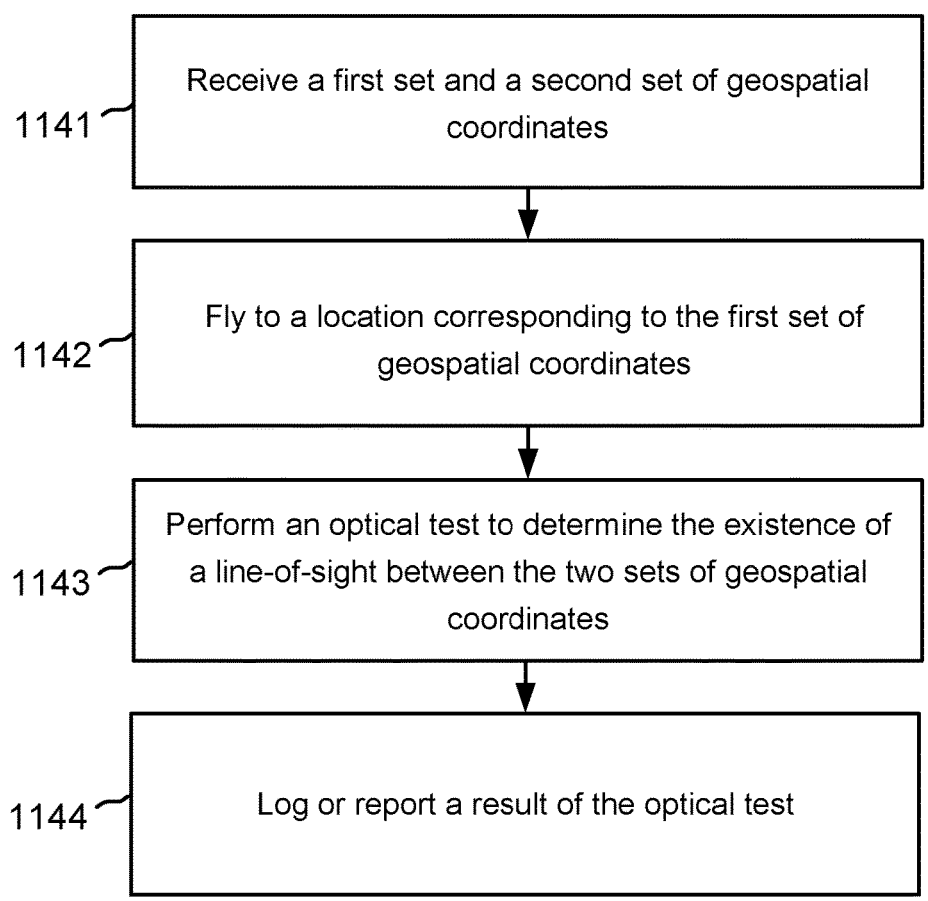
FIG. 11 illustrates one embodiment of a method for determining the existence of line-of-sight between pairs of geospatial locations.

FIG. 11 illustrated one embodiment of a method for determining the existence of line-of-sight between pairs of geospatial locations. The method includes: In step 1141, receiving, in a drone 1-dr-1, a plurality of geospatial coordinates comprising a first set of geospatial coordinates and a second set of geospatial coordinates. In step 1142, flying 1-dr-fly, by the drone 1-dr-1, to a first geospatial location (e.g., 16-SL) corresponding to the first set of geospatial coordinates. In step 1143, performing, by the drone, an optical test 65-opt-test for an existence of a line-of-sight between the drone 1-dr-1 currently located at the first geospatial location 16-SL and a second geospatial location (e.g., 15-SL) corresponding to the second set of geospatial coordinates. In step 1144, logging or reporting a result of the optical test.

In one embodiment, the optical test 65-opt-test comprises: aiming, by the drone, a laser range-finding device 1-laser-rfd, to the second geospatial location 15-SL; and measuring, using the laser range-finding device, a distance of clearance between the drone 1-dr-1 and the second geospatial location 15-SL. One embodiment further comprises: comparing said distance of clearance measured and a calculated distance between the first geospatial location 16-SL and the second geospatial location 15-SL; and determining the existence of line-of-sight in a case that said comparison is concluded with the distance of clearance being greater than the calculated distance, or determining the absence of line-of-sight is a case that said comparison is concluded with the distance of clearance being shorter than the calculated distance.

In one embodiment, the optical test 65-opt-test comprises cooperating by the drone 1-dr-1 with a second drone 1-dr-2, in which said cooperation comprises: flying, by the second drone 1-dr-2, to the second geospatial location 15-SL; and checking for optical clearance between the drone 1-dr-1 and the second drone 1-dr-2. In one embodiment, said checking for optical clearance is done by observing, using a detector such as a camera 1-det, the second drone from the drone, or the drone 1-dr-1 from the second drone 1-dr-2.

In one embodiment, said checking for optical clearance comprises: generating 1-light-src light flashes 1-light-beam by one of the drones 1-dr-1; and detecting 1-det the light flashes by the other drone 1-dr-2.

In one embodiment, said checking for optical clearance comprises: generating millimeter-wave signals by one of the drones; and detecting the millimeter-wave signals by the other drone. In one embodiment, said detection of the millimeter-wave signals by the other drone indicates that a line-of-sight exists. In one embodiment, said detection of the millimeter-wave signals by the other drone indicates that there is a multipath, and thereby concluding that a line-of-sight does not necessarily exists, but also concluding that one of the paths in the multipath may be used for a non-line-of-sight transmission.

In one embodiment, said checking for optical clearance comprises: generating laser signals 1-light-src by one of the drones 1-dr-1; and detecting 1-det the laser signals by the other drone 1-dr-2.

In one embodiment, the optical test 65-opt-test comprises: searching, by the drone, for a known image pattern in the direction of the geospatial location 15-SL, in which finding said known pattern indicates the existence of a line-of-sight.

One embodiment further comprises: generating or receiving, in a network-planning tool 1-nplt, a requirement for placement of at least a first millimeter-wave communication node 6-mmv and a second millimeter-wave communication node 5-mmv respectively at the first set of geospatial coordinates and the second set of geospatial coordinates; sending the plurality of geospatial coordinates to the drone 1-dr-1; receiving said result of the optical test 65-opt-test from the drone 1-dr-1; and based on said result received that indicates the existence of a line-of-sight, suggesting, by the network-planning tool 1-nplt, that a millimeter-wave communication link 65-LNK is to be established between the two millimeter-wave communication nodes 5-mmv, 6-mmv to be placed respectively at the first set of geospatial coordinates (associated with location 16-SL) and the second set of geospatial coordinates (associated with location 15-SL).

In one embodiment, the plurality of geospatial coordinates further comprises additional sets of geospatial coordinates; and the method further comprises: flying, by the drone 1-dr-1, to another geospatial location (e.g., 13-SL) corresponding to one of the other sets of geospatial coordinates; performing, by the drone 1-dr-1, additional optical tests 35-opt-test for the existence of additional lines-of-sight between the drone currently located at the another geospatial location 13-SL and respectively the rest of the geospatial locations corresponding to the rest of the sets of geospatial coordinates; and logging or reporting results of the additional optical tests.

In one embodiment, the drone 1-dr-1 is a an autonomous or semi-autonomous helicopter, such as a quadcopter, in which the drone is operative to hover exactly at the first set of geospatial coordinates during the optical test 65-opt-test. In one embodiment, the first set of geospatial coordinates are three-dimensional (3D), thereby corresponding to both location and height.

One embodiment is a system 6-sys operative to determine the existence of line-of-sight between pairs of geospatial locations. The system includes: a network-planning tool 1-nplt operative to plan a millimeter-wave network 1-mmv-net comprising a plurality of millimeter-wave communication nodes 1-mmv, 2-mmv, 3-mmv, 5-mmv, 6-mmv to be placed respectively at a plurality of geospatial locations 11-SL, 12-SL, 13-SL, 15-SL, 16-SL associated respectively with a plurality of sets of geospatial coordinates; and at least a first drone 1-dr-1, 1-dr-2 operative to perform optical tests, in which each of the optical tests is operative to determine an existence of a line-of-sight between a particular two of the geospatial locations.

In one embodiment, the network-planning tool 1-nplt is configured to suggest a first network topology 1-mmv-topology-1 having a suggested and particular set of millimeter-wave communication links 65-LNK, 35-LNK, 51-LNK, 21-LNK, in which each of the millimeter-wave communication links is suggested to interconnect a different two of the plurality of millimeter-wave communication nodes (e.g., 65-LNK is suggested to interconnect 6-mmv with 5-mmv, 35-LNK is suggested to interconnect 3-mmv with 5-mmv, 51-LNK is suggested to interconnect 5-mmv with 1-mmv, and 21-LNK is suggested to interconnect 2-mmv with 1-mmv); the network-planning tool 1-nplt is further configured to instruct the at least first drone 1-dr-1, 1-dr-2 to perform the optical test in conjunction with each of at least some of the millimeter-wave communication links suggested 65-LNK, 35-LNK, 51-LNK, 21-LNK and the respective two geospatial locations associated therewith (e.g., perform an optical test 65-opt-test in conjunction with suggested link 65-LNK and the two respective geospatial locations 16-SL, 15-SL associated with 65-LNK, and perform an optical test 35-opt-test in conjunction with suggested link 35-LNK and the two respective geospatial locations 13-SL, 15-SL associated with 35-LNK); and the at least first drone 1-dr-1, 1-dr-2 is configured to follow said instruction, perform the optical tests 65-opt-test, 35-opt-test, and report results back to the network-planning tool 1-nplt, thereby allowing the network-planning tool to determine whether the first network topology 1-mmv-topology-1 and the associated particular set of millimeter-wave communication links 65-LNK, 35-LNK, 51-LNK, 21-LNK are feasible.

In one embodiment, the results reported back are such as to indicate the existence of a line-of-sight in conjunction with each of the millimeter-wave communication links that have been suggested and tested; and the network-planning tool 1-nplt is further configured to determine that the first network topology 1-mmv-topology-1 and the associated particular set of millimeter-wave communication links are feasible.

In one embodiment, the results reported back are such as to indicate a lack of existence of a line-of-sight in conjunction with at least one of the millimeter-wave communication links suggested (e.g., suggested link 35-LNK); and the network-planning tool 1-nplt is further configured to determine that the first network topology 1-mmv-topology-1 and the associated particular set of millimeter-wave communication links are not feasible. In one embodiment, as a result of the determination that the first network topology and the associated particular set of millimeter-wave communication links are not feasible, the network-planning 1-nplt tool is further configured to: suggest a second network topology 1-mmv-topology-2 having a second suggested and specific set of millimeter-wave communication links 65-LNK, 32-LNK, 51-LNK, 21-LNK, in which said second set does not include the millimeter-wave communication links 35-LNK for which the lack of existence of a line-of-sight was reported; the network-planning tool 1-nplt is further configured to re-instruct the at least first drone 1-dr-1, 1-dr-2 to perform the optical test again in conjunction with at least each of the millimeter-wave communication links 32-LNK in the second set that were not present in the particular set; and the at least first drone 1-dr-1, 1-dr-2 is configured to follow said re-instruction, perform the optical tests again 32-opt-test, and report the results back to the network-planning tool 1-nplt, thereby allowing the network-planning tool to determine whether the second network topology 1-mmv-topology-2 and the associated second set of millimeter-wave communication links 65-LNK, 32-LNK, 51-LNK, 21-LNK are feasible.

In one embodiment, each of the geospatial locations 11-SL, 12-SL, 13-SL, 15-SL, 16-SL is a location on a map in conjunction with a specific height, thereby corresponding to a three-dimensional (3D) set of coordinates. In one embodiment, the specific height is affected by a pole 1-sp (FIG. 10K) on which the respective millimeter-wave communication node (e.g., 6-mmv) is to be placed.

Figure 12A:
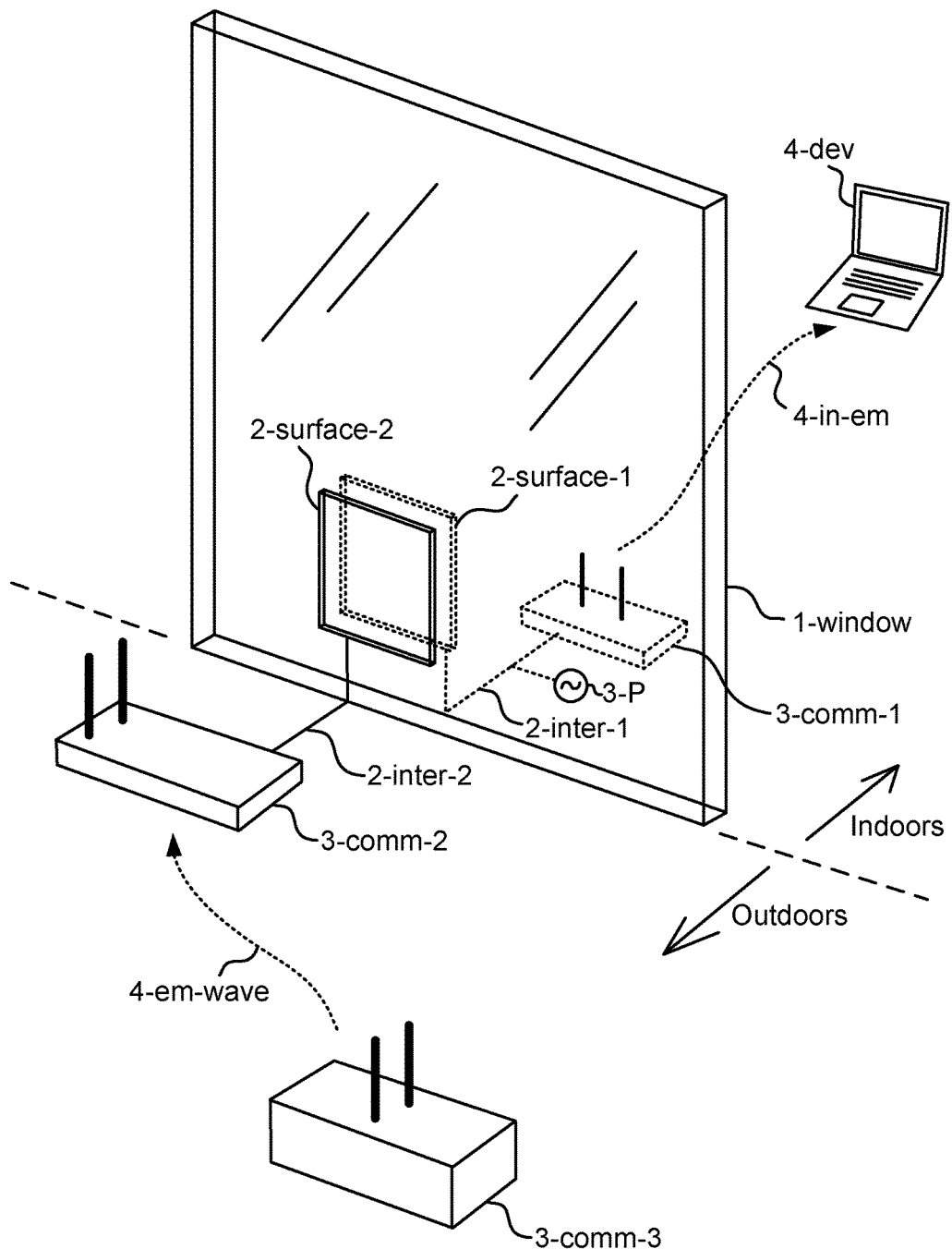
FIG. 12A illustrates one embodiment of an outdoor communication device communicating with an indoor communication device through a glass window barrier.

FIG. 12A illustrates one embodiment of an outdoor communication device 3-comm-2 communicating with an indoor communication device 3-comm-1 through a glass window barrier 1-window. The outdoor device 3-comm-2 is placed outdoors near the glass window 1-window, and is connected 2-inter-2 with an outdoor surface 2-surface-2 that is attached directly to the glass window on one side. The outdoor device 3-comm-2 utilizes optical signals to propagate communication signals through the glass window 1-window, in which the optical signals are generated in the outdoor surface 2-surface-2 and are received by an indoor surface 2-surface-1 that is directly attached to the same glass window 1-window on the other side and opposite of the outdoor surface 2-surface-2. The indoor surface 2-surface-1 receives the optical signals, converts the optical signals to electrical signals, and relays the electrical signals via an interface 2-inter-1 to an indoor device 3-comm-1 that is placed indoors and possibly near the glass window 1-window. The outdoor communication device 3-comm-2 receives power from a power source 3-P located indoors, in which power is transferred from the indoor power source 3-P to the outdoor communication device 3-comm-2 through the same glass window 1-window in a form of an alternating magnetic field that is generated in the indoor surface 2-surface-1 and picked up in the outdoor surface 2-surface-2. A communication link is therefore established between the outdoor communication device 3-comm-2 and the indoor communication device 3-comm-1, in which the communication link may be utilized to communicatively connect an outdoor wireless node 3-comm-3, such as a cellular base-station, an outdoor access point, or an outdoor millimeter-wave communication component, with an indoor client device 4-dev such as a computer, a smartphone, or a smart TV. Wireless communication signals 4-em-wave, which are transmitted by the outdoor wireless node 3-comm-3, are picked up by the outdoor communication device 3-comm-2 and are converted into data. The data is then relayed optically from the outdoor communication device 3-comm-2 to the indoor device 3-comm-1 using the communication link. The data is then further relayed 4-in-em, by the indoor communication device 3-comm-1, to the indoor client device 4-dev, using wired or wireless techniques such as Ethernet, WiFi, LTE, or 5th generation communication. A reverse communication path, from the indoor client device 4-dev to the outdoor wireless node 3-comm-3, may be established as well via the relevant intermediary components 3-comm-1, 2-surface-1, 2-surfce-2, and 3-comm-2.

Figure 12B:
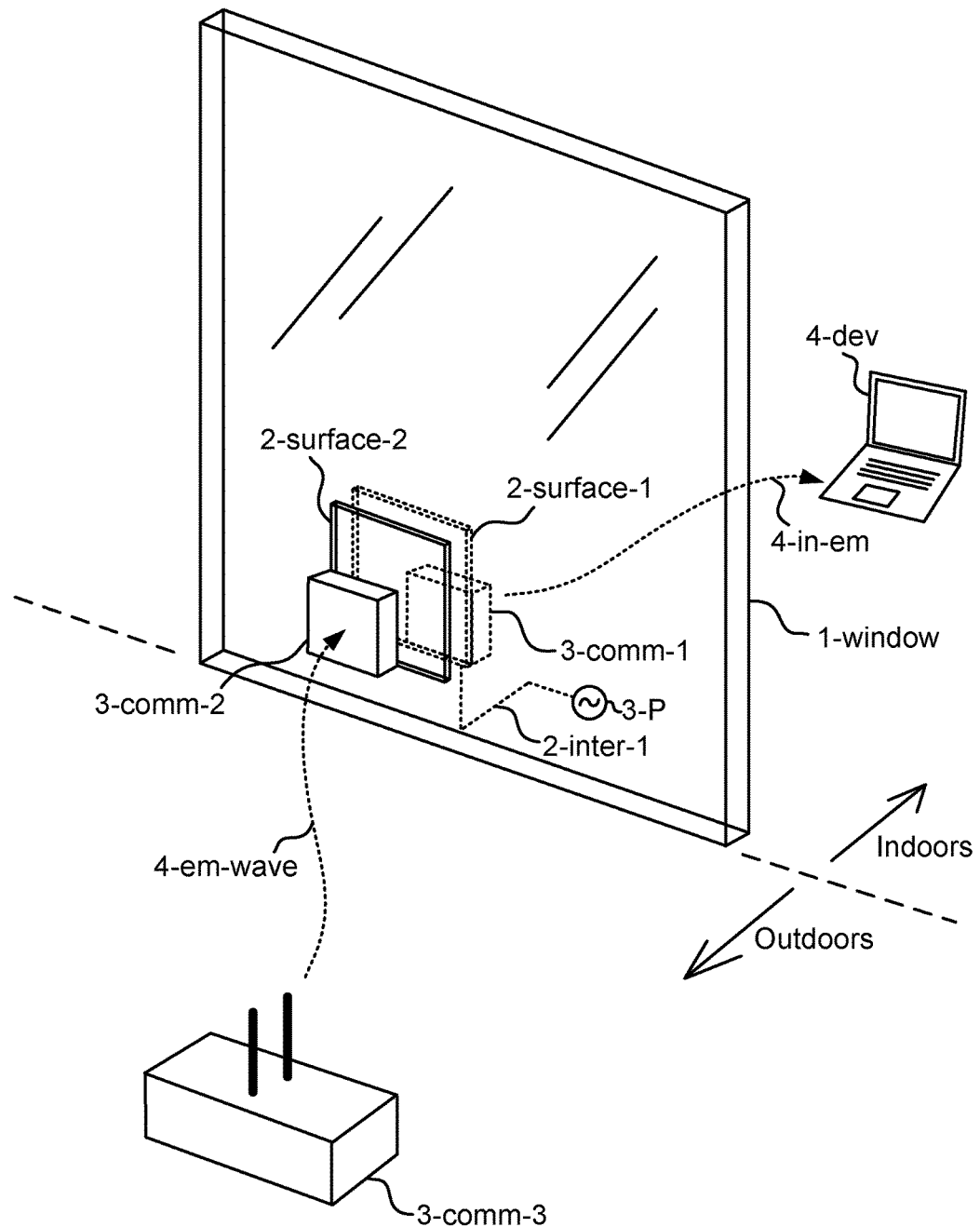
FIG. 12B illustrates another embodiment of an outdoor communication device communicating with an indoor communication device through a glass window barrier.

FIG. 12B illustrates another embodiment of an outdoor communication device 3-comm-2 communicating with an indoor communication device 3-comm-1 through a glass window barrier 1-window. The outdoor device 3-comm-2 is attached directly to an outdoor surface 2-surfce-2, and the outdoor surface 2-surfce-2 is attached directly to the glass window 1-window on one side, in which the outdoor device 3-comm-2 and the outdoor surface 2-surfce-2 may constitute a single inseparable mechanical component that is compact in size and attached directly to the window 1-wnodow. Attachment to the window 1-window may be done by any known technique, such as gluing, fusing, or using rubber vacuum cups. The outdoor device 3-comm-2 utilizes optical signals to propagate communication signals through the glass window 1-window, in which the optical signals are generated in the outdoor surface 2-surface-2 and are received by an indoor surface 2-surface-1 that is directly attached to the same glass window 1-window on the other side and opposite of the outdoor surface 2-surface-2. The indoor surface 2-surface-1 receives the optical signals, converts them to electrical signals, and relays the electrical signals to an indoor device 3-comm-1 that may be attached directly to the indoor surface 2-surface-1 and may constitute a single inseparable mechanical component together with the indoor surface 2-surface-1. The outdoor communication device 3-comm-2 receives power from a power source 3-P located indoors, in which power is transferred from the indoor power source 3-P to the outdoor communication device 3-comm-2 through the same glass window 1-window in a form of an alternating magnetic field that is generated in the indoor surface 2-surface-1 and picked up in the outdoor surface 2-surface-2. A communication link is therefore established between the outdoor communication device 3-comm-2 and the indoor communication device 3-comm-1, in which the communication link may be utilized to communicatively connect an outdoor wireless node 3-comm-3 with an indoor client device 4-dev.

Figure 13:
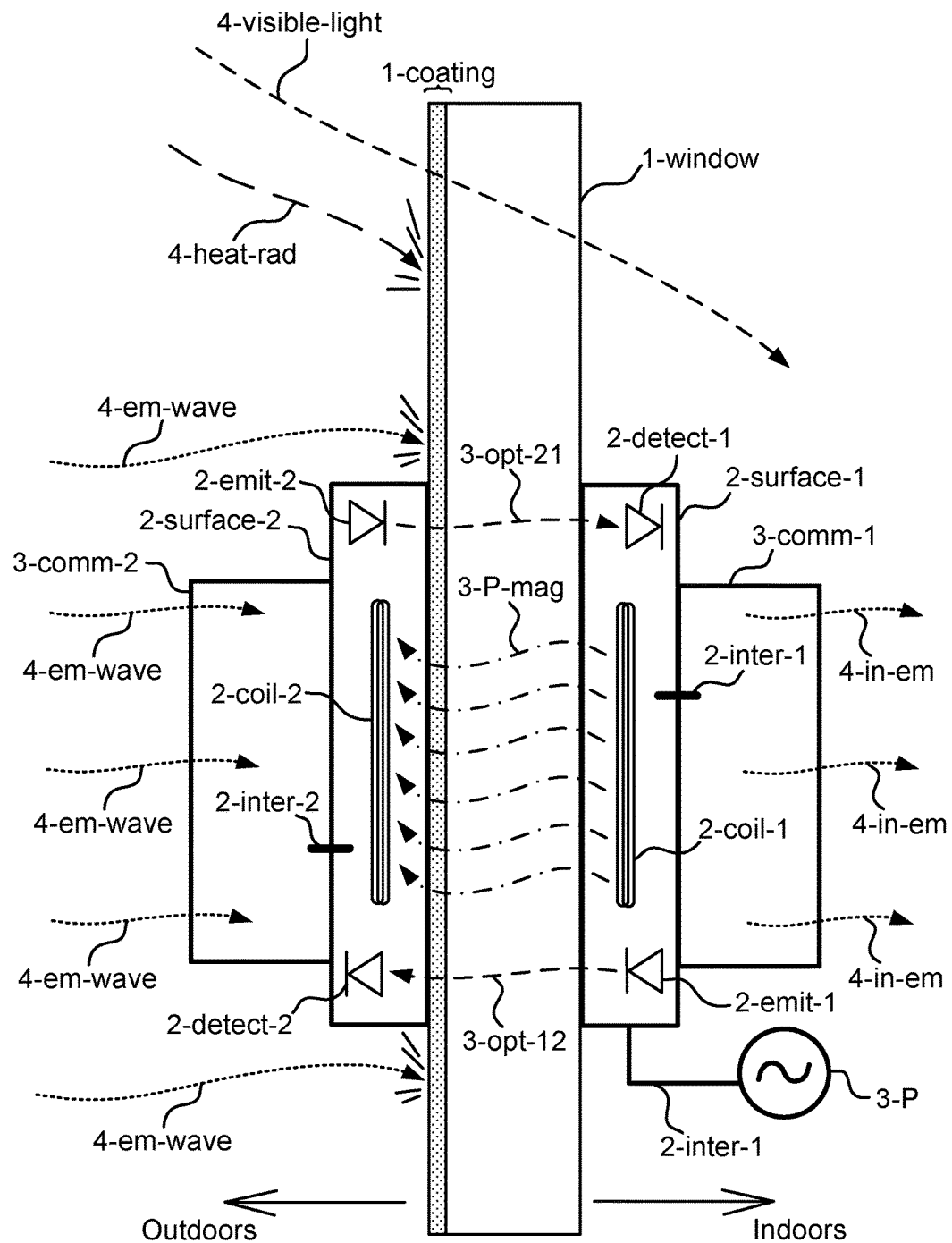
FIG. 13 illustrates one embodiment of components used in facilitating communication between an outdoor communication device and an indoor communication device through a glass window barrier.

FIG. 13 illustrates one embodiment of components used in facilitating communication between an outdoor communication device 3-comm-2 and an indoor communication device 3-comm-1 through a glass window barrier 1-window. In one embodiment, a system is operative to facilitate communication through the glass window barrier 1-window using a single electrical power source 3-P. The system includes a first electrical surface 2-surface-1 attached to one side of a glass window 1-window, in which the first electrical surface comprises: (i) a first induction coil 2-coil-1, (ii) a photo-detector 2-detect-1, and (iii) a first interface 2-inter-1 facilitating electrical contact with both a single electrical power source 3-P and a first communication device 3-comm-1. The system further includes a second electrical surface 2-surface-2 attached to the other side of the glass window 1-window and positioned in parallel to the first electrical surface 2-surface-1, in which the second electrical surface comprises: (i) a second induction coil 2-coil-2, (ii) a photo-emitter 2-emit-2, and (iii) a second interface 2-inter-2 facilitating electrical contact with a second communication device 3-comm-2.

In one embodiment, the first interface 2-inter-1 is configured to convey electrical power from the single electrical power source 3-P to the first induction coil 2-coil-1; the first induction coil 2-coil-1 is configured to further covey said electrical power, in a form of an alternating magnetic field 3-P-mag, through the glass window 1-window, to the second induction coil 2-coil-2; the second induction coil 2-coil-2 is configured to further convey said electrical power to the second interface 2-inter-2; the second interface 2-inter-2 is configured to further convey said electrical power to the second communication device 3-comm-2; the second communication device 3-comm-2 is configured to used said electrical power to decode an incoming communication signal 4-em-wave, thereby producing a decoded data set; the photo-emitter 2-emit-2 is configured to send the decoded data set, in a form of an optical signal 2-opt-21, through the glass window 1-window, to the photo-detector 2-detect-1; the photo-detector 2-detect-1 is configured to convert the optical signal 3-opt-21 into an electrical signal; and the first interface 2-inter-1 is configured to convey the electrical signal to the first communication device 3-comm-1; thereby communicatively connecting the first and second communication devices 3-comm-1, 3-comm-2 via the glass window 1-window and using the single electrical power source 3-P.

In one embodiment, the first electrical surface 2-surface-1 further comprises a second photo-emitter 2-emit-1; and the second electrical surface further comprises a second photo-detector 2-detect-2; wherein: the first communication device 3-comm-1 is configured to produce a second communication signal; the second photo-emitter 2-emit-1 is configured to send the second communication signal, in a form of a second optical signal 3-opt-12, through the glass window 1-window, to the second photo-detector 2-detect-2; the second photo-detector 2-detect-2 is configured to convert the second optical signal 3-opt-12 into a second electrical signal; and the second interface 2-inter-2 is configured to convey the second electrical signal to the second communication device 3-comm-2; thereby further communicatively connecting the second and first communication devices 3-comm-2, 3-comm-1 via the glass window 1-window to result in a full-duplex communication.

In one embodiment, a system is operative to facilitate communication through a glass window barrier. The system includes: a first electrical surface 2-surface-1 attached to one side of a glass window 1-window, in which the glass window is magnetically transparent to magnetic fields and is also optically transparent to visible light 4-visible-light. The system further includes a second electrical surface 2-surface-2 attached to the other side of the glass window 1-window and positioned in parallel to the first electrical surface 2-surface-1. In one embodiment, the system is configured to exploit said magnetic transparency in order to convey electrical power, through the glass window 1-window, in a form of an alternating magnetic field 3-P-mag, from the first electrical surface 2-surface-1 to the second electrical surface 2-surface-2, thereby powering a communication device 3-comm-2 positioned on said other side of the glass window 1-window; and the system is further configured to exploit said optical transparency in order to convey a communication signal generated by the communication device 3-comm-2, through the glass window 1-window, in a form of an optical signal 2-opt-21, from the second electrical surface 2-surface-2 back to the first electrical surface 2-surface-1, thereby facilitating communication through the glass window 1-window.

In one embodiment, said first electrical surface 2-surface-1 is located indoors; and said second electrical surface 2-surface-2 is located outdoors; in which the glass window 1-window is a window facing outdoors. In one embodiment, the system further comprises an electrical power source 3-P located indoors and a device located indoors 3-comm-1; in which: the electrical power conveyed from the first electrical surface 2-surface-1 to the second electrical surface 2-surface-2 is originated in the electrical power source 3-P that is electrically connected 2-inter-1 with the first electrical surface 2-surface-1; the communication device 3-comm-2 is located outdoors; and the system is further configured to use said communication through the glass window 1-window in order to communicatively connect the communication device located outdoors 3-comm-2 and the device located indoors 3-comm-1. In one embodiment, said outdoor communication device 3-comm-2 is a customer-premises-equipment (CPE) configured to relay communication 4-em-wave from an outdoor cellular base-station 3-comm-3 (FIG. 12A, FIG. 12B) to the device located indoors 3-comm-1. In one embodiment, said CPE 3-comm-2 is mechanically fixed to the second electrical surface 2-surface-2 (FIG. 13, FIG. 12B). In one embodiment, said CPE 3-comm-2 is mechanically separate from the second electrical surface 2-surface-2 (FIG. 12A), and is communicatively connected with the second electrical surface via electrical wiring 2-inter-2 (FIG. 12A).

In one embodiment, said optical signal 2-opt-21 is an Ethernet signal operative to facilitate said communicative connection.

In one embodiment, said device located indoors 3-comm-1 is a home router. In one embodiment, said home router 3-comm-1 is configured to facilitate WiFi connectivity indoors 4-in-em with indoor client devices 4-dev (FIG. 12A, FIG. 12B). In one embodiment, said home router 3-comm-1 is mechanically fixed to the first electrical surface 2-surface-1 (FIG. 13, FIG. 12B). In one embodiment, said home router 3-comm-1 is mechanically separate from the first electrical surface 2-surface-1 (FIG. 12A), and is communicatively connected with the first electrical surface via electrical wiring 2-inter-1 (FIG. 12A).

In one embodiment the glass window 1-window comprises a coating 1-coating operative to block heat radiation 4-heat-rad.

Figure 14:
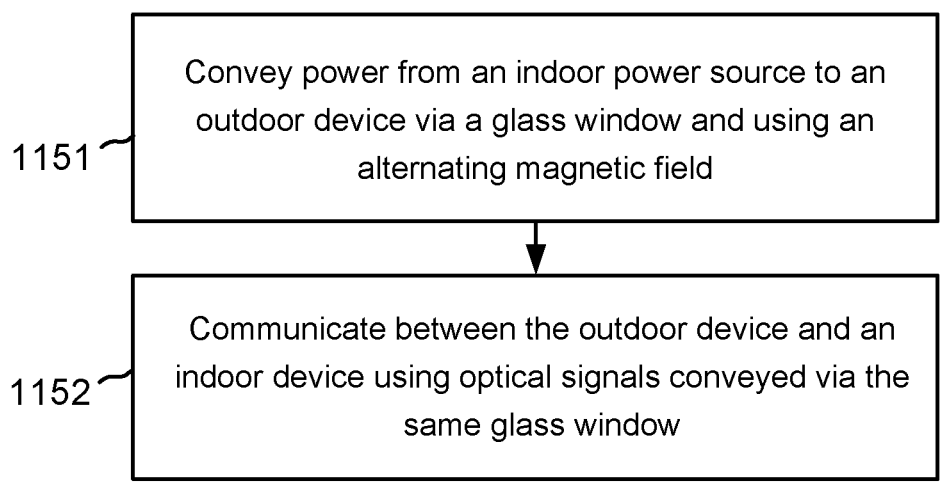
FIG. 14 illustrates one embodiment of a method for communicating through a glass window barrier between an outdoor communication device and an indoor communication device.

FIG. 14 illustrates one embodiment of a method for communicating through a glass window barrier 1-window between an outdoor communication device 3-comm-2 and an indoor communication device 3-comm-1. The method includes: In step 1151, exploiting a magnetic transparency of a glass window 1-window to convey electrical power through the glass window 1-window in a form of an alternating magnetic field 3-P-mag, thereby enabling an indoor electrical power source 3-P to power an outdoor communication device 3-comm-2. In step 1152, exploiting an optical transparency of the same glass window 1-window in order to convey an optical communication signal 3-opt-21, 3-opt-12, in a form of visible light, through the glass window 1-window, thereby enabling the outdoor communication device 3-comm-2 to communicate with an indoor device 3-comm-1.

In one embodiment, the glass window 1-window is an environmental glass covered with an anti-radiation coating 1-coating operative to block outdoor heat from radiating indoors 4-heat-rad, in which said anti-radiation coating 1-coating is also operative, as a side-effect of said blocking, to prevent outdoor microwave and millimeter-wave communication waves 4-em-wave from propagating indoors through the glass window 1-window; and the method further includes: receiving, by the outdoor communication device 3-comm-2, said outdoor microwave or millimeter-wave communication waves 4-em-wave; and converting, by the outdoor communication device 3-comm-2, the outdoor microwave or millimeter-wave communication waves received 4-em-wave, into a communication signal which is used to produce said optical communication signal 3-opt-21, thereby bypassing said anti-radiation coating, which prevents the outdoor microwave and millimeter-wave communication waves 4-em-wave from propagating indoors through the glass window 1-window.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for communicating through a glass window barrier, comprising:
    exploiting a magnetic transparency of a glass window to convey electrical power through the glass window in a form of an alternating magnetic field, thereby enabling an indoor electrical power source to power an outdoor communication device; and
    exploiting an optical transparency of the same glass window in order to convey an optical communication signal, in a form of visible light, through the glass window, thereby enabling the outdoor communication device to communicate with an indoor device.

2. The method of claim 1, wherein:
    the glass window is an environmental glass covered with an anti-radiation coating operative to block outdoor heat from radiating indoors, in which said anti-radiation coating is also operative, as a side-effect of said blocking, to prevent outdoor microwave and millimeter-wave communication waves from propagating indoors through the glass window; and
    the method further comprises:
    receiving, by the outdoor communication device, said outdoor microwave or millimeter-wave communication waves; and
    converting, by the outdoor communication device, the outdoor microwave or millimeter-wave communication waves received, into a communication signal which is used to produce said optical communication signal, thereby bypassing said anti-radiation coating, which prevents the outdoor microwave and millimeter-wave communication waves from propagating indoors through the glass window.

3. A system operative to facilitate communication through a glass window barrier, comprising:
    a first electrical surface attached to one side of a glass window, in which the glass window is magnetically transparent to magnetic fields and is also optically transparent to visible light; and
    a second electrical surface attached to the other side of the glass window and positioned in parallel to the first electrical surface;
    wherein:
    the system is configured to exploit said magnetic transparency in order to convey electrical power, through the glass window, in a form of an alternating magnetic field, from the first electrical surface to the second electrical surface, thereby powering a communication device positioned on said other side of the glass window; and
    the system is further configured to exploit said optical transparency in order to convey a communication signal generated by the communication device, through the glass window, in a form of an optical signal, from the second electrical surface back to the first electrical surface, thereby facilitating communication through the glass window.

4. The system of claim 3, wherein:
    said first electrical surface is located indoors; and
    said second electrical surface is located outdoors;
    in which the glass window is a window facing outdoors.

5. The system of claim 4, wherein:
    the system further comprises an electrical power source located indoors and a device located indoors;
    in which:
    the electrical power conveyed from the first electrical surface to the second electrical surface is originated in the electrical power source that is electrically connected with the first electrical surface;
    the communication device is located outdoors; and
    the system is further configured to use said communication through the glass window in order to communicatively connect the communication device located outdoors and the device located indoors.

6. The system of claim 5, wherein:
    said outdoor communication device is a customer-premises-equipment (CPE) configured to relay communication from an outdoor cellular base-station to the device located indoors.

7. The system of claim 6, wherein:
    said CPE is mechanically fixed to the second electrical surface.

8. The system of claim 6, wherein:
    said CPE is mechanically separate from the second electrical surface, and is communicatively connected with the second electrical surface via electrical wiring.

9. The system of claim 5, wherein:
    said optical signal is an Ethernet signal operative to facilitate said communicative connection.

10. The system of claim 5, wherein:
    said device located indoors is a home router.

11. The system of claim 10, wherein:
    said home router is configured to facilitate WiFi connectivity indoors with indoor client devices.

12. The system of claim 10, wherein:
    said home router is mechanically fixed to the first electrical surface.

13. The system of claim 10, wherein:
    said home router is mechanically separate from the first electrical surface, and is communicatively connected with the first electrical surface via electrical wiring.

14. A system operative to facilitate communication through a glass window barrier using a single electrical power source, comprising:
    a first electrical surface attached to one side of a glass window, in which the first electrical surface comprises:

(i) a first induction coil, (ii) a photo-detector, and (iii) a first interface facilitating electrical contact with both a single electrical power source and a first communication device; and a second electrical surface attached to the other side of the glass window and positioned in parallel to the first electrical surface, in which the second electrical surface comprises: (i) a second induction coil, (ii) a photo-emitter, and (iii) a second interface facilitating electrical contact with a second communication device;

wherein:

the first interface is configured to convey electrical power from the single electrical power source to the first induction coil;

the first induction coil is configured to further covey said electrical power, in a form of an alternating magnetic field, through the glass window, to the second induction coil;

the second induction coil is configured to further convey said electrical power to the second interface;

the second interface is configured to further convey said electrical power to the second communication device;

the second communication device is configured to used said electrical power to decode an incoming communication signal, thereby producing a decoded data set;

the photo-emitter is configured to send the decoded data set, in a form of an optical signal, through the glass window, to the photo-detector;

the photo-detector is configured to convert the optical signal into an electrical signal; and the first interface is configured to convey the electrical signal to the first communication device;

thereby communicatively connecting the first and second communication devices via the glass window and using the single electrical power source.

15. The system of claim 14, wherein:

the first electrical surface further comprises a second photo-emitter; and the second electrical surface further comprises a second photo-detector;

wherein:

the first communication device is configured to produce a second communication signal;

the second photo-emitter is configured to send the second communication signal, in a form of a second optical signal, through the glass window, to the second photo-detector;

the second photo-detector is configured to convert the second optical signal into a second electrical signal; and the second interface is configured to convey the second electrical signal to the second communication device;

thereby further communicatively connecting the second and first communication devices via the glass window to result in a full-duplex communication.

* * * * *